US012757059B2

(12) United States Patent
Balakrishnan et al.

(10) Patent No.: US 12,757,059 B2
(45) Date of Patent: Oct. 6, 2026

(54) APPLICATION AWARE DYNAMIC TOPOLOGY UPDATE

(71) Applicant: Telefonaktiebolaget LM Ericsson (publ), Stockholm (SE)

(72) Inventors: Bipin Balakrishnan, Malmö (SE); Ashkan Kalantari, Malmö (SE); Andreas Kristensson, Södra Sandby (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/103,213

(22) PCT Filed: Aug. 12, 2022

(86) PCT No.: PCT/EP2022/072698
§ 371 (c)(1),
(2) Date: Feb. 11, 2025

(87) PCT Pub. No.: WO2024/032906
PCT Pub. Date: Feb. 15, 2024

(65) Prior Publication Data
US 2026/0059372 A1 Feb. 26, 2026

(51) Int. Cl.
*H04W 28/02* (2009.01)
*H04L 47/2475* (2022.01)
(Continued)

(52) U.S. Cl.
CPC ....... *H04W 28/021* (2013.01); *H04L 47/2475* (2013.01); *H04W 40/18* (2013.01); *H04W 92/18* (2013.01)

(58) Field of Classification Search
CPC ... H04W 28/021; H04W 40/18; H04W 92/18; H04L 47/2475
(Continued)

(56) References Cited

U.S. PATENT DOCUMENTS 6,330,229 B1 * 12/2001 Jain ..................... H04L 12/4625 370/256
9,794,129 B2 10/2017 Iovanna et al.
(Continued)

FOREIGN PATENT DOCUMENTS

CN 108541039 A 9/2018
CN 104853365 B 1/2019
(Continued)

OTHER PUBLICATIONS

Author Unknown, "Technical Specification Group Services and System Aspects; Study on Communication for Automation in Vertical Domains (Release 16)," Technical Report 22.804, Version 16.2.0, Dec. 2018, 3GPP Organizational Partners 196 pages.
(Continued)

*Primary Examiner* — Benjamin R Bruckart
(74) *Attorney, Agent, or Firm* — Withrow & Terranova, PLLC

(57) ABSTRACT

Systems and methods for dynamically updating a topology for an application aware multi-path connection to a target wireless communication device are disclosed. In one embodiment, a method performed by a master topology function to dynamically update a topology for a multi-path connection to a target wireless communication device comprises determining the topology such that the topology satisfies one or more application-level requirements for the particular application. The method further comprises configuring the source wireless node, the target wireless communication device, and the one or more additional wireless communication devices in accordance with the determined topology to provide the multi-path connection. The method further comprises dynamically updating the determined topology based on: (a) information about an actual or predicted degradation of at least one of the active links, (b) a change in a Quality of Service (QoS) for the particular
(Continued)

application, or (c) a change in the application-level requirements.

20 Claims, 29 Drawing Sheets

(51) Int. Cl.
*H04W 40/18* (2009.01)
*H04W 92/18* (2009.01)

(58) Field of Classification Search
USPC .......................................................... 709/221
See application file for complete search history.

(56) References Cited

U.S. PATENT DOCUMENTS

| | | | |
|---|---|---|---|
| 10,349,335 | B2 | 7/2019 | Thubert et al. |
| 2003/0035401 | A1 | 2/2003 | Shaheen et al. |
| 2006/0105764 | A1 | 5/2006 | Krishnaswamy et al. |
| 2014/0242963 | A1 | 8/2014 | Novlan et al. |
| 2015/0043385 | A1 | 2/2015 | Noh et al. |
| 2015/0126188 | A1 | 5/2015 | Lindoff et al. |
| 2016/0157043 | A1 | 6/2016 | Li et al. |
| 2016/0157254 | A1 | 6/2016 | Novlan et al. |
| 2016/0183219 | A1 | 6/2016 | Kim et al. |
| 2016/0295627 | A1 | 10/2016 | Karout et al. |
| 2017/0055270 | A1 | 2/2017 | Caretti et al. |
| 2017/0064583 | A1* | 3/2017 | Roy .................. H04W 36/0007 |
| 2017/0134935 | A1 | 5/2017 | Wei |
| 2017/0156078 | A1 | 6/2017 | Lee et al. |
| 2017/0245166 | A1 | 8/2017 | Bienas et al. |
| 2018/0219753 | A1* | 8/2018 | Arsenie ................... H04L 41/12 |
| 2019/0110268 | A1 | 4/2019 | Abedini et al. |
| 2019/0132784 | A1 | 5/2019 | Thubert et al. |
| 2019/0239112 | A1 | 8/2019 | Rao et al. |
| 2019/0289502 | A1 | 9/2019 | Abedini et al. |
| 2020/0177498 | A1 | 6/2020 | Thomas et al. |
| 2020/0288360 | A1 | 9/2020 | Zheng et al. |
| 2021/0007117 | A1 | 1/2021 | Park et al. |
| 2021/0067281 | A1 | 3/2021 | Sarkis et al. |
| 2021/0400540 | A1 | 12/2021 | Kim et al. |
| 2022/0217074 | A1* | 7/2022 | Akhavain Mohammadi ............... H04L 45/64 |
| 2022/0255689 | A1 | 8/2022 | Wen et al. |
| 2022/0353732 | A1 | 11/2022 | Filippou et al. |

FOREIGN PATENT DOCUMENTS

| | | | |
|---|---|---|---|
| CN | 109561504 | A | 4/2019 |
| EP | 3160202 | A1 | 4/2017 |
| EP | 3220714 | A1 | 9/2017 |
| EP | 3481106 | A1 | 5/2019 |
| GB | 2574875 | A | 12/2019 |
| WO | 2016099227 | A1 | 6/2016 |
| WO | 2017143813 | A1 | 8/2017 |
| WO | 2021121541 | A1 | 6/2021 |
| WO | 2021254962 | A1 | 12/2021 |
| WO | 2022156914 | A1 | 7/2022 |

OTHER PUBLICATIONS

Author Unknown, "Technical Specification Group Services and System Aspects; Service requirements for cyber-physical control applications in vertical domains; Stage 1 (Release 16)," Technical Specification 22.104, Version 16.2.0, Jun. 2019, 3GPP Organizational Partners 54 pages.

Author Unknown, "Technical Specification Group Services and System Aspects; Service requirements for cyber-physical control applications in vertical domains; Stage 1 (Release 16)," Technical Specification 22.104, Version 16.3.0, Sep. 2019, 3GPP Organizational Partners 54 pages.

Azari, et al., "Risk-Aware Resource Allocation for URLLC: Challenges and Strategies with Machine Learning," IEEE Communications Magazine, vol. 57, Issue 3, Dec. 2018, 7 pages.

Ben-Khalifa, et al., "Risk-Sensitive Reinforcement Learning for URLLC Traffic in Wireless Networks," Wireless Communications and Networking Conference, Nov. 2018, IEEE, 7 pages.

Catt, "R2-2100227: RLF Indication and Local Rerouting," 3GPP TSG-RAN WG2 Meeting #113-e, Jan. 25-Feb. 5, 2021, Electronic Meeting, 3 pages.

Li, Zheng, et al., "A Multi-Agent Deep Reinforcement Learning based Spectrum Allocation Framework for D2D Communications," IEEE Global Communications Conference, Dec. 2019, 6 pages.

Liang, et al., "Deep Learning based Wireless Resource Allocation with Application to Vehicular Networks," Proceedings of the IEEE, Jul. 2019, 13 pages.

Nokia, et al., "R1-133495: D2D Communication without network coverage," 3GPP TSG-RAN WG1 Meeting #74, Aug. 19-23, 2013, Barcelona, Spain, 6 pages.

Poirot, Valentin., "Energy Efficient Multi-Connectivity for Ultra-Dense Networks," Master's Thesis, Lulea University of Technology, 2017, 88 pages.

Poirot, et al., "Energy Efficient Multi-Connectivity Algorithms for Ultra-Dense 5G Networks," Wireless Networks, Jun. 22, 2019, Springer, 16 pages.

Prasad, et al., "Energy Efficient D2D Discovery for Proximity Services in 3GPP LTE-Advanced Networks: ProSe Discovery Mechanisms," IEEE Vehicular Technology Magazine, vol. 9, Issue 4, Dec. 2014, 9 pages.

Raca, et al., "On Leveraging Machine and Deep Learning for Throughput Prediction in Cellular Networks; Design, Performance, and Challenges," IEEE Communications Magazine, Mar. 2020, pp. 11-17.

Sahin, et al., "VRLS: A Unified Reinforcement Learning Scheduler for Vehicle-to-Vehicle Communications," 2nd Connected and Automated Vehicles Symposium, Jul. 2019, IEEE, 7 pages.

Wang, et al., "Reinforcement Learning with Perturbed Rewards," International Conference on Learning Representations, Oct. 2018, 24 pages.

International Search Report and Written Opinion for International Patent Application No. PCT/EP2019/085325, mailed Oct. 19, 2020, 17 pages.

Invitation to Pay Additional Fees and Partial Search for International Patent Application No. PCT/EP2021/051634, mailed Oct. 22, 2021, 16 pages.

International Search Report and Written Opinion for International Patent Application No. PCT/EP2021/051634, mailed Dec. 9, 2021, 24 pages.

International Search Report and Written Opinion for International Patent Application No. PCT/EP2022/072698, mailed Jun. 6, 2023, 25 pages.

Non-Final Office Action for U.S. Appl. No. 17/785,466, mailed Aug. 19, 2024, 6 pages.

Notice of Allowance for U.S. Appl. No. 17/785,466, mailed Oct. 30, 2024, 7 pages.

Invitation to Pay Additional Fees and Partial Search for International Patent Application No. PCT/EP2022/072698, mailed Mar. 22, 2023, 13 pages.

* cited by examiner

Note: Timers and TX scheduler can be (is) shared with (from) other logic in UE

APPLICATION AWARE DYNAMIC TOPOLOGY UPDATE

This application is a 35 U.S.C. § 371 national phase filing of International Application No. PCT/EP2022/072698, filed Aug. 12, 2022, the disclosure of which is incorporated herein by reference in its entirety.

TECHNICAL FIELD

The present disclosure relates to wireless Device-to-Device (D2D) communication and, more specifically, to determining a topology for a D2D link.

BACKGROUND

Multipoint transmissions, which are sometimes referred to as joint transmissions or Cooperative Multipoint (COMP) transmissions, are used to enhance the Signal-to-Interference-Plus-Noise Ratio (SINR) and thereby the reliability of wireless communication for critical applications. Multi-Transmission/Reception Point (TRP) solutions increase the SINR at the expense of some coordination and synchronization mechanisms that are needed to ensure that signals transmitted from multiple TRPs combine constructively at the intended receivers.

Device-to-Device (D2D) communications have been proposed to improve link quality when the communicating devices are in proximity to one another. Existing D2D protocols and algorithms facilitate unicast, multicast, and broadcast communications between devices communicating either in the licensed or the unlicensed spectrum. D2D communications can also be used to improve the signal quality to devices that are out of network coverage but are within the coverage of a device that is in cellular coverage.

Industrial applications such as automated guided vehicle or robot control, real-time production line control, unmanned aerial vehicle control, and mission control plan control belong to the Ultra-Reliable Low-Latency (URLLC) use case type (e.g., packet success rate of 99.99999% within End-to-End (E2E) latency of 1 millisecond (ms)) as mentioned in Third Generation Partnership Project (3GPP) Technical Specification (TS) 22.104 V16.2.0. URLLC applications are defined herein as those that need a guaranteed packet delivery within a defined latency bound. The applications that belong to the URLLC use case have varying reliability needs and latency bounds. A few examples of the varying reliability requirements among different applications can be found in 3GPP TS 22.104. In addition, URLLC applications need to co-exist with other applications that belong to the enhanced Mobile Broadband (eMBB) or massive Machine Type Communication (mMTC) use cases. Extreme high reliability with bounded latency might be difficult to meet with frequency, spatial, or temporal diversity alone but is more likely to be achieved with multi-point transmissions, as described in V. Poirot, "Energy Efficient Multi-Connectivity for ultra dense networks," Luleå University of Technology, Luleå, 2017. User Equipments (UEs) could be used as nodes in the multi-point transmission. However, there are problems that must be overcome in order to use multiple UEs as nodes of multi-point transmission poses. In particular, one problem is that there is a need for a scheme to select eligible UEs to carry out this multi-point transmission. Another problem is that there is a need for a scheme to set up a topology that serves the needs of the application. It is possible that not all UEs can participate in the multi-point transmission as some of them may not be able to function as time-bound relays. This can be due to reasons such as device architecture limitations (e.g., longer latency to switch to D2D mode), device functionality limitations (e.g., desired Radio Access Technology (RAT) such as, e.g., 3GPP New Radio (NR) is unavailable), or temporary limitations (e.g., limitations due to currently serving time-critical applications that need guarantees, low battery, etc.).

UEs located in the short and final geographical distance that must be spanned to provide cellular service are usually said to be in the "last mile" in communication parlance. Therefore, an out-of-coverage UE or an in-coverage UE with connection properties below a threshold (e.g., SINR that is less than SINR threshold indicative of a poor SINR) located in the last mile needs to have a reliable connection to serve applications, such as URLLC applications, residing on these devices. The node that connects the last mile to the rest of the geographical region is called an "entry node" into the last mile. This could be, for example, a base station when connecting cloud applications to end points in the last mile.

Existing COMP solutions use multiple base stations, which could lead to higher costs and are not efficiently scalable to address all non-coverage regions within environments such as factory floors. Some other solutions, such as the one described in United States Patent Application Publication No. 2015/0043385 A1, cover construction of a topology across multiple cells between two device pairs only. Other solutions, such as the one described in U.S. Pat. No. 10,349,335, only address the low latency by selecting one path from source to destination, which may comprise multiple hops. Thus, solutions such as the one described in U.S. Pat. No. 10,349,335, do not aid in enhancing reliability of data transmissions as a broken link can lead to a lossy data transmission. Some other solutions, such as the one described in United States Patent Application Publication No. 2016/0295627 A1, give only a guidance as to which applications can be supported over a single link based on link parameters, where the applications are not of the URLLC use case type. In other words, solutions such as the one described in United States Patent Application Publication No. 2016/0295627 A1 do not consider reliability at bounded latency. Furthermore, one cannot know which combination of links can cater to URLLC applications.

SUMMARY

Systems and methods for dynamically updating a topology for an application aware multi-path connection to a target wireless communication device are disclosed. In one embodiment, a method performed by a master topology function to dynamically update a topology for a multi-path connection to a target wireless communication device comprises determining a topology for a multi-path connection to a target wireless communication device such that the topology for the multi-path connection satisfies one or more application-level requirements for a particular application. The topology comprises two or more active links from a source wireless node to the target wireless communication device and one or more inactive links from the source wireless node to the target wireless communication device, and at least one link from among the two or more active links and the one or more inactive links is a multi-hop link from the source wireless node to the target wireless communication device via one or more additional wireless communication devices that operate as relays. The method further comprises configuring, directly or indirectly, the source wireless node, the target wireless communication device, and the one or more additional wireless communication devices in accordance with the determined topology to provide the multi-path connection. The method further comprises dynamically updating the determined topology based on: (a) information about an actual or predicted degradation of at least one of the two or more active links, (b) a change in a Quality of Service (QOS) for the particular application using the multi-path connection, or (c) a change in the one or more application-level requirements for the particular application. In this manner, the topology for the multi-path connection to the target wireless communication device can be dynamically updated to achieve the desired performance under varying conditions.

In one embodiment, dynamically updating the determined topology comprises activating at least one of the one or more inactive links. In one embodiment, activating the at least one of the one or more inactive links comprises configuring, directly or indirectly, the source wireless node, the target wireless communication device, and/or the one or more additional wireless communication devices to activate the at least one of the one or more inactive links. In one embodiment, dynamically updating the determined topology comprises modifying at least one of the one or more active links. In one embodiment, modifying the at least one of the one or more active links comprises configuring, directly or indirectly, the source wireless node, the target wireless communication device, and/or the one or more additional wireless communication devices to modify the at least one of the one or more active links. In one embodiment, modifying the at least one of the one or more active links comprises deactivating the at least one of the one or more active links.

In one embodiment, dynamically updating the determined topology comprise obtaining information about an actual or predicted degradation of at least one of the two or more active links and updating the determined topology based on the information about the actual or predicted degradation of at least one of the two or more active links. In one embodiment, obtaining the information about the actual or predicted degradation of at least one of the two or more active links comprises receiving a notification of the actual or predicted degradation of at least one of the two or more active links from the source wireless node, the target wireless communication device, or at least one of the one or more additional wireless communication devices. In another embodiment, obtaining the information about the actual or predicted degradation of at least one of the two or more active links comprises receiving a notification a reduction in capabilities of at least one of the two or more active links from the source wireless node, the target wireless communication device, or at least one of the one or more additional wireless communication devices.

In one embodiment, dynamically updating the determined topology comprises obtaining information about a change in QoS of the particular application using the multi-path channel and updating the determined topology based on the information about the change in the QoS of the particular application using the multi-path channel.

In one embodiment, dynamically updating the determined topology comprises obtaining information about an actual or predicted degradation of at least one of the two or more active links or about a change in QoS of the particular application using the multi-path channel, waiting a predefined or preconfigured amount of time to determine whether further information about an actual or predicted degradation of at least one of the two or more active links or about a change in the QoS of the particular application using the multi-path channel is received, and after waiting the predefined or preconfigured amount of time, updating the determined topology based on the information about the actual or predicted degradation of at least one of the two or more active links or about the change in QoS of the particular application using the multi-path channel and, if received, the further information.

Corresponding embodiments of a network node for implementing a master topology function that dynamically updates a topology for a multi-path connection to a target wireless communication device are also disclosed. In one embodiment, the network node is adapted to determine a topology for a multi-path connection to a target wireless communication device such that the topology for the multi-path connection satisfies one or more application-level requirements for a particular application. The topology comprises two or more active links from a source wireless node to the target wireless communication device and one or more inactive links from the source wireless node to the target wireless communication device, and at least one link from among the two or more active links and the one or more inactive links is a multi-hop link from the source wireless node to the target wireless communication device via one or more additional wireless communication devices that operate as relays. The network node is further adapted to configure, directly or indirectly, the source wireless node, the target wireless communication device, and the one or more additional wireless communication devices in accordance with the determined topology to provide the multi-path connection and dynamically update the determined topology based on: (a) information about an actual or predicted degradation of at least one of the two or more active links, (b) a change in a QoS for the particular application using the multi-path connection, or (c) a change in the one or more application-level requirements for the particular application.

In another embodiment, a network node for implementing a master topology function that dynamically updates a topology for a multi-path connection to a target wireless communication device, the network node comprising processing circuitry configured to cause the network node to determine a topology for a multi-path connection to a target wireless communication device such that the topology for the multi-path connection satisfies one or more application-level requirements for a particular application. The topology comprises two or more active links from a source wireless node to the target wireless communication device and one or more inactive links from the source wireless node to the target wireless communication device, and at least one link from among the two or more active links and the one or more inactive links is a multi-hop link from the source wireless node to the target wireless communication device via one or more additional wireless communication devices that operate as relays. The processing circuitry is further configured to cause the network node to configure, directly or indirectly, the source wireless node, the target wireless communication device, and the one or more additional wireless communication devices in accordance with the determined topology to provide the multi-path connection and dynamically update the determined topology based on: (a) information about an actual or predicted degradation of at least one of the two or more active links, (b) a change in a QoS for the particular application using the multi-path connection, or (c) a change in the one or more application-level requirements for the particular application.

Embodiments of a method performed by a wireless communication device having a topology function to enable dynamic updates a topology for a multi-path connection from a source wireless node to a target wireless communication device are also disclosed. In one embodiment, the method comprises detecting an event that is indicative of an actual or predicted degradation of an active link of the multi-path connection, wherein the wireless communication device is either the target wireless communication device at which the active link terminates or a relay wireless communication device through which the active link passes. The method further comprises determining whether to notify a master topology function that there is an actual or predicted degradation of the active link and, responsive to determining to notify the master topology function that there is an actual or predicted degradation of the active link, notifying the master topology function of the actual or predicted degradation of the active link.

In on embodiment, detecting the event that is indicative of an actual or predicted degradation of the active link of the multi-path connection comprises, at a data link layer, either receiving a packet payload error indication or missing a packet sequence number. Detecting the event further comprises determining that the packet payload indication or the missing packet sequence number is associated to the active link for the particular application, logging the event as an error for the active link for the particular application, and determining whether an error rate for the active link for the particular application is greater than a predefined or preconfigured threshold. Detecting the event further comprises, responsive to determining that the error rate for the active link for the particular application is greater than the predefined or preconfigured threshold, storing information that indicates that there is an actual degradation of the active link for the particular application and notifying the master topology function of the actual degradation of the active link for the particular application.

In one embodiment, detecting the event that is indicative of an actual or predicted degradation of the active link of the multi-path connection comprises, at a data link layer, either receiving a packet payload error indication or missing a packet sequence number. Detecting the event further comprises determining that the packet payload indication or the missing packet sequence number is associated to the active link for the particular application, logging the event as an error for the active link for the particular application, and determining whether an error rate for the active link for the particular application is greater than a predefined or preconfigured threshold. Detecting the event further comprises, responsive to determining that the error rate for the active link for the particular application is greater than the predefined or preconfigured threshold, storing information that indicates that there is an actual degradation of the active link for the particular application, determining whether the wireless communication device is a relay for the active link for the particular application or the target wireless communication device for the particular application, and, responsive to determining that the wireless communication device is a relay for the active link for the particular application, notifying the master topology function of the actual degradation of the active link for the particular application.

In on embodiment, detecting the event that is indicative of an actual or predicted degradation of the active link of the multi-path connection comprises, at a data link layer, either receiving a packet payload error indication or missing a packet sequence number. Detecting the event further comprises determining that the packet payload indication or the missing packet sequence number is associated to the active link for the particular application, logging the event as an error for the active link for the particular application, and determining whether an error rate for the active link for the particular application is greater than a predefined or preconfigured threshold. Detecting the event further comprises, responsive to determining that the error rate for the active link for the particular application is greater than the predefined or preconfigured threshold, storing information that indicates that there is an actual degradation of the active link for the particular application and determining whether the wireless communication device is a relay for the active link for the particular application or the target wireless communication device for the particular application. Detecting the event further comprises, responsive to determining that the wireless communication device is the target wireless communication device for the active link for the particular application, determining whether there is any other active link for the particular application having an error rate that is within a defined threshold amount from the predefined or preconfigured threshold and, responsive to determining that there is no other active link for the particular application having an error rate that is within the defined threshold amount from the predefined or preconfigured threshold, notifying the master topology function of the actual degradation of the active link for the particular application and notifying the master topology function that there is no other active link for the particular application that has an actual degradation.

In one embodiment, detecting the event that is indicative of an actual or predicted degradation of the active link of the multi-path connection comprises, at a data link layer, either receiving a packet payload error indication or missing a packet sequence number. Detecting the event further comprises determining that the packet payload indication or the missing packet sequence number is associated to the active link for the particular application, logging the event as an error for the active link for the particular application, and determining whether an error rate for the active link for the particular application is greater than a predefined or preconfigured threshold. Detecting the event further comprises, responsive to determining that the error rate for the active link for the particular application is greater than the predefined or preconfigured threshold, storing information that indicates that there is an actual degradation of the active link for the particular application and determining whether the wireless communication device is a relay for the active link for the particular application or the target wireless communication device for the particular application. Detecting the event further comprises, responsive to determining that the wireless communication device is the target wireless communication device for the active link for the particular application, determining whether there is any other active link for the particular application having an error rate that is within a defined threshold amount from the predefined or preconfigured threshold and, responsive to determining that there is at least one other active link for the particular application having an error rate that is within the defined threshold amount from the predefined or preconfigured threshold, notifying the master topology function of the actual degradation of the active link for the particular application and notifying the master topology function of an actual degradation of the at least one other active link for the particular application.

Corresponding embodiments of a wireless communication device are also disclosed. In one embodiment, a wireless communication device having a slave topology function to enable dynamic updates a topology for a multi-path connection from a source wireless node to a target wireless communication device is adapted to detect an event that is indicative of an actual or predicted degradation of an active link of the multi-path connection, wherein the wireless communication device is either the target wireless communication device at which the active link terminates or a relay wireless communication device through which the active link passes. The wireless communication device is further adapted to determine whether to notify a master topology function that there is an actual or predicted degradation of the active link and, responsive to determining to notify the master topology function that there is an actual or predicted degradation of the active link, notify the master topology function of the actual or predicted degradation of the active link.

In one embodiment, a wireless communication device having a slave topology function to enable dynamic updates a topology for a multi-path connection from a source wireless node to a target wireless communication device comprises one or more transmitters, one or more receivers, and processing circuitry associated with the one or more transmitters and the one or more receivers. The processing circuitry is configured to cause the wireless communication device to detect an event that is indicative of an actual or predicted degradation of an active link of the multi-path connection, wherein the wireless communication device is either the target wireless communication device at which the active link terminates or a relay wireless communication device through which the active link passes. The processing circuitry is further configured to cause the wireless communication device to determine whether to notify a master topology function that there is an actual or predicted degradation of the active link and, responsive to determining to notify the master topology function that there is an actual or predicted degradation of the active link, notify the master topology function of the actual or predicted degradation of the active link.

BRIEF DESCRIPTION OF THE DRAWINGS

The accompanying drawing figures incorporated in and forming a part of this specification illustrate several aspects of the disclosure, and together with the description serve to explain the principles of the disclosure. They should not be construed as limitations of the present disclosure.

DETAILED DESCRIPTION

Figure 1:
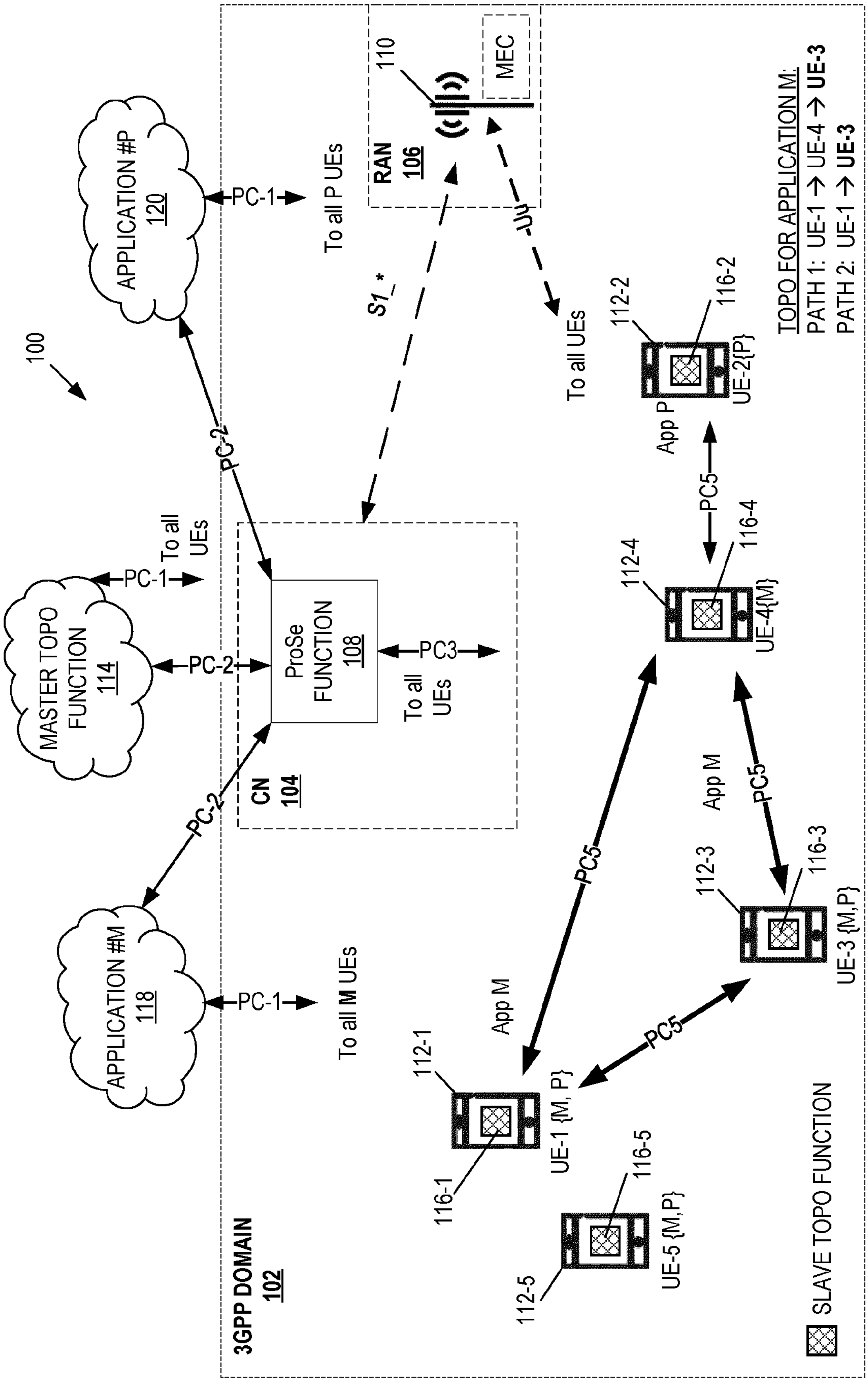
FIG. 1 illustrates one example of a communication system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" or "wireless node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Direct Link: As used herein, a "direct link" is a wireless communication link between two wireless nodes that does not pass through any relay devices (e.g., a downlink from a RAN node to a wireless communication device, a direct Device-to-Device (D2D) link between two wireless communication devices, or the like).

Multi-Hop Link: As used herein, a "multi-hop link" is a link between two wireless communication devices that passes through one or more relay devices (i.e., a link that passes from a RAN node to a target wireless communication devices through one or more other wireless communication devices acting as relays or a link that passes from a source wireless communication device to a target wireless communication device through one or more other wireless communication devices acting as relays).

Link: As used herein, a "link," which is also sometimes referred to herein as an End-to-End (E2E) link, is either a direct link or a multi-hop link.

Direct D2D Link: As used herein, a "direct D2D link" is a D2D link between two wireless communication devices that does not pass through any relay devices (i.e., does not pass through any other wireless communication devices acting as a relay). A direct D2D link is one type of direct link. Also note that a direct D2D link may form part of a multi-hop link. For example, a multi-hop link from a RAN node to a target wireless communication device may be: RAN Node à UE A à UE B, where UE A à UE B is a direct D2D link that forms part of the multi-hop link from the RAN node to UE B.

Multi-Hop D2D Link: As used herein, a "multi-hop D2D link" is a D2D link between two wireless communication devices that passes through one or more relay devices (i.e., a D2D link that passes from a source wireless communication device to a target wireless communication device through one or more other wireless communication devices acting as relays). As an example, the following D2D link is a multi-hop D2D link from UE A to UE C: UE A à UE B à UE C, where each of the two arrows represent direct D2D links between the adjacent UEs and together these direct D2D links form the multi-hop D2D link from UE A to UE C. A multi-hop D2D is one type of multi-hop link. Also note that a multi-hop D2D link may form part of a multi-hop link. For example, a multi-hop link from a RAN node to a target wireless communication device may be: RAN Node à UE A à UE B à UE C, where UE A à UE B à UE C is a multi-hop D2D link that forms part of the multi-hop link from the RAN node to UE C.

D2D Link: As used herein, a "D2D link," which is also sometimes referred to herein as an E2E D2D link, is either a direct D2D link or a multi-hop D2D link.

Multi-Path Connection: As used herein, a "multi-path connection" is a connection that consists of two or more links that are in parallel (i.e., simultaneous) and traverse different paths between two wireless nodes, e.g., for purposes of redundancy. A multi-path connection may include a primary link and one or more redundant links, for example.

Multi-Path D2D Connection: As used herein, a "multi-path D2D connection" is a connection that consists of two or more D2D links that are in parallel (i.e., simultaneous) and traverse different paths between two wireless communication devices, e.g., for purposes of redundancy.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods are disclosed herein for determining a topology for a multi-path connection based on one or more application-level requirements of a particular application that is to use the multi-path connection. As used herein, a "topology" for a multi-path connection is the way in which wireless nodes are connected via direct links to form the multi-path connection. Transmissions made over the multi-path connection may be referred to as multipoint transmissions since the transmissions are received at the target wireless communication device from multiple transmission points, which in the case of the multi-path connection are other wireless nodes in respective direct or multi-hop links from the source wireless node to the target wireless communication device. Use cases such as, for example, industrial automation use cases, cloud robotics, and commercial use cases such as collaborative gaming could greatly benefit from embodiments of the systems and methods disclosed herein. Some embodiments of the systems and methods disclosed herein also have relevance when the radio links are served with higher radio frequencies such as millimeter wave (mmWave) frequencies (>28 gigahertz (GHZ)), where more Line of Sight (LOS) data transmission would be beneficial.

In this regard, FIG. 1 illustrates one example of a communication system 100 in which embodiments of the present disclosure may be implemented. As illustrated, the communication system 100 includes a 3GPP domain 102 that includes a core network 104 and a RAN 106. While not illustrated, the core network 104 includes many core network nodes, as will be appreciated by one of skill in the art. The core network 104 includes a Proximity Service (ProSe) function 108. In this example, the RAN 106 is shown as including a single RAN node 110; however, it should be understood that the RAN 106 typically includes many RAN nodes. The RAN node 110 may be a base station (e.g., a gNB or eNB) or a network node that implements at least some of the functionality of a base station (e.g., a gNB-DU, a gNB-CU, or the like). Note that in one example embodiment the RAN node 110 is a base station and, as such, the RAN node 110 is sometimes referred to herein as a base station 110. The RAN 106 provides radio access to UEs, which in this example include UEs 112-1 through 112-5, that are in-coverage of the RAN 106. Note that the UEs 112-1 through 112-5 are also denoted herein as UE1 through UE5. Also note that the UEs 112-1 through 112-5 are generally referred to individually as UE 112 and collectively as UEs 112.

In the embodiments of the solution described herein, a master topology function 114 works together with slave topology functions 116-1 through 116-5 (sometimes generally referred to individually as slave topology functions 116 and collectively as slave topology functions 116) to provide a topology function that determines a topology for a multi-path connection from a source wireless node to a target wireless node based on one or more application-level requirements of a particular application (e.g., a particular Ultra-Reliable Low-Latency (URLLC) application) that is to use the multi-path connection and capabilities of the UEs 112-1 through 112-5. In one embodiment, the multi-path connection is a multi-path D2D connection between a pair of UEs 112 including a source UE (denoted herein as source UE 112-S where the source UE 112-S can be any of the UEs 112 shown in FIG. 1) and a target UE (denoted herein as target UE 112-T, which may be any of the UEs 112 shown in FIG. 1 other than the UE 112 that is the source UE 112-S). In another embodiment, the target UE 112-T for the multi-path connection is in-coverage of the RAN node 110, and the multi-path connection includes a direct link between the RAN node 110 and the target UE 112-T and one or more multi-hop links from the RAN node 110 to the target UE 112-T through one or more other UEs 112 acting as relays (denoted herein as relay UEs 112-R). Thus, in this case, the RAN node 110 is the source wireless node. In yet another embodiment, the target UE 112-T for the multi-path connection is out-of-coverage of the RAN node 110, and the multi-path connection includes two or more multi-hop links from the RAN node 110 to the target UE 112-T through one or more other UEs 112 acting as relays (denoted herein as relay UEs 112-R). Again, in this case, the RAN node 110 is the source wireless node.

FIG. 1 illustrates an example for an application 118 (also denoted as "Application #M"). In the example for the application 118 (Application #M), based on the application-level requirement(s) of the application 118 and the capabilities of the UEs 112, the master topology function 114 works together with the slave topology functions 116 to determine a topology for a multipath D2D link from UE 112-1 that includes a first path formed by a multi-hop D2D link from UE 112-1 to UE 112-3 through UE 112-4 (sometimes denoted herein as multi-hop D2D link UE1→UE4→UE3) and a second (simultaneous) path formed by a direct D2D link from UE 112-1 to UE 112-3 (denoted as direct D2D link UE1→UE3). Note that data for the particular application may, for example, be communicated between a node running Application #M or a component of Application #M (e.g., a server connected to the 3GPP domain 102 via a private or public network) and the UE 112-3 may be sent via the 3GPP domain 102 to UE 112-1 via the RAN node 110, in which case the RAN node 110 is the source wireless node and the UE 112-3 is the target wireless node (i.e., the target UE 112-T). The UE 112-1 then transmits this data to the UE 112-3 via the multi-path D2D connection from UE 112-1 to UE 112-3. As another example, Application #M is running on UE 112-1, and the data for Application #M is transmitted from UE 112-1 to UE 112-2 via the multi-path D2D connection, in which case the UE 112-1 is the source wireless node (i.e., the source UE 112-S) and the UE 112-3 is the target wireless node (i.e., the target UE 112-T). Note that, in a similar manner, the master topology function 114 and the slave topology functions 116 work together to determine topologies for multi-path D2D connections for other applications, such as application 120 (also denoted as Application #P), based on the application-level requirement(s) of those applications.

The master topology function 114 is, in one example, implemented in or in association with the RAN node 110. For instance, the master topology function 114 may be implemented in a Mobile Edge Computing (MEC) node associated with the RAN node 110. In another example, the master topology function 114 is implemented in the core network 104. In yet another example, the master topology function 114 is implemented in the cloud and there may be synergy gains from co-location of the applications that need to be served. The slave topology functions 116-1 through 116-5 are implemented at the respective UEs 112-1 through 112-5.

The ProSe function 108 is, in this example, the ProSe function defined in 3GPP that can provide device discovery and device communication services. The ProSe function 108 interfaces to the master topology function 114 via the PC2 interface. The ProSe function 108 could, for example, perform authentication of the UEs 112. Note that the ProSe function 108 is only an example of a function that could be used by the master topology function 114 for obtaining information about the locations of the UEs 112. Other equivalent functions can alternatively be used. For example, if the UEs 112 are MTC devices operating on a factory floor, other functions for obtaining the locations and trajectories of the UEs 112 are known and could be used by the master topology function 114. Also, other authentication mechanisms may be used.

The interfaces illustrated in FIG. 1 are as follows:

PC1: Application to UE communication interface,

PC2: ProSe function/3GPP network to application server communication interface,

PC3: UE to ProSe function communication interface, and

PC5: UE to UE communication interface.

Figure 2:
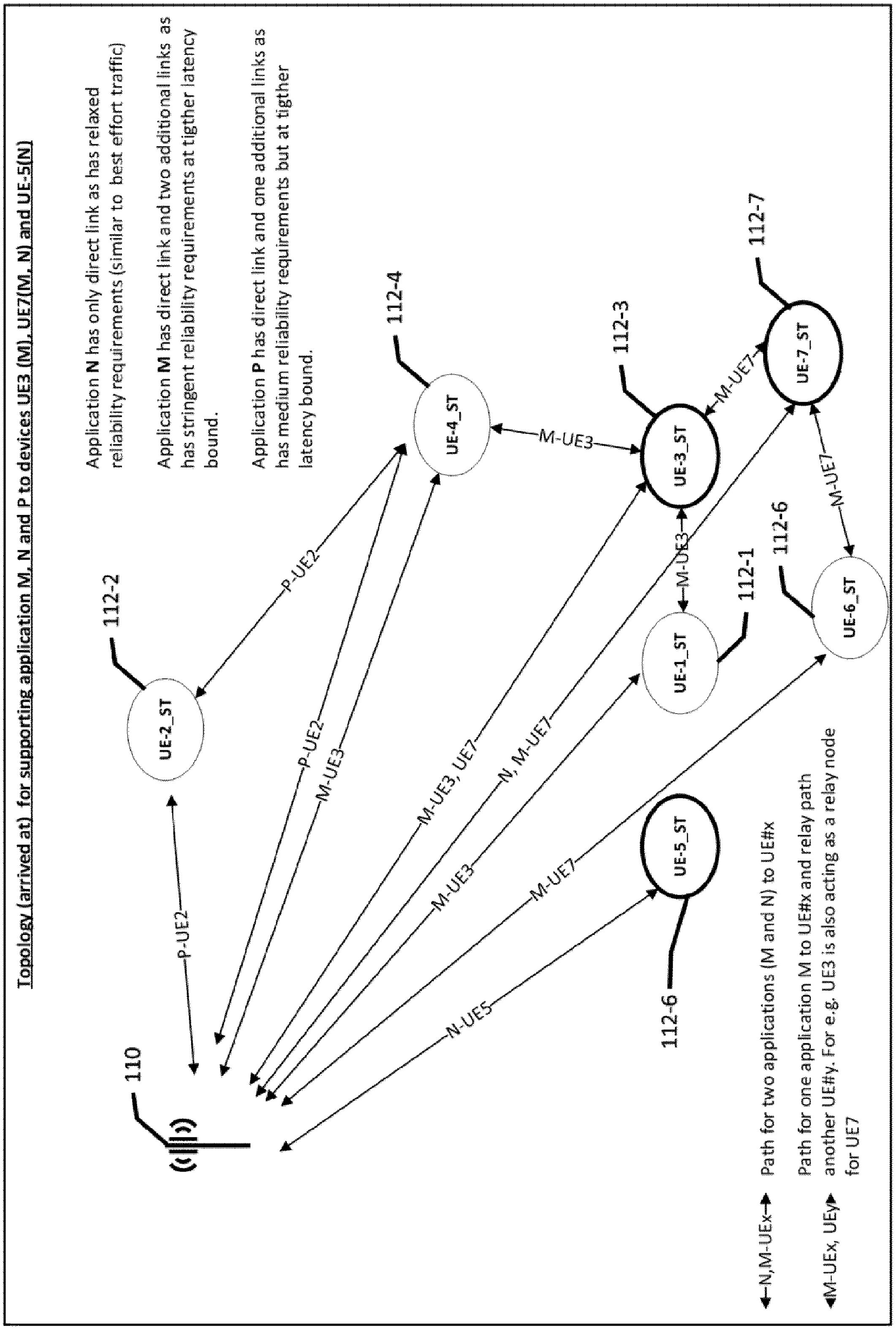
FIG. 2 illustrates examples of topologies that may be determined by the master topology function of FIG. 1 in accordance with embodiments of the present disclosure.

In the example of FIG. 1 for Application #M, the multi-path connection for which the topology is determined is a multi-path D2D connection from the source UE 112-1 to the target UE 112-3. However, in another embodiment, the multi-path connection is a multi-path connection from the RAN node 110 to a target UE 112-T, where the multi-path connection includes at least two links (paths) at least one of which includes a direct D2D link or a multi-hop D2D link. In this regard, FIG. 2 illustrates examples of topologies that may be determined by the master topology function 114 in accordance with embodiments of the present disclosure. For these examples, there are three applications M, N, and P having different application-level requirements. In these examples, the application-level requirements are reliability requirements with bounded latency, wherein the reliability requirements are relaxed (e.g., Application N seen as equivalent to best effort, Application P is medium, and Application M is most stringent). Note that the topologies include both direct links (lowest latency) from the source wireless node, which is the RAN node 110, and the target UE 112-T, and redundant multi-hop links (for additional robustness) that also satisfy the latency requirements of the respective applications.

In FIG. 2, the target UEs for Application M are UEs 112-3 and 112-7, the target UE for Application N is UE 112-5, and the target UE for Application P is UE 112-2. In order to support Application M (e.g., motion control), the master topology function 114 determines a topology for a multi-path connection from the RAN node 110 to the target UE 112-7 for Application M that includes: (1) a direct link from the RAN node 110 to the target UE 112-7, (2) a multi-hop link from the RAN node 110 to the target UE 112-7 via UE 112-3 acting as a relay, and (3) a multi-hop link from the RAN node 110 to the target UE 112-7 via UE 112-6 acting as a relay, in order to be able meet Application M's stringent reliability requirements at a tighter latency bound. In a similar manner, the master topology function 114 determines a topology for a multi-path connection from the RAN node 110 to the target UE 112-3 for Application M that includes: (1) a direct link from the RAN node 110 to the target UE 112-3, (2) a multi-hop link from the RAN node 110 to the target UE 112-3 via UE 112-1 acting as a relay, and (3) a multi-hop link from the RAN node 110 to the target UE 112-3 via UE 112-4 acting as a relay. The master topology function 114 determines a topology for a multi-path connection from the RAN node 110 to the target UE 112-2 for Application P that includes: (1) a direct link from the RAN node 110 to the target UE 112-2 and (2) a multi-hop link from the RAN node 110 to the target UE 112-2 via UE 112-4 acting as a relay. Thus, this multi-path connection has only two paths because Application P has medium reliability requirements. The master topology function 114 determines a topology for a link from the RAN node 110 to the target UE 112-5 for Application N that includes only a direct link from the RAN node 110 to the target UE 112-5 because it has relaxed reliability requirements.

Note that, in FIG. 2, UE-#_ST indicates the slave topology function 116 residing on the UE-#. The master topology function 114 is not shown in FIG. 2.

The following description explains the functionality of master and slave topology functions 114 and 116 and details on message exchange/signaling during the topology determination process.

For the description below, the following terms are used and are defined as follows:

Potential Candidate UE: A UE 112 that has the potential to act as a node in a topology for a multi-path connection. As described below, potential candidate UEs are evaluated by the master topology function 114 to determine a candidate topology for multi-path connection to a target UE 112-T. As discussed below, the potential candidate UEs can be chosen based on, for example, any one or more of following criteria: previous history (if available) as a relay in a topology for a multi-path connection, location (e.g., proximity to the target UE 112-T or proximity to cell boundary), probability of LoS with the RAN node 110, etc.

Candidate Topology: A candidate topology is a topology determined by the master topology function 114 using at least a subset of the potential candidate UEs. The potential candidate UEs that are included in the candidate topology (e.g., based on feasibility) are referred to herein as candidate UEs. As discussed below, the candidate topology may be determined using a subset of the potential candidate UEs that are determined to be feasible as relay nodes based on feasibility reports obtained from the potential candidate UEs. In one embodiment, potential candidate UEs that are determined to be feasible are candidate UEs that form the candidate topology.

Confirmed Topology: A confirmed topology is a candidate topology that is confirmed by the master topology function 114 based on a QoS predetermination procedure, as described below. The QoS predetermination procedure may include QoS predetermination between the candidate UEs in the connection order in the candidate topology. A UE in the confirmed topology is referred to herein as a confirmed UE.

Feasibility Report: A report sent by a slave topology function 116 to the master topology function 114 indicating the feasibility of the respective potential candidate UE being a relay in the topology based on a current (e.g., and near-future) snapshot of UE capabilities and also the application-level requirements. The feasibility report can also contain the link quality history.

Target UE: A UE 112 that is the intended receiver of a multi-path connection. For example, in a closed loop motion control application, the UE on which an actuator resides is the target UE for a multi-path connection for the closed loop motion control application.

Figure 3:
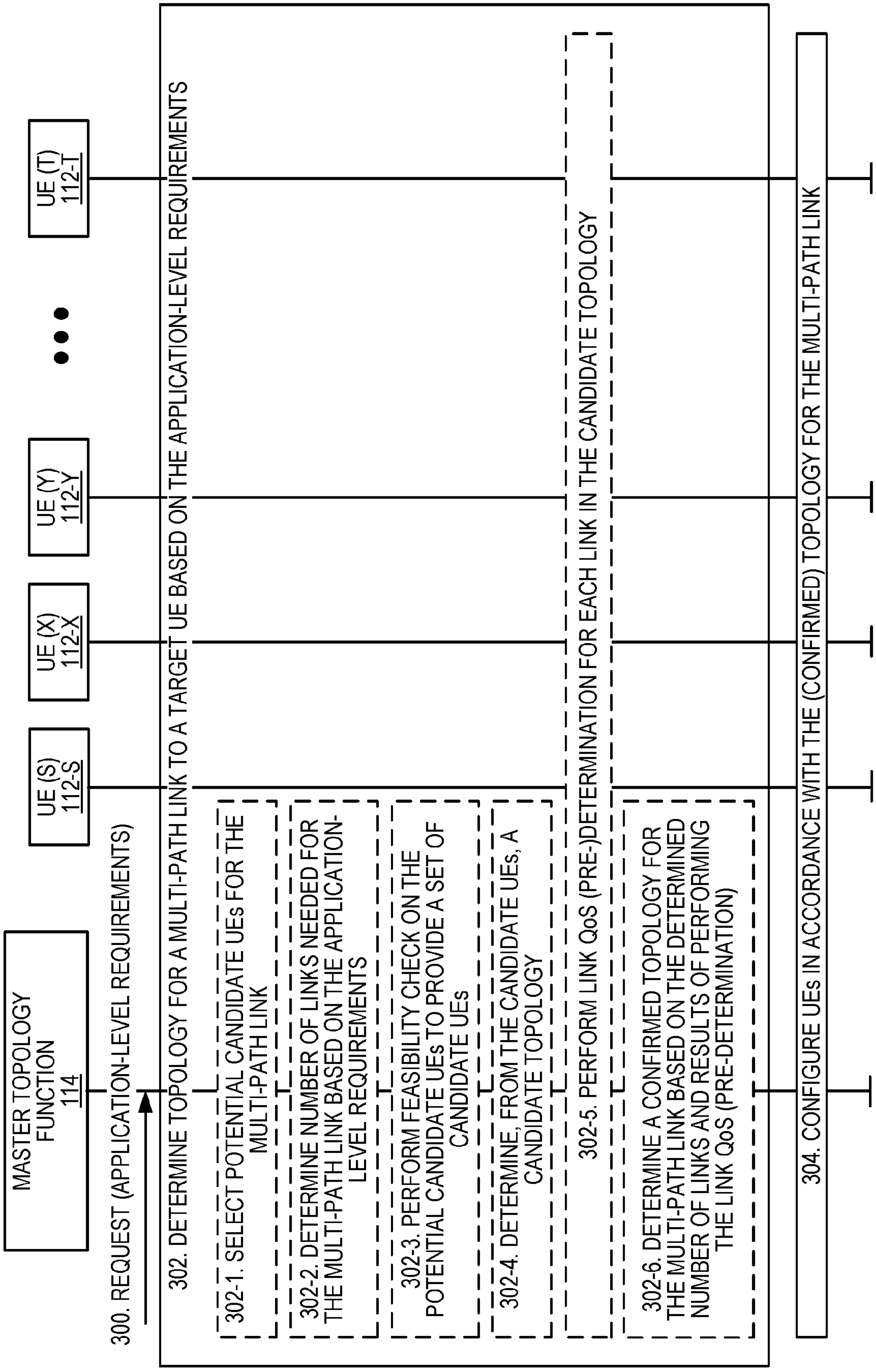
FIG. 3 illustrates the operation of the communication system of FIG. 1 to determine and use a multi-path connection based on application-level requirements of an application to use the multi-path connection in accordance with embodiments of the present disclosure.

FIG. 3 illustrates the operation of the communication system 100 of FIG. 1 to determine and use a multi-path connection based on application-level requirements of an application to use the multi-path connection in accordance with embodiments of the present disclosure. Note that optional steps are represented by dashed lines/boxes. As illustrated, the master topology function 114 receives a request from a particular application for a topology for a multi-path connection to a target UE 112-T (step 300). The request may originate from, for example, a node on which the particular application or a component of the particular application is running (e.g., a server computer connected to the 3GPP domain 102 via a public or private network, a network node in the 3GPP domain 102, or a UE 112 such as, e.g., a source UE 112-S for the multi-path connection). The request includes information that directly or indirectly indicates one or more application-level requirements of the particular application for which the multi-path connection topology is requested. This information may be information that directly indicates the application-level requirement(s) or information that indicates the particular application where the master topology function 114 is able to obtain the application-level requirements for the indicated application, e.g., from storage or from another network node. In one embodiment, the particular application is a URLLC application, and the application-level requirement(s) for the URLLC application includes an application-level latency requirement, an application-level Quality of Service (QoS) requirement, and/or the like. The request also includes information that indicates the target UE 112-T.

The master topology function 114 works with the slave topology functions 116 to determine a topology for the multi-path connection from a source wireless node (e.g., the RAN node 110 or a source UE 112-S) to the target UE 112-T based on the application-level requirement(s) for the particular application and capabilities of the UEs 112 (step 302). More specifically, in one embodiment, the master topology function 114 selects potential candidate UEs, from among the UEs 112, for the multi-path connection (step 302-1). This selection of the potential candidate UEs is based on locations of the UEs 112 (e.g., proximity to the target UE 112-T) and/or capabilities of the UEs 112. In one embodiment, the master topology function 114 obtains a set of UEs, from among the UEs 112, that can potentially serve as relay nodes between the source wireless node and the target UE 112-T based on the locations of the UEs 112. Note that the locations of the UEs 112 may be obtained from the ProSe function 108. Alternatively, the master topology function 114 may query the ProSe function 108 to obtain the set of UEs, where the query may include, for example, information that identifies the target UE 112-T. The set of UEs determined based on location may then be filtered based on the capabilities of those UEs to determine the potential candidate UEs for the multi-path connection. Here, the capabilities of the UEs include one or more UE capabilities related to operation as a relay node for a multi-hop link. These capabilities may include, for example, the capability to operate as a relay node, (estimated) time needed to switch from receive mode to transmit mode when operating as a relay, QoS guaranteeing capabilities of the UE, energy related capability(ies) (e.g., battery capacity, current battery level, etc.), reliability history (e.g., past failure rate), Radio Access Technology (RAT) used by the UE (e.g., NR, LTE, etc.), or the like, or any combination thereof. In addition, the selection of the potential candidate UEs may consider known or predicted future locations of the UEs 112. For example, if a particular UE 112 is an MTC device that moves in a known manner throughout a known environment (e.g., within a factory), then information about this known movement can be used to select (or not select) the UE 112 as a potential candidate UE for the multi-path connection.

The master topology function 114 determines the number of links (or paths) needed for the multi-path connection based on the application-level requirement(s) of the particular application that is to use the multi-path connection (step 302-2). In one embodiment, a mapping between different application-level requirements and numbers of links (i.e., paths) needed to satisfy those application-level requirements is predetermined or preconfigured at the master topology function 114. This mapping is used to determine the number of links needed to satisfy the application-level requirement(s) of the particular application that is to use the multi-path connection. In another embodiment, the number of links needed for the multi-path connection based on the application-level requirement(s) of the particular application that is to use the multi-path connection is determined by the master topology function 114 using a predefined or preconfigured function. One example is described below in detail. Note that, if the number of potential candidate UEs selected in step 302-1 is insufficient to provide the determined number of links needed for the multi-path connection, then the application may be notified that the multi-path connection cannot be established or that the multi-path connection may not be able to satisfy the application-level requirement(s).

The master topology function 114 may also perform a feasibility check on the potential candidate UEs to thereby provide a set of candidate UEs (step 302-3). The feasibility check removes potential candidate UEs that cannot satisfy requirements needed to act as a relay when considering the application-level requirement(s). The feasibility check may consider static or semi-static parameters such as, for example, a current application-level load at the potential candidate UEs. Thus, for example, if a potential candidate UE is already acting as a relay for another multi-path connection such that the UE is not able to currently operate as a relay for this multi-path connection, then that potential candidate UE is removed (i.e., is not included in the set of candidate UEs).

The master topology function 114 determines, from the candidate UEs, a candidate topology for the multi-path connection (step 302-4). The candidate topology includes at least the determined number of links needed to satisfy the application-level requirement(s). In addition, the candidate topology may include one or more additional links, e.g., for redundancy or fallback. The candidate multi-path connection includes either: (a) two or more multi-hop links from the source wireless node to the target UE 112-T or (b) both a direct link from the from the source wireless node to the target UE 112-T and one or more multi-hop links from the source wireless node to the target UE 112-T. In one embodiment, the candidate topology includes all of the candidate UEs. For example, in one embodiment, each of the links in the multi-path connection includes a single relay, which is one of the candidate UEs. In this case, determining the candidate topology may simply be determining that all of the candidate UEs are to be used as relays in respective links. As another example, there may be more candidate UEs than needed to provide the determined number of links needed to satisfy the application-level requirement(s), in which case the master topology function 114 may select a subset of the candidate UEs to use for the candidate topology to provide the needed number of links or the needed number of links plus one or more additional links for potential fallback links in the event of a link failure.

The master topology function 114 initiates a QoS (pre-) determination procedure in which a QoS for each link, or at least for each link that includes at least one D2D link, in the candidate topology is determined and reported to the master topology function 114 (step 302-5). As discussed below, in one embodiment, the QoS predetermination procedure uses transmission of synthetic packets over each direct D2D link (i.e., each direct D2D link between adjacent UEs 112 in a multi-hop link). In one embodiment, the master topology function 114 configures the slave topology functions 116 of the candidate UEs in the candidate topology as a transmitter (i.e., source UE 112-S in the case where the source wireless node is a UE 112, or UE 112 having link to the RAN node 110 in the scenario in which the RAN node 110 is the source wireless node), a relay, or a receiver (i.e., target UE 112-T) and may also configure one or more parameters used for synthetic packet generation such as, e.g., packet size, time bound, etc. The slave topology functions 116 of the candidate UEs then operate to transmit/relay/receive synthetic packets in accordance with their configurations. At least some of the candidate UEs then generate respective QoS reports and send them to the master topology function 114. These QoS reports may include, for example, Packet Success Rate (PSR), actual transmit mode to receive mode switching time when operating in relay mode, and/or the like.

Based on the QoS reports obtained via the QoS (pre-) determination procedure and the determined number of links needed for the multi-path connection, the master topology function 114 determines a confirmed topology for the multi-path connection (step 302-6). For example, in one embodiment, the candidate topology includes more than the needed number of links for the multi-path connection, and the master topology function 114 selects at least the needed number of links for the multi-path connection from the candidate topology based on the QoS reports. In one embodiment, the confirmed topology includes a primary link and a number of redundant links, where the number of redundant links is equal to or greater than the needed number of link where the needed number of links is the determined number of links needed for the multi-path connection. In one embodiment, the primary link is a best link from among the links in the candidate topology in terms of one or more parameters (e.g., highest packet success rate as determined from the respective QoS report(s)), and the redundant link(s) are other links from among the links in the candidate topology that satisfy a threshold criterion (e.g., packet success rate is greater than a threshold, where this threshold may be based on the application-level requirement(s) of the particular application).

Note that, in one embodiment, the redundant links are reserved as one(s) with more risk (e.g., lower packet success rate but still meets the threshold) so that topology does not have to be re-determined in case QoS cannot be met with the initial set of links.

The master topology function 114 then configures the wireless nodes (i.e., UEs 112 and, in some embodiments, the RAN node 110 that are included in the confirmed topology) in accordance with the confirmed topology for the multi-path connection (step 304). In other words, the master topology function 114 configures the wireless nodes that are in the confirmed topology to operate transmit and/or receive packets for the particular application in accordance with the confirmed topology. Particularly for the relay UEs 112-R, the configuration may include, in some embodiments, one or more parameters related to operation as a relay for the multi-path connection such as, e.g., relay type (e.g., amplify-and-forward or decode-and-forward), transmit/receive power, frequency band(s), or the like. The UEs 112 that are in the confirmed topology then operate as configured to provide the multi-path connection from the source wireless node to the target UE 112-T for the particular application.

Figure 4A:
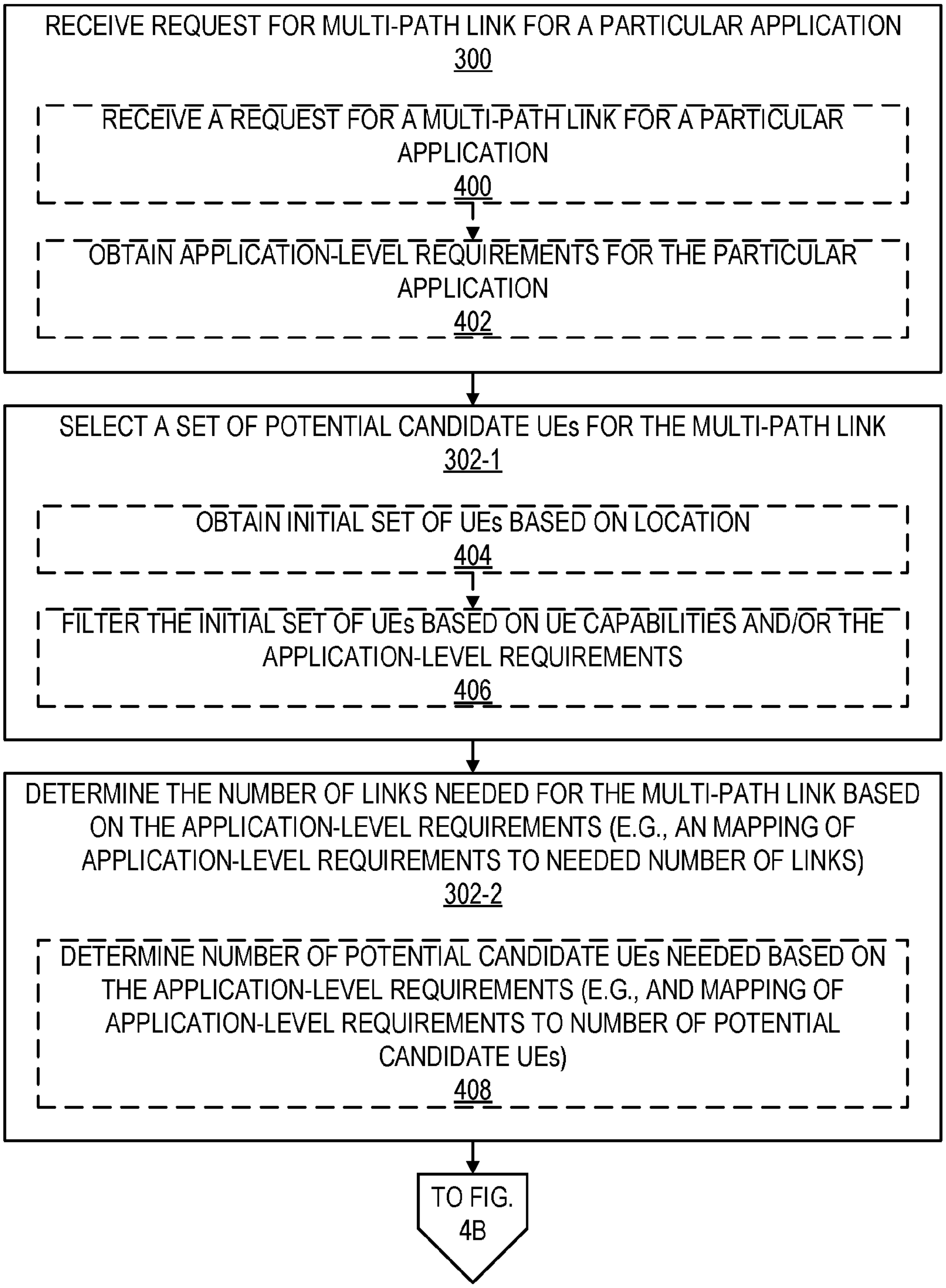
FIGS. 4A through 4C provide a flow chart that illustrates the operation of the master topology function in more detail, in accordance with an embodiment of the present disclosure.
Figure 4B:
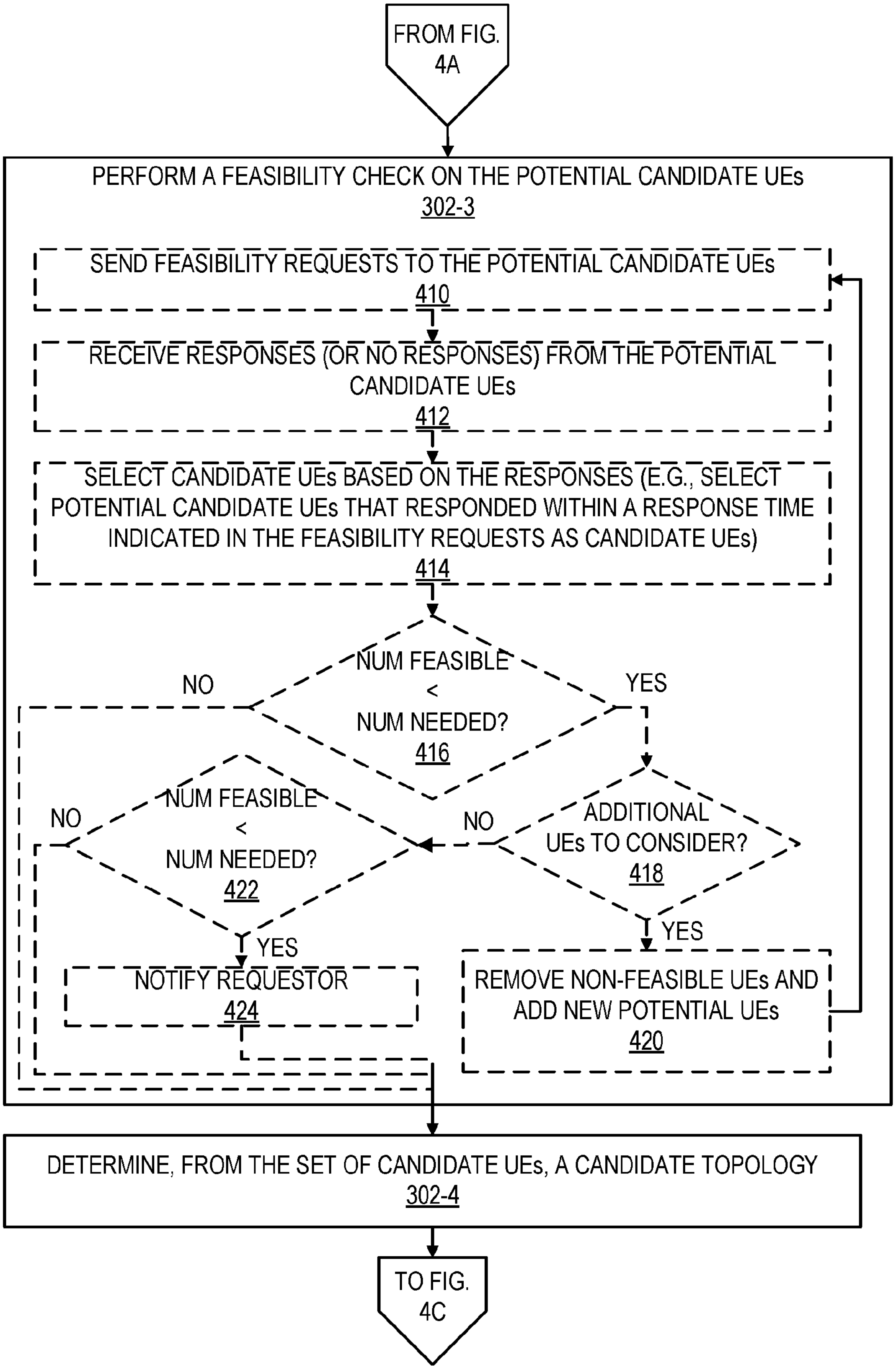
Figure 4C:
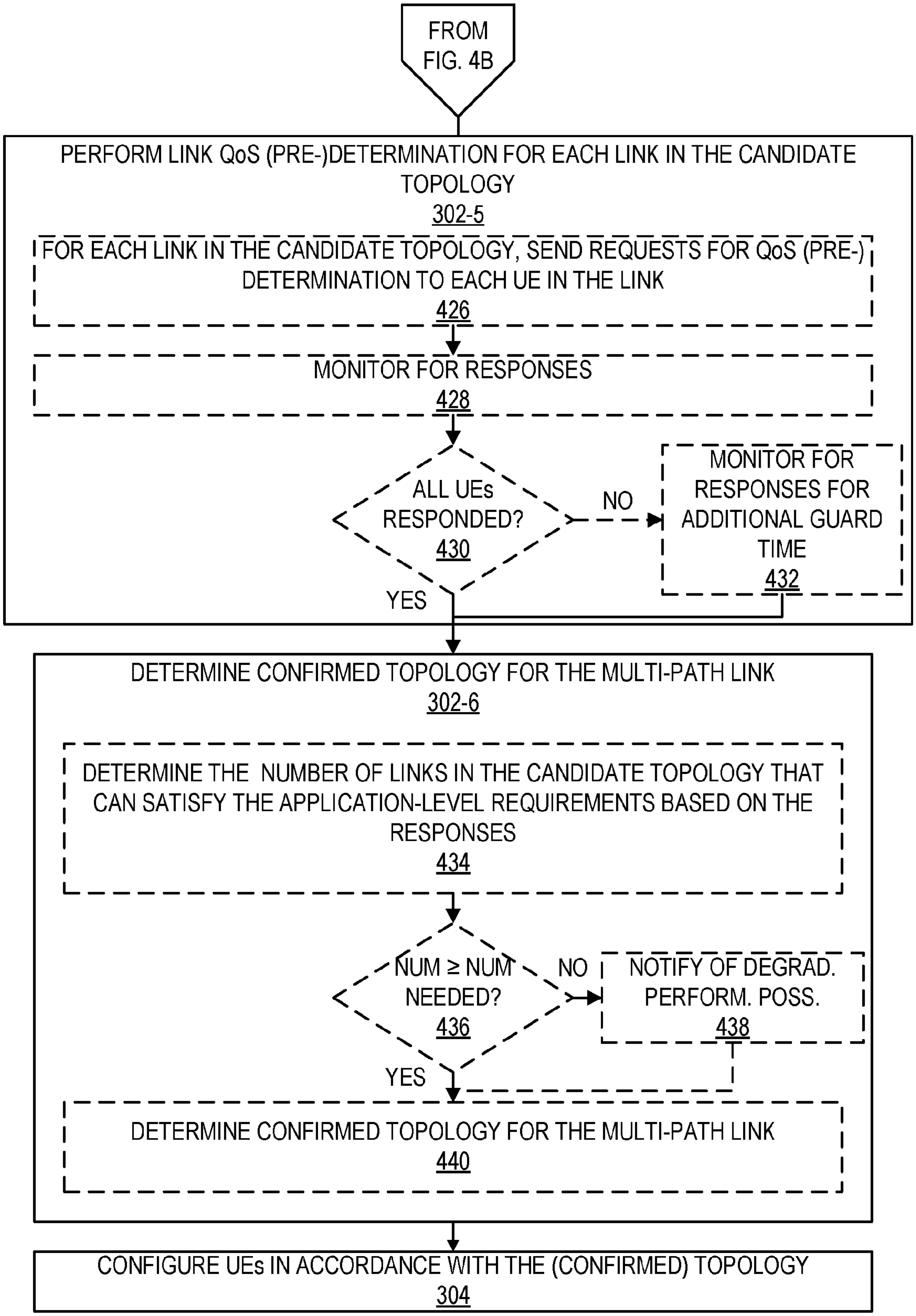

FIGS. 4A through 4C provide a flow chart that illustrates the operation of the master topology function 114 in more detail, in accordance with an embodiment of the present disclosure. Note that optional steps are represented by dashed lines/boxes. This process is a more detailed version of an embodiment of the process illustrated in FIG. 3 with regard to the master topology function 114. As such, steps in the flow chart that correspond to steps in the procedure of FIG. 3 are indicated using the same reference numbers as used in FIG. 3.

As illustrated, the master topology function 114 receives a request for a topology for a multi-path connection to a target UE 112-T for a particular application (step 300). As discussed above, the request may originate from, for example, a node on which the particular application or a component of the particular application is running (e.g., a server computer connected to the 3GPP domain 102 via a public or private network, a network node in the 3GPP domain 102, or a UE 112 such as, e.g., a source UE 112-S for the multi-path connection). The request includes information that directly or indirectly indicates one or more application-level requirements of the particular application for which the multi-path connection topology is requested, as discussed above. The request also includes information that indicates the target UE 112-T. In one embodiment, in regard to receiving the request, the master topology function 114 receives the request, where the request comprises information that indicates the particular application (step 400). The master topology function 114 then obtains the application-level requirement(s) for the particular application, e.g., from storage or from another network node (step 402).

The master topology function 114 selects a set of potential candidate UEs, from among the UEs 112, for the topology (step 302-1). In one embodiment, in order to select the potential candidate UEs, the master topology function 114 obtains an initial set of UEs based on locations of the UEs 112 (e.g., proximity to the target UE 112-T) (step 404). For example, the initial set of UEs may include the UEs 112 that are in proximity to the target UE 112-T. The master topology function 114 then filters the initial set of UEs based on the capabilities of the UEs 112 in the initial set of UEs and/or the application-level requirement(s) of the particular application to provide the set of potential candidate UEs that can potentially serve as relay nodes between the source wireless node and the target UE 112-T (step 406). Note that the locations of the UEs 112 may be obtained from the ProSe function 108 and used by the master topology function 114 in step 404 to determine the initial set of UEs. Alternatively, the master topology function 114 may query the ProSe function 108 to obtain the initial set of UEs, where the query may include, for example, information that identifies the target UE 112-T. Also note that the capabilities of the UEs 112 may be known to the master topology function 114 or obtained by the master topology function 114 from the UEs 112 or from a network node in the 3GPP domain 102. As discussed above, the capabilities of the UEs include one or more UE capabilities related to operation as a relay node for a multi-hop link. These capabilities may include, for example, capability to operate as a relay node, (estimated) time needed to switch from receive mode to transmit mode when operating as a relay, QoS guaranteeing capabilities of the UE, energy related capability(ies) (e.g., battery capacity, current battery level, etc.), reliability history (e.g., past failure rate), RAT used by the UE (e.g., NR, LTE, etc.), or the like, or any combination thereof. In addition, the selection of the potential candidate UEs may consider known or predicted future locations of the UEs 112. For example, if a particular UE 112 is an MTC device that moves in a known manner throughout a known environment (e.g., within a factory), then information about this known movement can be used to select (or not select) the UE 112 as a potential candidate UE for the multi-path connection.

The master topology function 114 determines the number of links (or paths) needed for the multi-path connection based on the application-level requirement(s) of the particular application that is to use the multi-path connection (step 302-2). In one embodiment, this is done by determining the number of UEs 112 needed based on the application-level requirement(s) of the particular application (step 408). As discussed above, in one embodiment, a mapping between different application-level requirements and numbers of links (i.e., paths) needed to satisfy those application-level requirements is predetermined or preconfigured at the master topology function 114. This mapping is used to determine the number of links needed to satisfy the application-level requirement(s) of the particular application that is to use the multi-path connection. In another embodiment, the number of links needed for the multi-path connection based on the application-level requirement(s) of the particular application that is to use the multi-path connection is determined by the master topology function 114 using a predefined or preconfigured function. One example is described below in detail. Note that, if the number of potential candidate UEs selected in step 302-1 is insufficient to provide the determined number of links needed for the multi-path connection, then the application may be notified that the multi-path connection cannot be established or that the multi-path connection may not be able to satisfy the application-level requirement(s).

The master topology function 114 may also perform a feasibility check on the potential candidate UEs to thereby provide a set of candidate UEs (step 302-3). In one embodiment, in order to perform the feasibility checks, the master topology function 114 sends a feasibility request to each of the potential candidate UEs (step 410). Note that, in one embodiment, potential candidate UEs are assumed to be in-coverage. The master topology function 114 receives responses from at least some of the potential candidate UEs (step 412). Based on the response or lack of responses from the potential candidate UEs, the master topology function 114 selects a subset of the potential candidate UEs that are feasible for the topology as the set of candidate UEs (step 414). The master topology function 114 may then check whether the number of candidate UEs is less than the number needed to provide needed number of links (i.e., less than the needed number of links in the embodiment in which each link includes only a single relay) (step 416). If so, the master topology function 114 determines whether additional UEs can be added as new potential candidate UEs (step 418). If so, new potential candidate UEs are added and non-feasible UEs are removed from the set of potential candidate UEs (step 420), and the process returns to step 410 and is repeated. Note that steps 410 and 412 may only be repeated for the new potential candidate UEs. Returning to step 418, if there are no additional UEs to be considered, the master topology function 114 determines whether the number of feasible UEs (i.e., the number of identified candidate UEs) is still less than the number needed to provide the needed number of links (step 422). If so, the master topology function 114 may notify the requestor that a degraded topology is possible (step 424). Note that in an extreme case where no feasible UEs are identified, the notification in step 424 may be that no topology is possible and the process would end. If the number of candidate UEs after the feasibility check is sufficient to provide the needed number of links or if the number of candidate UEs after the feasibility check is sufficient to provide a degraded topology, the procedure proceeds to step 302-4 where the master topology function 114 determines a candidate topology for the multi-path connection using the candidate UEs, as described above (step 302-4).

The master topology function 114 initiates a QoS (pre-) determination procedure in which a QoS for each link, or at least for each link that includes at least one D2D link, in the candidate topology is determined and reported to the master topology function 114 (step 302-5). More specifically, in one embodiment, for each link in the candidate topology (or at least for each link that includes at least one direct D2D link), the master topology function 114 sends a request for QoS (pre-)determination to each UE 112 in the link (step 426) and monitors for resulting QoS reports from the UEs 112 (step 428). Note that, in one embodiment, the direct link from the RAN node 110 to the target UE 112-T is assumed to always be used and, as such, this link is not included in QoS (pre-) determination. Additional details of the QoS (pre-)determination procedure are provided below with respect to FIG. 13. In one embodiment, the master topology function 114 determines whether all of the UEs 112 have responded to the QoS predetermination requests (step 430). If not, the master topology function 114 continues to monitor for responses for an additional amount of time that is referred to herein as a guard time (step 432).

Once the QoS (pre-)determination procedure is complete, the master topology function 114 determines a confirmed topology for the multi-path connection based on the QoS reports and the candidate topology (step 302-6). More specifically, in one embodiment, the master topology function 114 determines the number of links in the candidate topology that satisfy one or more requirements related to the application-level requirements based on the QoS reports (step 434). For example, the one or more application-level requirements may include a threshold packet success rate, where "success" is the reception of a packet correctly within a defined latency bound. This defined latency bound may be defined by or based on the application-level requirement(s) for the particular application. If the number of links determined in step 434 is not greater than or equal to the determined number of links needed for the multi-path connection based on the application-level requirement(s) of the particular application (step 436, NO), the master topology function 114 may notify the application of the possibility of degraded performance on the multi-path connection (step 438) and then proceeds to step 440. If the number of links determined in step 434 is greater than or equal to the determined number of links needed for the multi-path connection based on the application-level requirement(s) of the particular application or after the optional notification of step 438 (step 436, YES), the process proceeds to step 440. Whether proceeding from the "yes" branch of step 436 or from step 438, the master topology function 114 determines the confirmed topology for the multi-path connection based on the candidate topology and the QoS reports (step 440). For example, in one embodiment, the candidate topology includes more than the needed number of links for the multi-path connection, and the master topology function 114 selects at least the needed number of links for the multi-path connection from the candidate topology based on the QoS reports, as discussed above. In one embodiment, the confirmed topology includes a primary link and a number of redundant links, where the number of redundant links is equal to or greater than the needed number of links where the needed number of links is the determined number of links needed for the multi-path connection. In one embodiment, the primary link is a best link from among the links in the candidate topology in terms of one or more parameters (e.g., highest packet success rate as determined from the respective QoS report(s)), and the redundant link(s) are other links from among the links in the candidate topology that satisfy a threshold criterion (e.g., packet success rate is greater than a threshold, where this threshold may be based on the application-level requirement(s) of the particular application).

The master topology function 114 then configures the UEs 112 that are included in the confirmed topology in accordance with the confirmed topology for the multi-path connection, as discussed above (step 304).

As discussed above, one part of the process performed by the master topology function 114 to determine a topology for a multi-path connection is determining the number of links needed for the multi-path connection based on the application-level requirement(s) of the particular application that is to use the multi-path connection. As discussed above, in one embodiment, the number of links needed is determined based on a predefined or preconfigured mapping of different application-level requirements (or different combinations of application-level requirements) to the number of links needed. As also discussed above, in another embodiment, the number of links needed is determined based on a predefined or preconfigured function of the application-level requirements. In this regard, one example of a heuristic for determining the number of links needed for the multi-path connection based on the application-level requirement(s) for the particular application is provided below. In this particular example, the application-level requirement(s) is an application-level QoS.

The QoS to needed number of links heuristic enables the master topology function 114 to quickly determine the number of links needed for the particular application. After using this heuristic to determine the number of links needed and determining the topology for the multi-path connection to be used by the particular application, a learning procedure can be used to update the heuristic based on QoS results from an actual data transmission using the determined topology such that, if there are biases or improvements needed, the heuristic is updated for the next topology determination. In other words, the heuristic is not restrictive and can be adapted to the environment in which it is deployed. In this example embodiment, the inputs for the heuristic are the QoS parameters for the particular application (e.g., packet success rate, latency bound, etc.). These input parameters are by no means exhaustive and anyone skilled in the art can adjust the parameters used and/or the number of parameters based on the particular application(s). For example, the input parameters may further include Tsurvival (which is the survival time an application can live in case a packet/command is missed), Tperiod if it is sending periodic data, etc.

In one example embodiment, the heuristic is described by the following pseudo-code:

```
----- start of pseudo-code based heuristic description-----
  Topology__found=0; -- clear the topology found flag
  IF (Best effort or low reliability) THEN
    n__PC__UEs = 0; --direct transmission only
  ELSE IF (the application (in the past) or similar application has made requests)
THEN
  n__PC__UEs = MIN (n__PC__UEs__historical, n__ini__UE); -- use minimum of (that
many # UE in the historical links or currently available UEs)
  ELSE -- compute new
  { -- outer code block
    IF (T_latency__bound =< T_latency__stringent) THEN -- T_latency__stringent(default value) =
1ms
    { -- inner code block
  n__PC__UEs = ((MIN (CEILING(r__nines/2), n__ini__UE)) - 1); -- subtract 1 to
remove direct tx path
      IF (n__PC__UEs > 0) THEN -- direct path only is not considered a
topology
  Topology__found=1; -- set the topology found flag
      ELSE
  Topology__found=0; -- clear the topology found flag
  IF (CEILING(r__nines/2)> n__ini__UE)) THEN
  check__link__status =1; -- to check if QoS criteria can still be satisfied with the
topology, start monitoring the status (e.g. link error rate) from the slave topology
function. It is also possible to given an early indication to the application.
  ELSE
  check__link__status =0;} -- inner code block
  ELSE { -- less stringent branch, use lesser number of links.
  n__PC__UEs = ((MIN (FLOOR(r__nines/2), n__ini__UE)) - 1); -- subtract 1 to remove
direct transmission path
  IF (n__PC__UEs > 0) THEN -- direct path only is not considered a topology
  Topology__found=1; -- set the topology found flag
  ELSE
  Topology__found=0; -- clear the topology found flag
  IF (FLOOR(r__nines/2)> n__ini__UE)) THEN
  check__link__status =1; -- to check if QoS criteria can still be satisfied with the
topology, start monitoring the status (e.g. link error rate) from the slave topology
function. It is also possible to give an early indication to the application.
  ELSE
  check__link__status =0;} -- inner code block
  } -- outer code block
  ----- end of pseudo-code description-----
```

In the pseudo-code above, the following definitions apply:

n_ini_UE=number of initial UEs that are returned by the ProSe function 108 based on location and/or based on earlier information from the slave topology functions 116 residing on the UE as to whether they performed well for an equivalent application or were facing temporary difficulty such as high workload preventing it from acting as a node in the topology;

n_PC_UE=number of potential candidate UEs;

r_nines=number of nines in the QoS requirement. For example, a 99.9999% packet success rate translates to six (6) nines and therefore r_nines=6;

$T_{latency\_bound}$=E2E latency within which the packet success rate should be achieved;

$T_{latency\_stringent}$=programmable parameter to switch the heuristic to be more/less aggressive;

"--" indicates a comment;

";" indicates end of a statement; and

"{ }" indicates a code block containing multiple statements.

Some notes regarding the pseudo-code are:

CEILING and FLOOR functions return non-negative integers.

MIN (x,y) returns minimum of x and y, where x and y are integers.

The topology found flag is, in one embodiment, updated (remains set or is cleared) after step 302 of FIG. 3.

$T_{latency\_stringent}$ is a programmable parameter to switch the heuristic to be more/less aggressive. For example, with $T_{latency\_stringent}$=1 millisecond (ms), an application requesting a 99.999% packet success rate (r_nines=5) with latency bound of 1 ms and getting n_ini_UE=5 would get n_PC_UE=2. If latency was relaxed to 3 ms, then n_PC_UEs=1.

Figure 5:
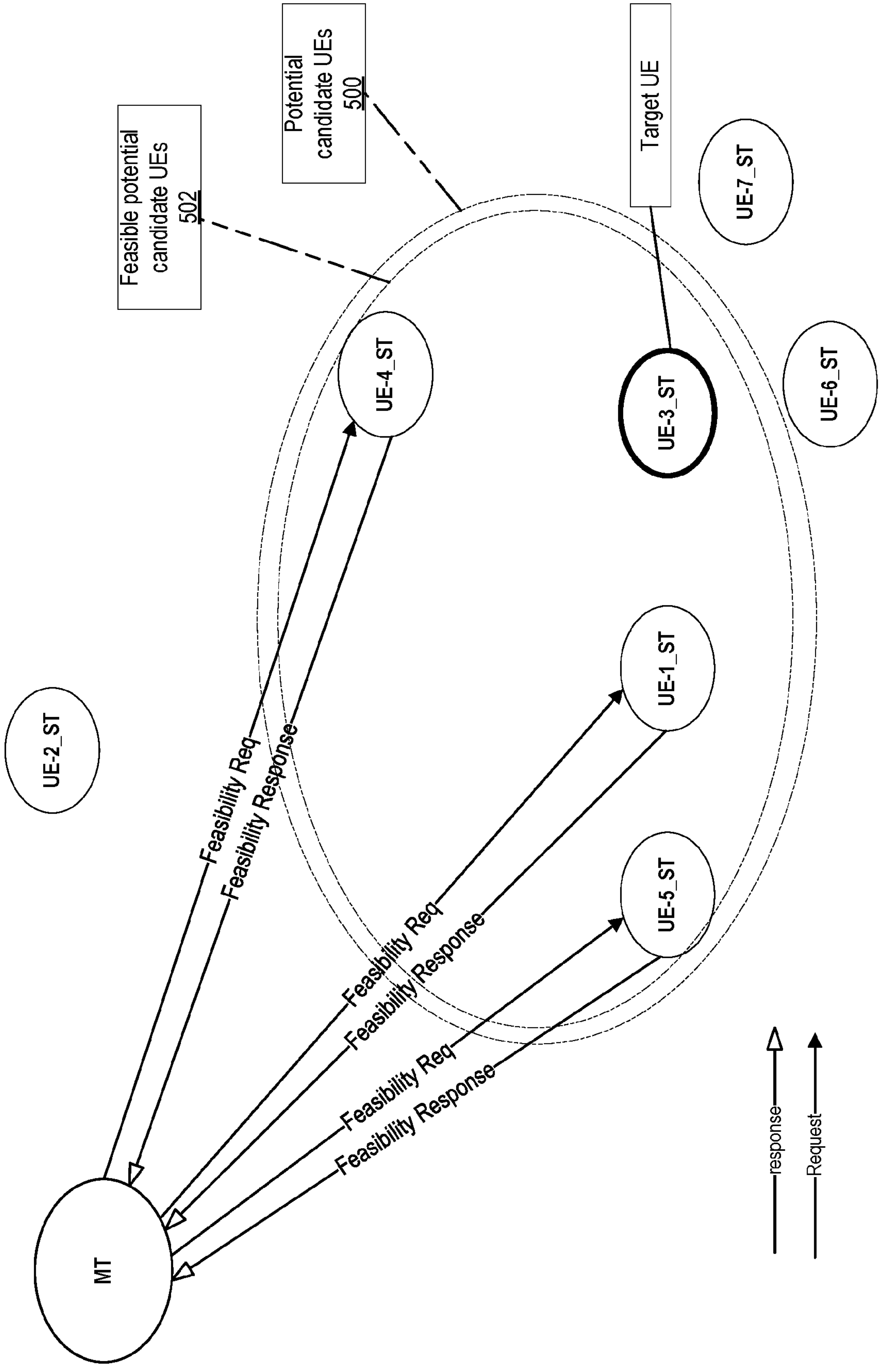
FIG. 5 illustrates one example of the feasibility check process in accordance with an embodiment of the present disclosure.

One potential enhancement is that n_ini_UE are tagged with the cell to which they belong so that the UEs that may interfere with each other can be considered mutually exclusive in the selection of n_PC_UEs from n_ini_UE. Now, the description will turn to the operation of the slave topology functions 116 at the UEs 112. In this regard, FIG. 5 illustrates one example of the feasibility check process. This example is an example of the feasibility check procedure performed when determining the multi-path connection topology shown in FIG. 2 for Application M with UE 112-3. As illustrated, the master topology function 114 sends feasibility check requests to each UE 112 in the set of potential candidate UEs, which in FIG. 5 are referenced as the set of potential candidate UEs 500. The potential candidate UEs 500 send feasibility responses to the master topology function 114 that indicate whether they are feasible and, optionally, if not, a reason that they are not feasible. Based on the feasibility responses, the master topology function 114 selects a subset of the potential candidate UEs 500 as a set of candidate UEs 502, as described above. Note that, in this example, all of the potential candidate UEs 500 are determined to be feasible and, as such, the set of candidate UEs 502 is the same as the set of potential candidate UEs 500; however, this will not always be true. Also note that the specific sets of UEs 500 and 502 shown in the example of FIG. 5 are only examples and are not to be seen as limiting.

Figure 6:
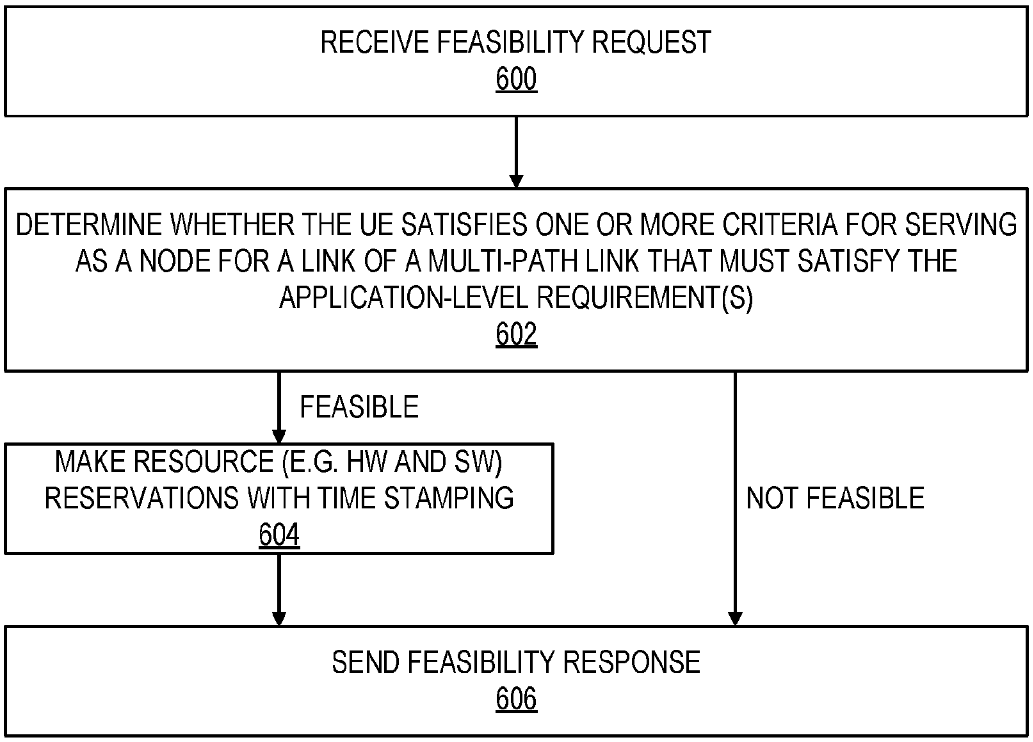
FIG. 6 is a flow chart that illustrates the operation of a slave topology function at a User Equipment (UE) that is selected as a potential candidate UE to receive and respond to a feasibility request from the master topology function in accordance with an embodiment of the present disclosure.

FIG. 6 is a flow chart that illustrates the operation of a slave topology function 116 at a UE 112 that is selected as a potential candidate UE to receive and respond to a feasibility request from the master topology function 114. As illustrated, the slave topology function 116 receives a feasibility request from the master topology function 114 (step 600). Responsive to the feasibility request, the slave topology function 116 determines whether the respective UE 112 satisfies one or more feasibility criteria for serving as a node (e.g., a relay node) in the topology for the multi-path connection for the particular application (step 602). The one or more feasibility criteria include one or more criteria based on static capabilities of the UE 112 (e.g., supported RAT(s), switching time for switching from receive mode to transmit mode, and/or the like) and/or one or more criteria based on semi-static or dynamic capabilities of the UE 112 (e.g., current application load, expected application load for a defined period of time (e.g., next X seconds, next X minutes, or the like). Note that the application load (also referred to as workload) may vary over time and is optionally considered for the feasibility check. In this regard, the slave topology function 116 or the UE 112 in general may include a workload characterization function that determines the application load/workload of the UE 112.

If the UE 112 is determined to be feasible, then the slave topology function 116 reserves resources (e.g., hardware and/or software resources) at the UE 112 for serving as a node in the topology for the multi-path connection (step 604). The slave topology function 116 then sends a feasibly report to the master topology function 114 (step 606). The feasibility report includes information that indicates whether or not the UE 112 is feasible as a node in the topology for the multi-path connection and, optionally, information that indicates a reason if the UE 112 is determined to not be feasible.

Figure 7:
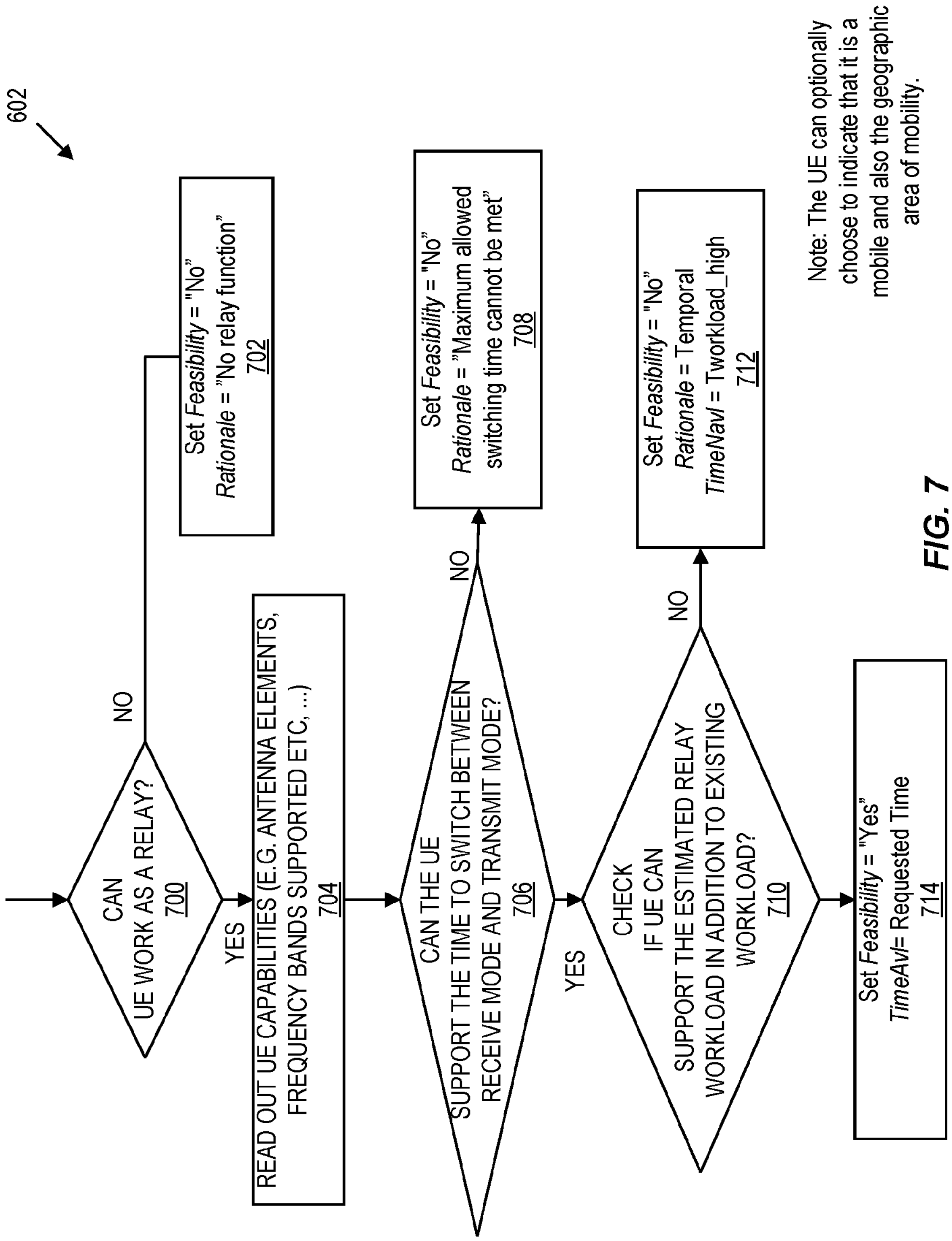
FIG. 7 is a flow chart that illustrates one example embodiment of step 602 of FIG. 6.

FIG. 7 is a flow chart that illustrates one example embodiment of step 602 of FIG. 6. As illustrated, in order to determine whether the UE 112 is feasible as a node in topology for the multi-path connection, the slave topology function 116 determines whether the UE 112 has the capability to operate as a relay (step 700). If not, the slave topology function 116 sets a feasibility parameter to "no" and sets a reason parameter to "no relay function" (step 702). If the UE 112 has the capability to operate as a relay, the slave topology function 116 reads out or obtains the (static) capabilities of the UE 112 (step 704). The capabilities include an amount of time needed for the UE 112 to switch between receive mode and transmit mode. These capabilities may also include, for example, RAT(s) supported, number of antennas, frequency band(s) supported, and/or the like. The slave topology function 116 determines whether the UE 112 can support a maximum allowed switching time for switching between receive mode and transmit mode (step 706). For example, the feasibility request may include information that indicates the maximum allowed switching time, and the slave topology function 116 may then determine whether the amount of time needed for the UE 112 to switch between receive mode and transmit mode is less than or equal to the maximum allowed switching time. If the UE 112 cannot support the maximum allowed switching time, the slave topology function 116 sets the feasibility parameter to "no" and sets the reason parameter to "maximum allowed switching time cannot be met" (step 708).

If the UE 112 can support the maximum allowed switching time, the slave topology function 116 determines whether the UE 112 can support an expected workload for a relay node in the multi-path connection topology in addition to the current (and/or expected future) workload of the UE 112 (step 710). If not, the slave topology function 116 sets the feasibility parameter to "no", sets the reason parameter to "temporal", and optionally sets a time parameter to a value Tworkload_high (step 712). Tworkload indicates the amount of time this UE 112 is facing high workload and thereby making it unable to function as a node in the topology. This is a case of temporary inconvenience, which would go away after the time period Tworkload_high. If the UE 112 can support the expected workload for a relay node in the multi-path connection topology in addition to the current (and/or expected future) workload of the UE 112, the slave topology function 116 sets the feasibility parameter to "yes" and optionally sets a time available parameter to value that indicates an amount of time for which the UE 112 is expected to be feasible (step 714). Note that the names of the parameters and reason values shown in FIG. 7 and described above are only examples. Any parameter names and representative reason values can be used.

Figure 8A:
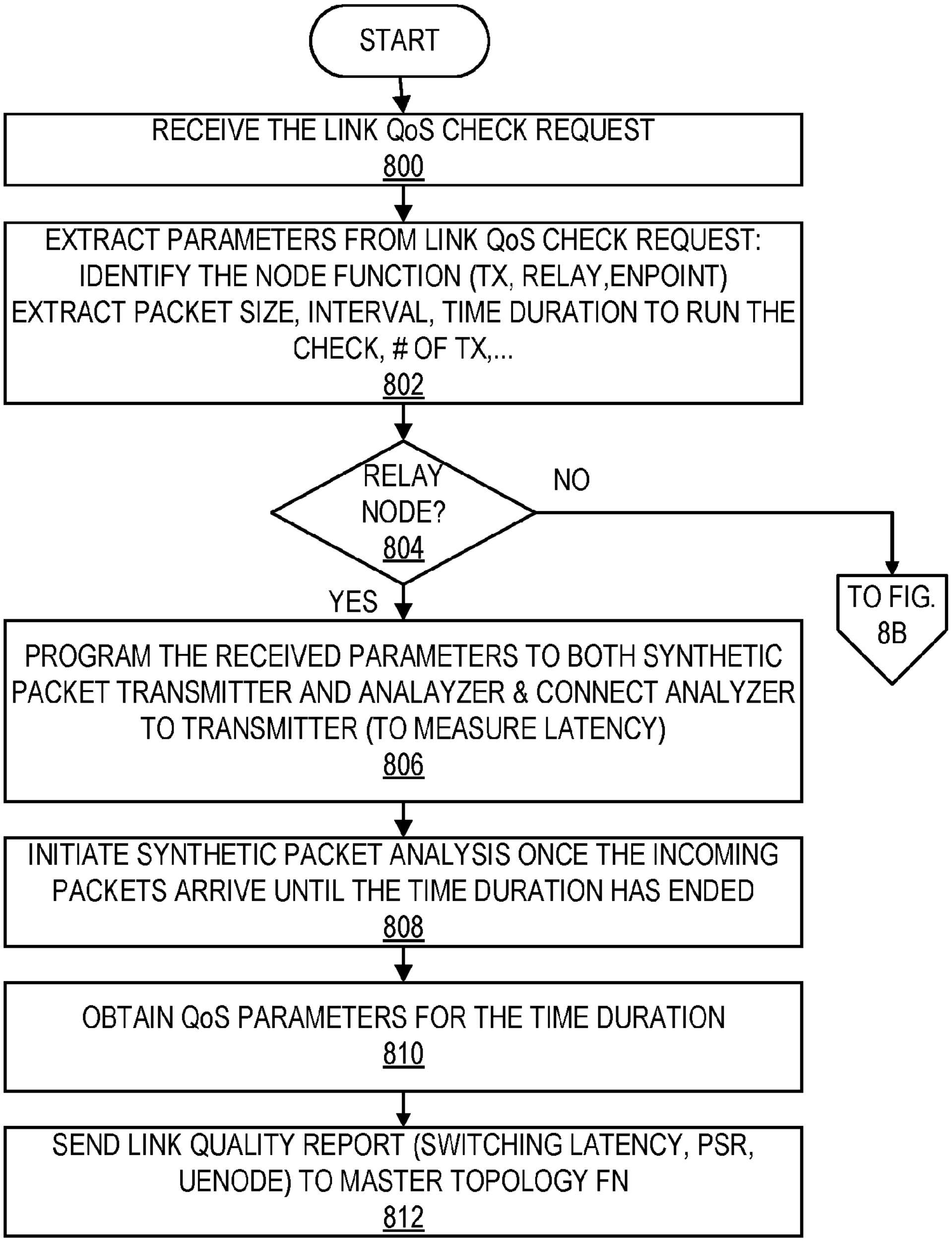
FIGS. 8A and 8B provide a flow chart that illustrates the operation of a slave topology function of a UE to perform Quality of Service (QoS) predetermination in accordance with one example embodiment of the present disclosure.
Figure 8B:
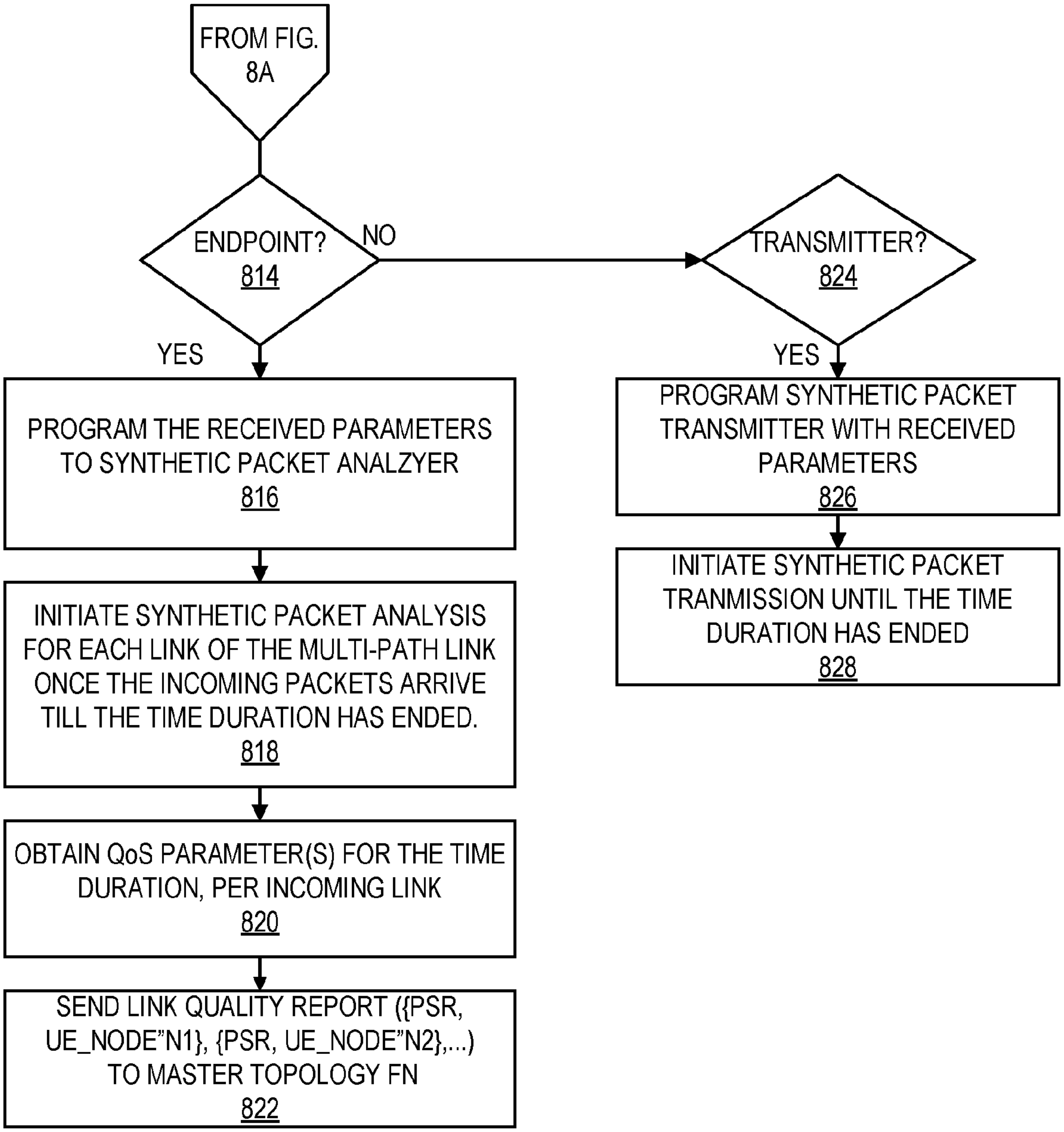

FIGS. 8A and 8B provide a flow chart that illustrates the operation of a slave topology function 116 of a UE 112 to perform QoS predetermination in accordance with one example embodiment of the present disclosure. As illustrated, the slave topology function 116 receives a link QoS check request from the master topology function 114 (step 800). This request corresponds to the request of step 426 of FIG. 4C. Upon receiving this request, the slave topology function 116 extracts one or more parameters to be used for link QoS predetermination from the request (step 802). These parameters may include a parameter(s) that indicates a node function of the UE 112, i.e. whether the request is for the UE 112 to perform link QoS predetermination as a relay node, a transmitting node, or a receiving node. The parameters may also include, for example, a packet size, interval, time duration to run the check, number of repetitions, and/or the like in regard to synthetic packet transmission/reception by the UE 112.

The slave topology function 116 determines whether the node function is a relay node (step 804). If so, the slave topology function 116 programs both a synthetic packet transmitter and a synthetic packet receiver, or analyzer, at the UE 112 using the parameters extracted from the request (step 806). Once programmed, the synthetic packet transmitter transmits synthetic packets to the next node in the respective link of the candidate topology in accordance with the received parameters for the specified duration of time. The slave topology function 116 initiates analysis of received synthetic packets by the synthetic packet analyzer for synthetic packets received from the previous node in the respective link of the candidate topology and analyzes the received synthetic packets (step 808). For example, the synthetic packet analyzer determines whether packets are successfully received within a defined latency bound. The latency bound may be indicated in the request of step 800. The slave topology function 116 obtains, from the synthetic packet analyzer, one or more QoS parameters based on the analysis (step 810). The QoS parameters may include the success rate for synthetic packet reception (e.g., the percentage of synthetic packets transmitted to the UE 112 that were correctly received by the UE 112 within the specified latency bound). The QoS parameters may additionally or alternatively include one or more other parameters such as, e.g., switching latency, etc. The slave topology function 116 then generates and sends a QoS report to the master topology function 114 (step 812). In one embodiment, the QoS report includes the obtained QoS parameter(s).

If the node function of the UE 112 is not a relay node, the slave topology function 116 determines whether the node function of the UE 112 is a receiving node or endpoint of the respective link in the candidate topology (step 814). If yes, the slave topology function 116 programs the synthetic packet analyzer with the parameters extracted from the request of step 800 (step 816). Notably, since the UE 112 is the target UE or endpoint, the synthetic packet analyzer is configured to analyze received packets for each link of the candidate multi-path topology. For each link, the synthetic packet analyzer is configured to receive and analyze synthetic packets from the previous node in the link of the candidate topology. The slave topology function 116 initiates synthetic packet reception and analysis until the specific duration of time has ended (step 818). For each link, the synthetic packet analyzer analyzes the received synthetic packets to determine one or more QoS parameters. The slave topology function 116 obtains, from the synthetic packet analyzer, the QoS parameter(s) for each link during the specified duration of time (step 820). The slave topology function 116 then generates and sends a QoS report to the master topology function 114 (step 822). In one embodiment, the QoS report includes the obtained QoS parameter(s) for each link.

If the node function of the UE 112 is not the endpoint, the slave topology function 116 determines whether the node function of the UE 112 is a transmitting node, or source wireless node, of the respective link in the candidate topology (step 824). If so, the slave topology function 116 programs the synthetic packet transmitter with the parameters extracted from the request of step 800 (step 826). Notably, the UE 112 may, in some cases, need to transmit to more than one wireless node in the candidate topology in which case the slave topology function 116 would configure the synthetic packet transmitter accordingly. The slave topology function 116 then initiates synthetic packet transmission until the specified time duration has ended (step 828).

Figure 9:
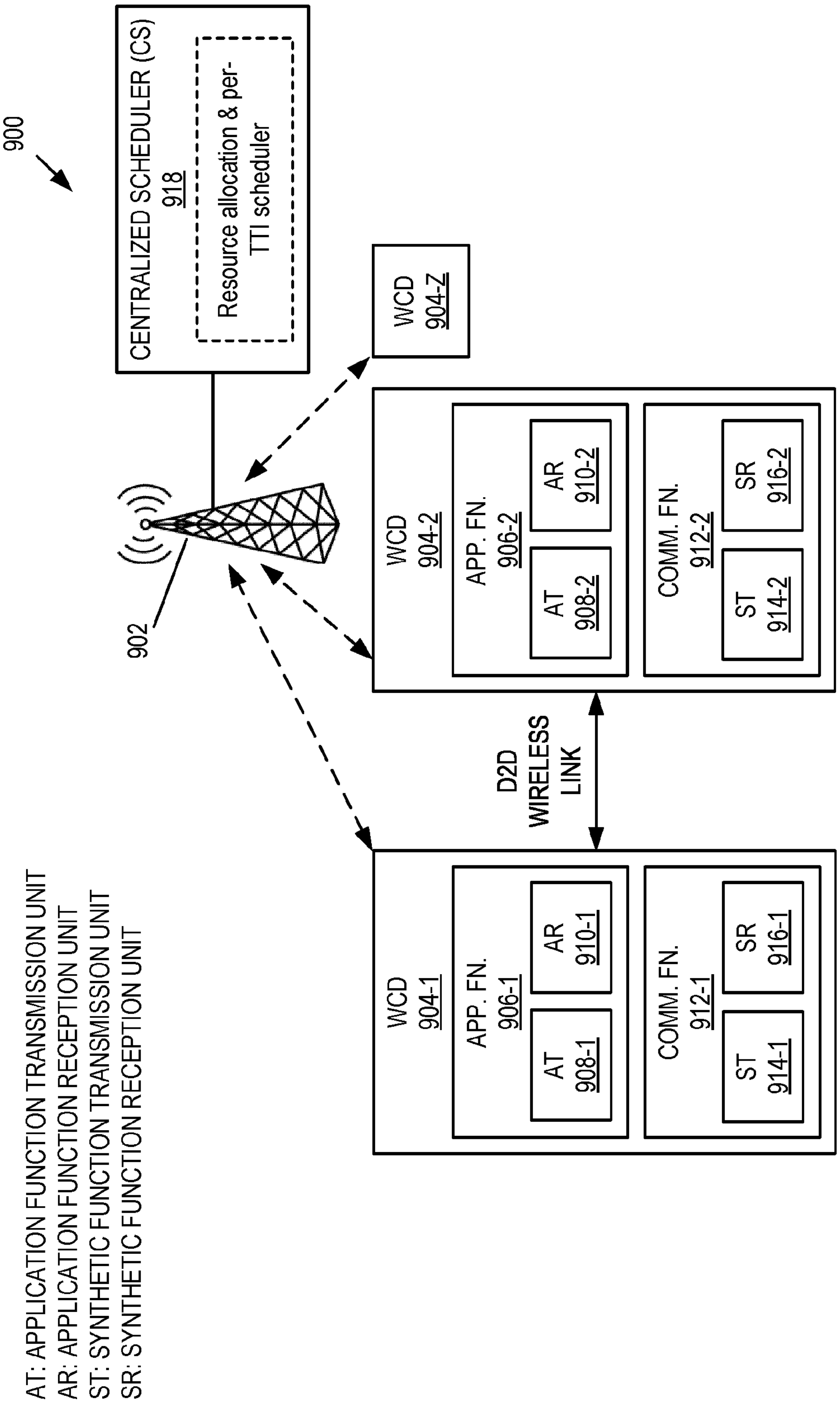
FIGS. 9 through 11 illustrate one example of an existing system for reliable Device-to-Device (D2D) communication.
Figure 11:
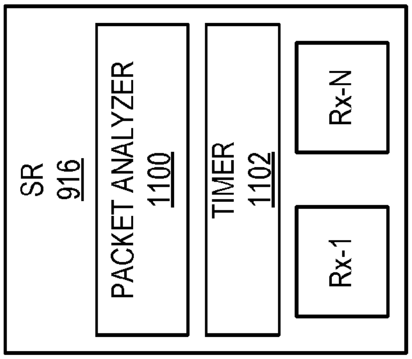
Figure 10:
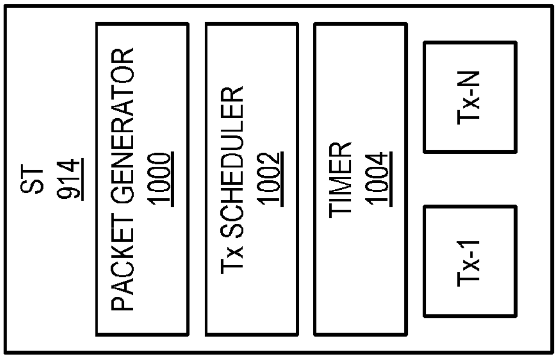

With regard to the QoS predetermination procedure, in one embodiment, the master topology function 114 and the slave topology functions 116 operate in a manner similar to that which is described for the centralized scheduler and Wireless Communication Devices (WCDs) in International Patent Application Serial No. PCT/EP2019/085325, entitled RELIABLE DEVICE-TO-DEVICE COMMUNICATION, which was filed on Dec. 16, 2019 (hereinafter referred to as the "Related Application"). In this regard, FIGS. 9, 10, and 11 illustrate some aspects of the teachings of the Related Application. Note however that other schemes for predetermining the QoSs of the links in the candidate topology may be used.

FIG. 9 illustrates one example of a system 900 as described in the Related Application. The system 900 includes a base station 902 in a RAN of a cellular communications system (e.g., a 3GPP cellular communications system). For example, the base station 902 may be a gNB in a 5G NR RAN; however, the base station 902 is not limited thereto. The system 900 also includes a number of WCDs 904-1 through 904-Z, which are generally referred to herein as WCDs 904. The WCDs 904 may be, for example, UEs. At least some of the WCDs 904 are capable of D2D communication. For instance, in the illustrated example, there is a D2D link between WCD 904-1 and WCD 904-2. Note, however, that there may be additional D2D links between other WCDs 904, as will be appreciated by one of skill in the art.

Using the WCD 904-1 as an example, the WCD 904-1 includes an application function 906-1 that includes an Application Function Transmission Unit (AT) 908-1 and an Application Function Reception Unit (AR) 910-1. The WCD 904-1 also includes a communication function 912-1 that includes a Synthetic Function Transmission Unit (ST) 914-1 and a Synthetic Function Reception Unit (SR) 916-1. Likewise, the WCD 904-2 includes an application function 906-2 that includes an AT 908-2 and an AR 910-2 and a communication function 912-2 that includes an ST 914-2 and an SR 916-2. In the same manner, other WCDs 904 may also include application functions 906 and communication functions 912. In some embodiments, the application functions 906, including the ATs 908 and the ARs 910, are implemented in software (e.g., software that is executed by processing circuitry of the WCDs 904 to cause the WCDs 904 to perform the functions of the communication functions 912 described herein); however, the application functions 906 are not limited thereto. In some embodiments, the communication functions 912, including the STs 914 and the SRs 916, are implemented in software or a combination of hardware and software (e.g., software executed by processing circuitry of the WCDs 904 to cause the WCDs 904 to perform the functions of the communication functions 912 described herein); however, the communication functions 912 are not limited thereto.

A Centralized Scheduler (CS) 918 is either implemented at the base station 902 or at another node (e.g., another node in the RAN or another node in the cellular communications system). Alternatively, the CS 918 is implemented at a WCD 904 such as, e.g., either the WCD 904-1 or the WCD 904-2. In some embodiments, the CS 918 is implemented in software that is executed by processing circuitry of the node to cause the node to perform the functions of the CS 918 described herein.

FIG. 10 illustrates an ST 914 in more detail, in accordance with one example embodiment of the present disclosure. As illustrated, the ST 914 includes a packet generator 1000, a transmit (Tx) scheduler 1002, and a timer 1004. FIG. 11 illustrates an SR 916 in more detail, in accordance with one example embodiment of the present disclosure. As illustrated, the SR 916 includes a packet analyzer 1100 and a timer 1102.

The application functions 906, the communication functions 912, and the CS 918 operate together to determine whether guaranteed service can be enabled via D2D link(s) (i.e., whether particular requirements such as, e.g., reliability requirements can be met via D2D link(s)) between WCDs 904 in a manner that is particularly well-suited for critical traffic having a latency requirement such as, for example, URLLC traffic. Note that some D2D system components (e.g., for authentication, device pairing, etc.) may be located in a core network of the cellular communications system and are not shown for sake of simplicity.

Using the example of FIG. 9, the WCDs 904-1 and 904-2 are paired for ascertaining whether reliable D2D communication between the WCDs 904-1 and 904-2 is possible. Considering a data transmission from WCD 904-1 to WCD 904-2, at the transmit end of the D2D link, WCD 904-1 includes the ST 914-1, which includes the packet generator 1000, the Tx scheduler 1002, and the timer 1004. The packet generator 1000 performs header and variable payload generation and time stamping (e.g., 32 bit time stamping with indication for wrap-around). The packet generator 1000 also maintains a statistic of the number of transmitted packets and a respective replication factor. As used herein, "replication" is when the same packet is sent R times, where R is the replication factor. In other words, the replication factor R indicates how many times the same packet is to be transmitted. The Tx scheduler 1002 works in accordance with a resource allocation and Transmission Time Interval (TTI) schedule provided by the CS 918.

On the receive end, at the WCD 904-2, the SR 916-2 includes the packet analyzer 1100 and the timer 1102. The timer 1102 has a shared notion of time with the timer 1004 at the transmit end and the rest of the system 900. The packet analyzer 1100 is configured with the same replication factor as its counterpart packet generator 1000 at the transmit end. The packet analyzer 1100 checks packet transmissions received over the D2D link for data integrity, extracts the time stamp information, and determines the packet transmission latency. The packet analyzer 1100 checks whether a packet is received correctly and within a predefined or preconfigured latency bound (e.g., as required by the application). When the latency bound is not met, it is considered as a violation and captured as a statistic. Furthermore, the packet analyzer 1100 can also maintain a statistic of packets (or replicas) received in error, total packets received, and/or latency variations/jitter of all received packets/replicas.

The configuration setup (e.g., replication factor, periodic/aperiodic transmission, etc.) is done by the CS 918. The statistics collected by the packet analyzer 1100 can be pushed by the WCDs 904 on a programmed periodicity or pulled by the CS 918 on a need basis. Also, on a critical error (e.g., latency requirement is not met or cumulative packet error beyond a required threshold), the respective WCD 904 (e.g., the SR 916 of the respective WCD 904) sends a violation notification to the CS 918, e.g. via normal reliable data transfer. This violation notification can be via Negative Acknowledgement (NACK) in an indirect Hybrid Automatic Repeat Request (HARQ) mechanism, and then details of the statistics can be reported to the CS 918 with statistic report message. Note that, as used herein, an indirect HARQ mechanism is a HARQ mechanism in which the receiving device first sends the Acknowledgement (ACK)/NACK to a node (other than the transmitting device), where this node may then send the ACK/NACK to the transmitting device. In some embodiments, the indirect NACK is delayed such that it is only transmitted when the critical error condition is hit because HARQ retransmissions are not used. An alternative approach would be to add a flag that indicates the violation of reliability requested in the statistic report message instead of sending a NACK. Either of these two approaches can be used to signal a violation.

The Related Application teaches two phases of operation: initial set up phase with synthetic packet transmission and a later running phase with actual application packet data transmission.

Now, turning back to QoS predetermination for the UEs 112 in the candidate, multi-path connection topology in accordance with an embodiment of the present disclosure (e.g., a described above with respect to FIGS. 1 to 8B), the master topology function 114 may incorporate at least some features of the CS 918, and the slave topology functions 116 may interact with (or incorporate) the ST 914 and the SR 916 at the UE 112 to perform link QoS predetermination. The target UE 112-T may also incorporate at least some aspects of the application function 906. If the source wireless node is a source UE 112-S, then the source UE 112-S may also incorporate at least some aspects of the application function 906. Note, however, that the teachings of the Related Application are expanded to provide QoS predetermination for links in the candidate multi-path topology rather than for a single D2D link. However, the teachings of the Related Application provide details of one embodiment of how QoS predetermination can be performed for each of the direct D2D links within the candidate topology. The master topology function 114 can then use the multiple QoS reports received to generate the confirmed topology, as described herein.

Figure 12:
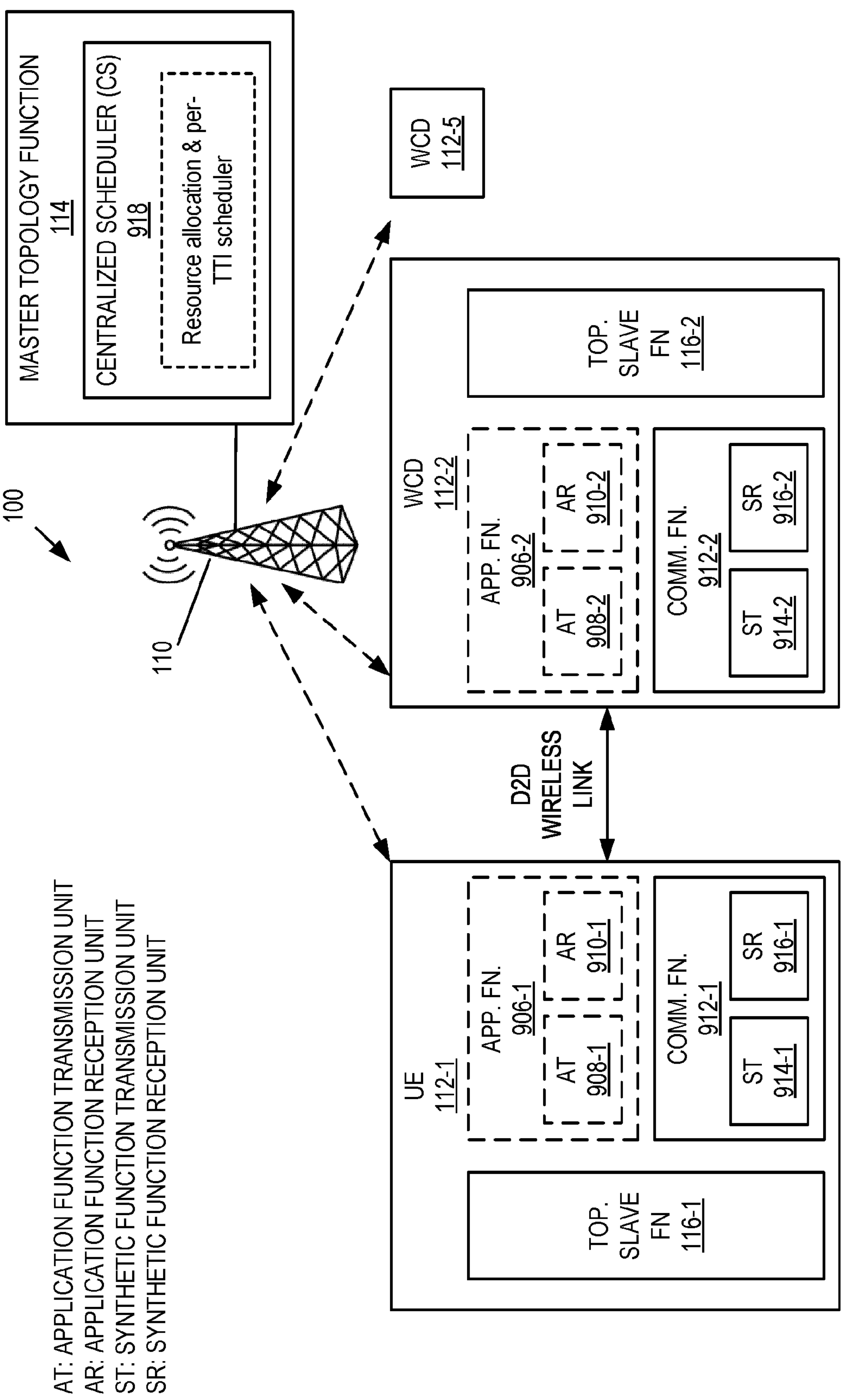
FIG. 12 illustrates an embodiment of the system of FIG. 1 in which the centralized scheduler of FIG. 9 is implemented as part of the master topology function, and the UEs include respective synthetic transmitters and synthetic receivers, in accordance with an embodiment of the present disclosure.

In this regard, FIG. 12 illustrates an embodiment of the system 100 of FIG. 1 in which the CS 918 is implemented as part of the master topology function 114 and the UEs 112 include respective SRs 914 and STs 916. In one embodiment, the slave topology function 116 performs the configuration setup (e.g., replication factor, periodic/aperiodic transmission, etc.) of the SR 914 and the ST 916 in line with the application-level parameters extracted from the link QoS request message from the master topology function 114.

Figure 13:
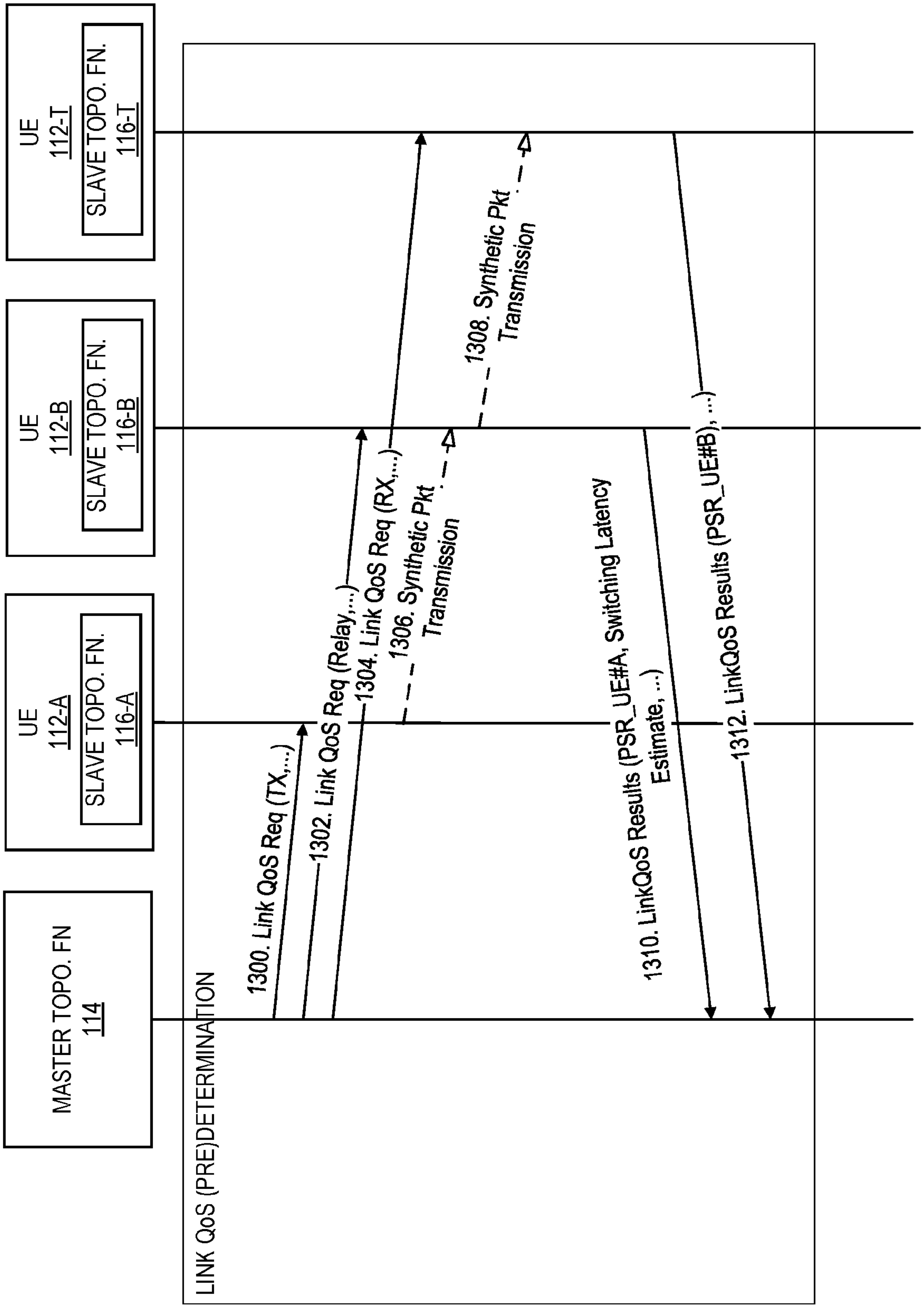
FIG. 13 illustrates one example of the QoS predetermination procedure in accordance with an embodiment of the present disclosure.

FIG. 13 illustrates one example of the QoS predetermination procedure in accordance with an embodiment of the present disclosure. As illustrated, the master topology function 114 sends QoS predetermination requests to UEs 112-A, 112-B, and 112-T in a particular link of the candidate topology (steps 1300-1304). In this example, the node function of UE 112-A is a transmitting node, the node function UE 112-B is a relay node, and the node function of UE 112-T is a receiving node (i.e., the target UE). UE 112-A transmits synthetic packets to UE 112-B (step 1306), and UE 112-B transmits synthetic packets to UE 112-T (step 1308). UE 112-B analyzes the synthetic packets received from UE 112-A, determines the QoS parameter(s) for the link from UE 112-A to UE 112-B based on the analysis, and sends a QoS report including the determined QoS parameter(s) to the master topology function 114 (step 1310). UE 112-T analyzes the synthetic packets received from UE 112-B, determines the QoS parameter(s) for the link from UE 112-B to UE 112-T based on the analysis, and sends a QoS report including the determined QoS parameter(s) to the master topology function 114 (step 1312).

Figure 14:
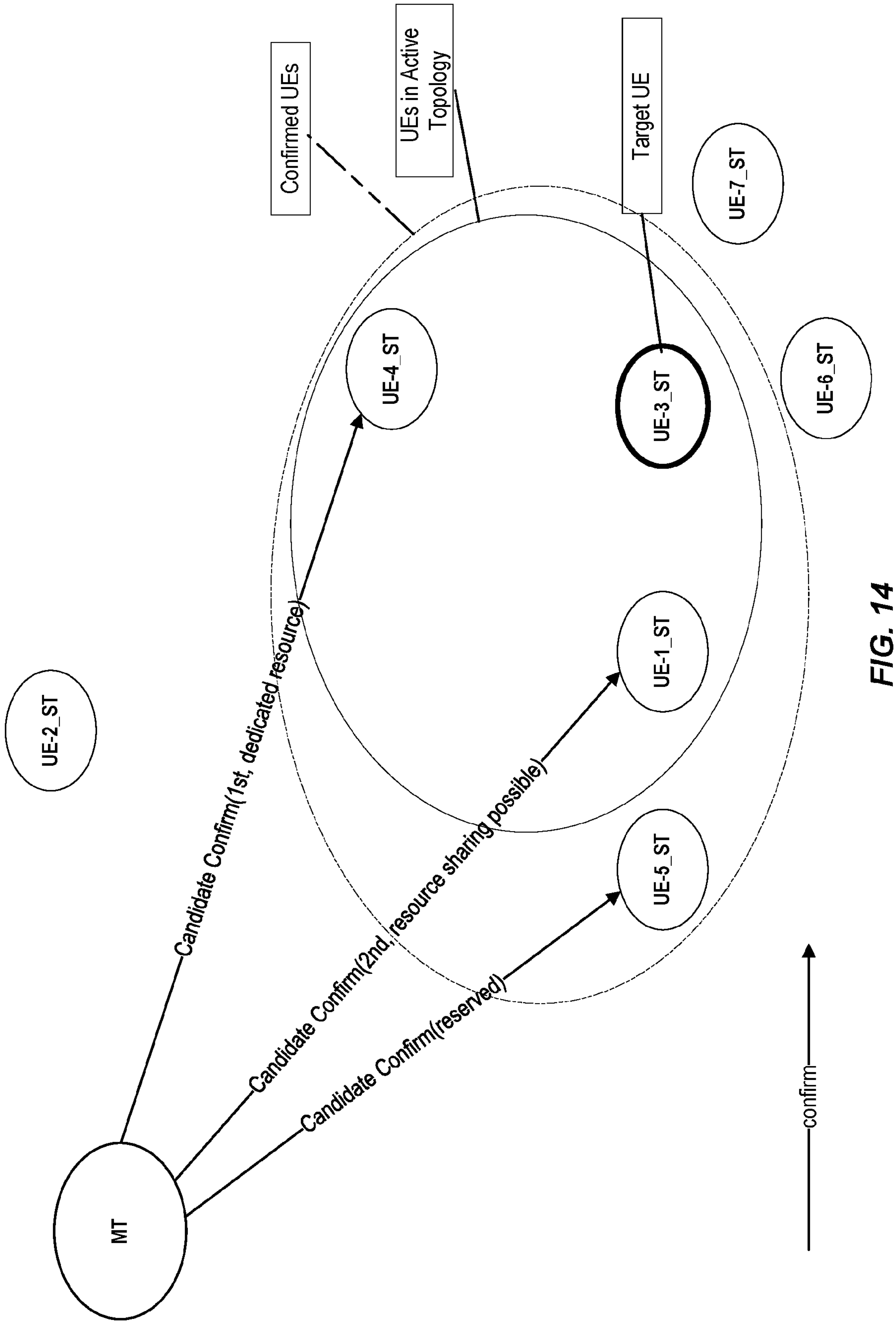
FIG. 14 continues the example of FIG. 5 but shows the procedure for configuring the UEs that are in the confirmed topology for the multi-path connection.

FIG. 14 continues the example of FIG. 5 but shows the procedure for configuring the UEs 112 that are in the confirmed topology for the multi-path connection. In this example, all of the candidate UEs are used for the candidate topology, and all of the links in the candidate topology are confirmed. So, the confirmed topology is the same as the candidate topology. However, FIG. 14 shows another optional aspect of the present disclosure. As illustrated, within the confirmed topology, there may be, in some embodiments, a number of active links provided by respective UEs 112, which are referred to as active UEs for active links in the confirmed topology. In addition, there may be, in some embodiments, a number of inactive, or reserved, links. In the illustrated example, UE-5 is a relay for a reserved link that may be activated if needed or desired (e.g., activated if one of the active links goes down or performance of one of the active links is degraded).

Note that, taking FIG. 14 as an example, UE-3 can get the packets from direct path, UE-1 (relay), or UE-4 (relay). So, there are three incoming links, while the example of FIG. 13 only shows a simplified case with one relay. Now, each of these relay-based links will result in a QoS predetermination. In one embodiment, link predetermination is not performed for the direct path. Thus, the SR 916 is designed to accommodate this feature, in one embodiment.

Some of the possible alternate embodiments that may not be described above will now be described. In one embodiment, the master topology function 114 resides in the cloud. In one embodiment, the master topology function 114, or at least some functionality of the master topology function 114, is copied to or otherwise implemented at a cluster head UE when a group of UEs are moving out to a non-coverage area and one or more UEs are elected as the cluster head. The cluster head UE is a UE that coordinates and controls the group of UEs. A new cluster of UEs is created, e.g., based on predicted or earlier known poor coverage regions. When created, the master topology function 114, or at least some functionality of the master topology function 114, is copied to or activated at the cluster head UE. Note that the master topology function 114, or at least some functionality of the master topology function 114, can be copied to and run on any node.

In one embodiment, every node in the multi-path connection topology can have a copy of the topology information. In a scenario where the target UE 112-T or a few of the UEs 112 in the topology move to an out-of-coverage region, a cluster head UE could be created to address this cluster of UEs. The creation of the cluster head can be based on predicted or earlier known poor coverage region. Once such a cluster head is created, it obtains or activates a copy of the master topology function 114 and along with it the copy of the topology information for that cluster/group of UEs. Thus, it is possible to act standalone.

In one embodiment, D2D device discovery could be used in addition to ascertain the quality of the radio channel between two UE nodes.

Also, although some of the description above focuses on URLLC applications, the solution described herein can be used for other types of applications such as, e.g., enhanced Mobile Broadband (eMBB) applications as we address the issue of mix of coverage and non-coverage regions where the target UE 112-T could end up being located.

In one embodiment, the mapping or heuristic for mapping the application-level requirement(s) to the needed number of links in the multi-path connection topology can be learned or otherwise obtained from previous allocations, debug information, environment information, etc. and tuned or updated over time. For example, if there are UEs that are located in low coverage regions, it might be better to provide them with additional links than just the direct link from the RAN node 110 irrespective of latency stringency.

While the embodiments described above provide solutions related to determining, configuring, and using a topology for a multi-path connection, there is further room for improvement. In general, there is a need for systems and methods for updating a multi-path connection topology. When considering this need, one may look to existing topology update mechanisms. However, in general, existing topology updates are time consuming and not without impact to traffic flows. Existing solutions for determining topologies for data transmission (see, e.g., U.S. Pat. No. 10,349,335 B2 entitled "Methods and Apparatus for Use in Selecting a Connection Path for Low-Latency, Deterministic Multi-Hop D2D Communications" and United States Patent Application Publication No. 2016/0295627A1 entitled "Reporting for Direct Link Quality Assessment") neglect to update the topology while the data transmission is ongoing. Existing solutions such as, e.g., U.S. Pat. No. 9,794,129B2 entitled "Building Topology in Communication Networks") deal with only network topology summarization for quite a few applications between two nodes but do not indicate how to provide existing QoS for a particular application when there is a degraded link in the multi-node topology. Works such as, e.g., Raca, A. H. Zahran, C. J. Sreenan, R. K. Sinha, E. Halepovic, R. Jana och V. Gopalakrishnan, "On Leveraging Machine and Deep Learning for Throughput Prediction in Cellular Networks: Design, Performance, and Challenges," IEEE Communications Magazine, pp. 11-18, March 2020 (hereinafter "the Raca Paper"), use Artificial Intelligence (AI) based methods for accurate throughput in cellular networks using physical and application layer metrics but this existing solution will need a large amount of data for training, suffers from deviations between training data and test data, and suffers from long training times. Hence, the solution in the Raca Paper does not work well for URLLC applications, such as motion control, that generate small amounts of data and need a guaranteed packet success rate within a bounded latency in the operating environment. Furthermore, the Raca Paper covers links directly between the network and an end node and does not cover multipath scenarios with relay nodes in between the network and the end node.

Systems and methods for updating a topology of a multi-path connection are disclosed herein that address the aforementioned and/or other problems associated with existing topology update mechanisms. Embodiments of the topology update procedure build upon embodiments of the multi-path topology solution described above. In one embodiment, a combination of a central function (e.g., the master topology function) and an additional (distributed) function is used to dynamically determine when to update the multi-path topology for the multi-path connection to a target receiver. In one embodiment, the update procedure for the multi-path topology is application-aware, wherein the topology update is done based on, e.g., actual or predicted degradation of at least one active link in the topology of the multi-path connection, a change in QoS for the associated application (e.g., based on QoS monitoring at each node in the topology), or a change in the application-level requirements for the associated application. In one embodiment, the update is done only after co-relating with the application's data transmission parameters (e.g., periodicity, ability to tolerate temporary gaps without catastrophic failures, etc.). Furthermore, the topology update is done by dynamically activating inactive (also referred to herein as "reserved") links. The topology update may also include modifying one or more active links in the topology (e.g., deactivating at least one of the active links) and/or using the same resources on at least one degraded active link(s) but without compromising the overall QoS. Finally, in case the application-level requirements (e.g., application-level QoS, or the like) for the associated application cannot be guaranteed, the end application may be notified, e.g., about the reduction in QoS and possibly a prediction, e.g., a prediction of a time window (e.g., size and/or length) during which the QoS will be reduced, a prediction of when the required or desired QoS will be available again, or the like. Given that each node in the topology monitors and notifies a central function, the central function may proactively adapt the topology decision for other similar applications if a common node is under degradation.

Embodiments of the multi-path connection topology update procedure described herein may provide any one or more of the following advantages. Embodiments of the present disclosure perform the multi-path connection topology update after differentiating between temporary and longer term degradation (e.g., lower QoS) for the multi-path connection for a particular application. For longer-term degradation, inactive link(s) may be activated, if no inactive link(s) exist, resources may be released. Embodiments of the present disclosure may enable differentiated services at a node in the topology as the applications having lower QoS requirements may get temporary outage to enable continuous serving of the applications requiring higher QoS. Embodiments of the present disclosure may be used to make predictions the target device may monitor multiple incoming active links and packets of different applications leading to learning. Given that each node monitors and notifies a central function, the central function may proactively adapt the topology decision for other similar applications if a common node is under degradation.

The following embodiments related to an update procedure for updating the topology of a multi-path connection between a source node (e.g., RAN node 110 or source wireless UE 112-T) and a target UE 112-T build upon the systems and methods described above with respect to FIGS. 1 to 14. As such, the same reference numbers will be used for like elements.

Figure 15:
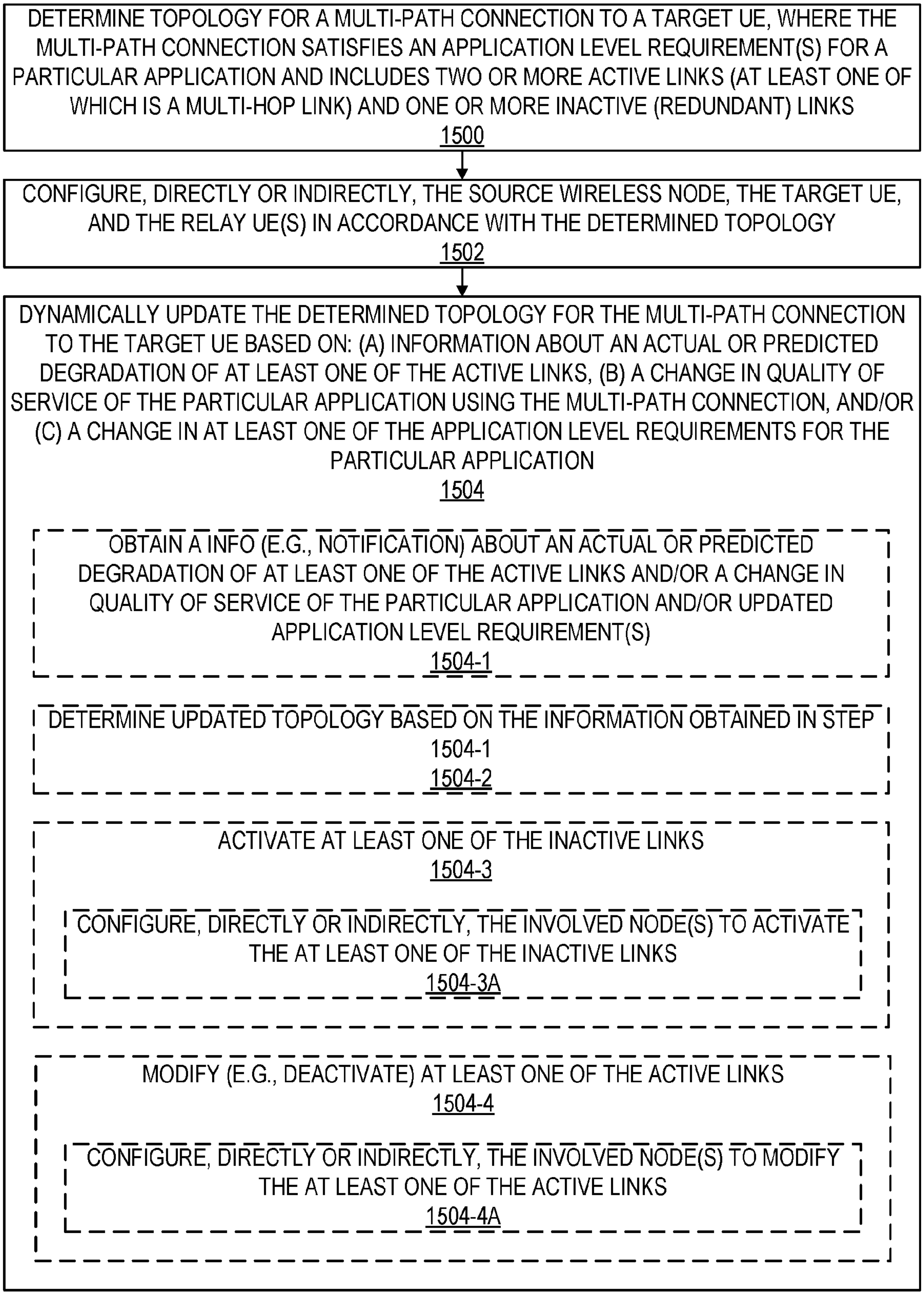
FIG. 15 illustrates the operation of a master topology function to perform a dynamic update for a topology of a multi-path connection to a target device in accordance with one embodiment of the present disclosure.

FIG. 15 is a flow chart that illustrates the operation of the master topology function 114 to dynamically update a topology of a multi-path connection in accordance with one embodiment of the present disclosure. Optional steps are represented by dashed lines/boxes. As illustrated, the master topology function 114 determines or selects a topology for a multi-path connection to a target UE 112-T (step 1500). The topology may be determined as described above with respect to FIGS. 1 to 14. The topology for the multi-path connection to the target UE 112-T is determined such that the multi-path connection will satisfy one or more application-level requirements for a particular application for which the multi-path connection is to be used. Further, the topology for the multi-path connection is determined such that topology, and thus the multi-path connection, includes two or more active links, at least one of which is a multi-hop link, and one or more inactive links (also referred to herein as "redundant" or "reserved" links).

The master topology function 114 configures a source wireless node for the multi-path connection, the target UE 112-T, and the relay UE(s) 112-R in accordance with the determined topology (step 1502). For example, the master topology function 114 may directly configure these nodes via instructions provided from the master topology function 114 to these nodes or may indirectly configure these nodes via instructions to some intermediate node(s), where the intermediate node(s) then provide corresponding instructions to the nodes being configured.

The master topology function 114 dynamically updates the determined topology for the multi-path connection to the target UE 112-T based on: (a) information about an actual or predicted degradation of at least one of the active links, (b) a change in QoS of the particular application using the multi-path connection, (c) a change in at least one of the application-level requirements for the particular application, or any combination of (a)-(c) (step 1504). This dynamic update is performed during run-time, i.e., after the multi-path connection is initiated and while it is in use. In one embodiment, dynamically updating the topology includes any one or more of the following:

- The master topology function 114 obtains (e.g., receives) information (e.g., notifications) about an actual or predicted degradation of at least one of the active links and/or a change in QoS of the particular application and/or updated application-level requirement(s) for the particular application (step 1504-1).
- The master topology function 114 determines an updated topology for the multi-path connection based on the information obtained in step 1504-1 (step 1504-2). In one embodiment, the updated topology is the same as the topology determined in step 1500 but where: one or more of the inactive links are activated and/or one or more of the active links are modified (e.g., deactivated or otherwise modified).
- The master topology function 114 may activate at least one of the inactive links in the topology determined in step 1500 (step 1504-3). In one embodiment, this activation of at least one of the inactive links is in accordance with the updated topology determined in step 1504-2. In one embodiment, the master topology function 114 activates the at least one of the inactive links by configuring the involved node(s) to activate the at least one of the inactive links (step 1504-3A). In other words, the master topology function 114 instructs the involved node(s) to activate the at least one of the inactive links. It should be noted that an "inactive link" is inactive for the particular application (e.g., application #M) while the same link could be active for another application (e.g., application #N) as the topology is application specific. The involved node(s) are the wireless node(s) (e.g., the source wireless node, the relay UE(s) 112-R, and/or the target UE 112-T) that are part of the inactive link(s) being activated.

The master topology function 114 may modify (e.g., deactivate) at least one of the active links in the topology determined in step 1500 (step 1504-4). In one embodiment, this modification of at least one of the active links is in accordance with the updated topology determined in step 1504-2. In one embodiment, the master topology function 114 modifies the at least one of the active links by configuring the involved node(s) to modify the at least one of the active links (step 1504-4A). In other words, the master topology function 114 instructs the involved node(s) to modify the at least one of the active links. The involved node(s) are the wireless node(s) (e.g., the source wireless node, the relay UE(s) 112-R, and/or the target UE 112-T) that are part of the active link(s) being modified. The modification of the active link(s) may be any sort of modification such as, e.g., deactivation of the active link, changing a relaying protocol (e.g., amplify and forward, decode and forward, or compress and forward) used by the relay UE(s) 112-R in an active link, or the like.

Note that the dynamic update in step 1504 may include any modification to the active topology, where the "active topology" is the part of the topology formed by active links as opposed to inactive links. Thus, the dynamic update in step 1504 may modify the topology by, e.g., activating one or more inactive links, deactivating one or more active links, modifying a particular active link by changing a relaying protocol (e.g., amplify and forward, decode and forward, or compress and forward) used by the relay UE(s) 112-R in an active link, adding new relay UE(s) 112-R resulting in addition of new active link(s) and possibly deactivation of other link(s), removing a relay UE(s) 112-4 resulting in removal of an active link(s) and possibly the addition of new active link(s), or the like.

Figure 16A:
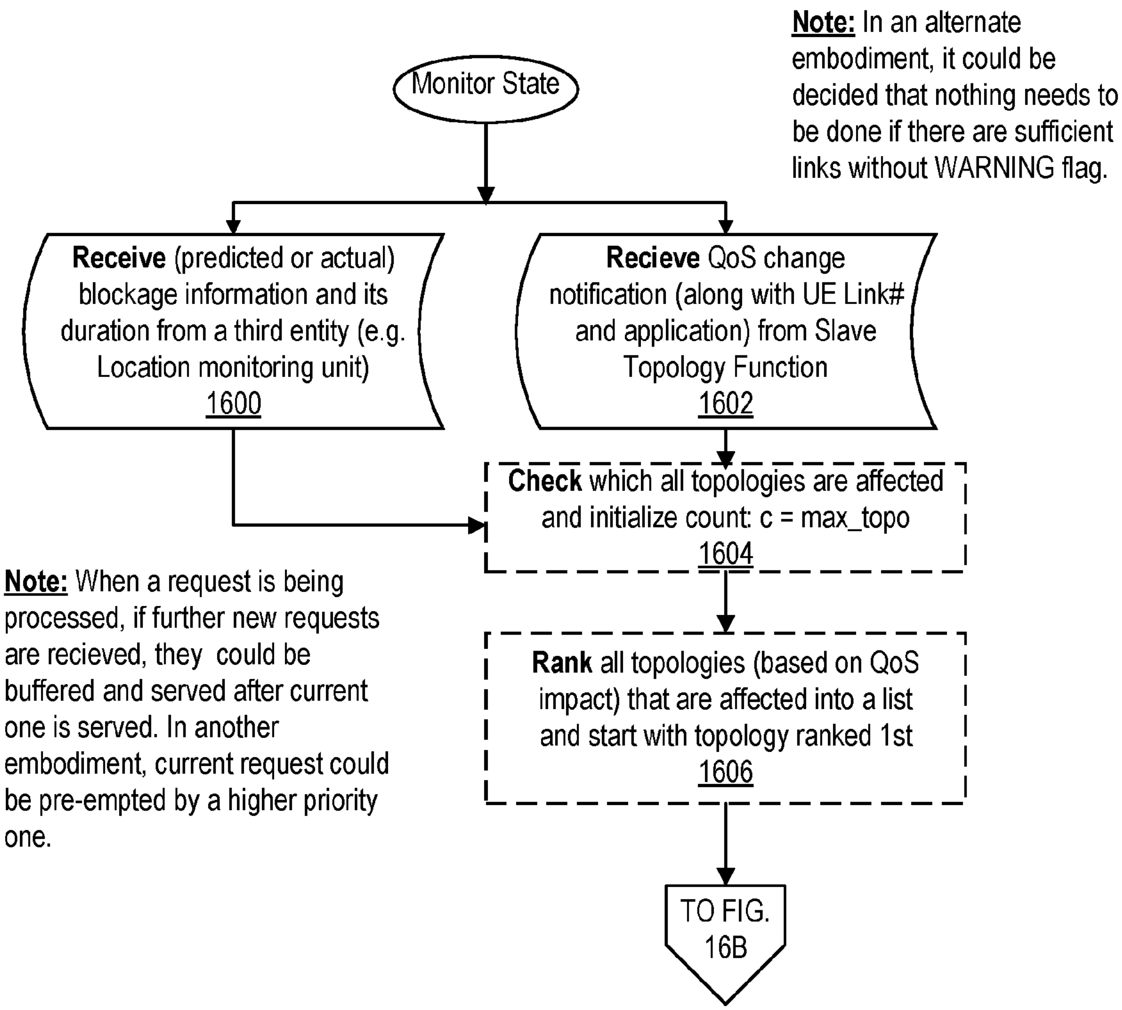
FIGS. 16A through 16C illustrates the operation of a master topology function to perform dynamic update procedure for a topology(ies) of a multi-path connection(s) to a target device(s) in accordance with another embodiment of the present disclosure.
Figure 16B:
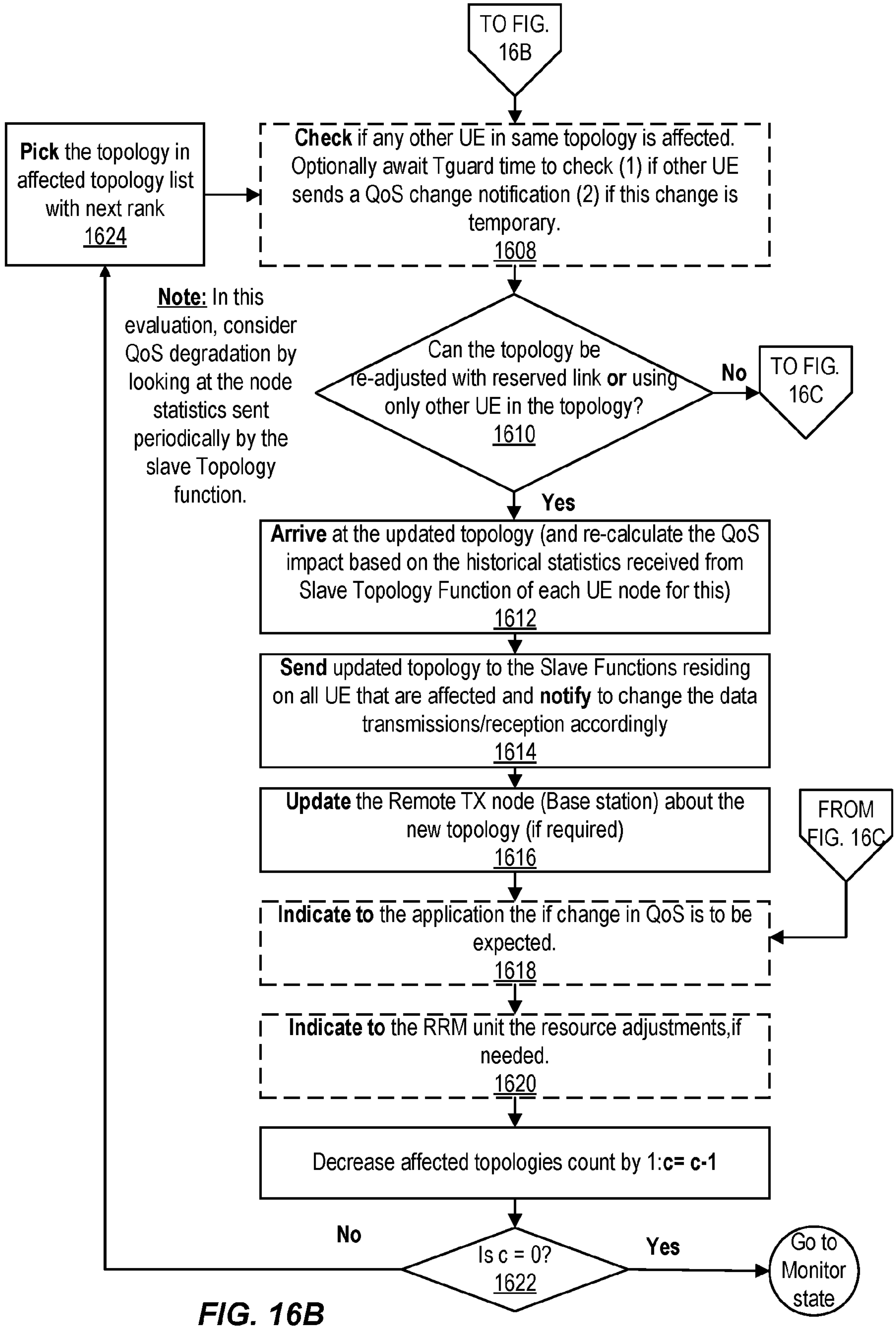
Figure 16C:
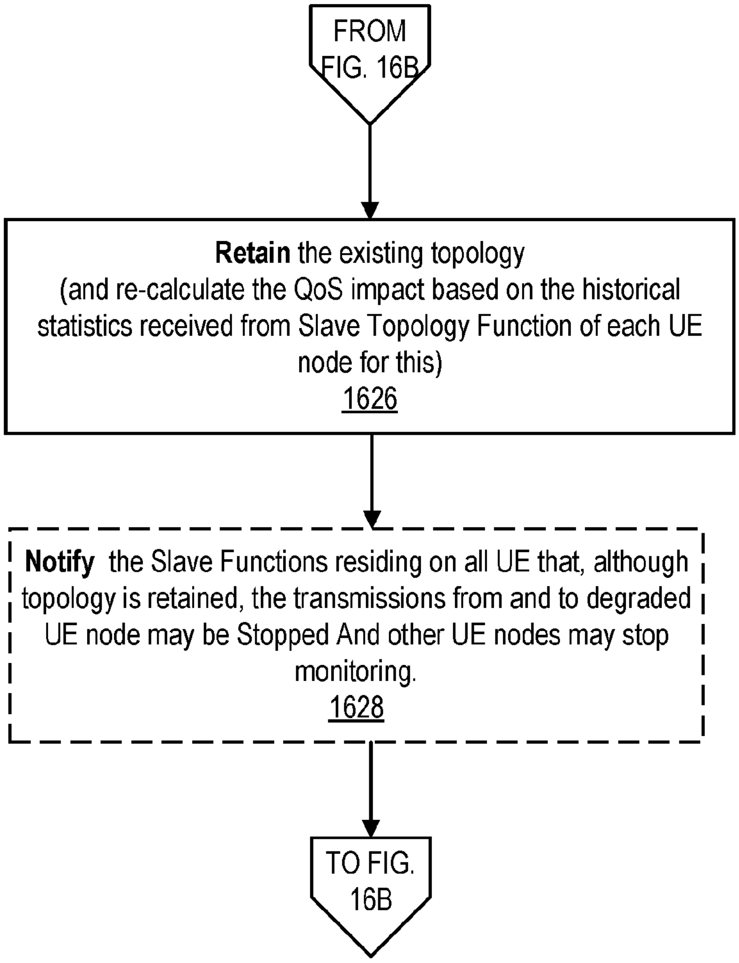

FIGS. 16A, 16B, and 16C show a flow chart that illustrates the operation of the master topology function 114 in accordance with another embodiment of the present disclosure. Optional steps are represented by dashed boxes. As illustrated, for this procedure, the master topology function 114 is operating in a "monitor state". While in the monitor state, the master topology function 114 receives information about predicted or actual blockage and a duration of the actual or predicted blockage from another entity (step 1600). The actual or predicted blockage information and the actual or predicted duration of the blockage may be received from an entity (e.g., a location monitoring unit or function) that monitors the locations of the UEs 112 and determines when a UE link (i.e., a D2D link between two UEs 112) is or is predicted to be blocked due to, e.g.: (a) known environmental factors such as, e.g., buildings, etc., (b) a UE 112 approaching an edge of a coverage area of an associated cellular network or cell in the case of network-assisted D2D links, (c) reported measurement values from the UEs 112 (e.g., reported Received Strength of Signal (RSSI) measurements) where these reported measurement values may be for signals received at one UE 112 from another UE 112 associated with a particular UE link, or the like, or any combination thereof. Note that the above factors are only an example. Actual or predicted blockages for D2D links involved in the multi-path connection(s) can be detected and/or predicted using any suitable technology. Such technology is not the focus of the present disclosure.

In addition to or as an alternative to receiving information about actual or predicted blockages, the master topology function 114 may receive a QoS change notification from a slave topology function 116 at a UE 112, which may be either a relay UE 112-R or a target UE 112-T (step 1602). The QoS change notification is, in one embodiment, notification of a change in QoS at an application-level (e.g., Layer 7). The QoS change notification may include or be associated with information that indicates a UE link number that indicates a particular D2D link associated with the QoS change notification and/or the particular application associated to the QoS change notification.

The master topology function 114 determines which multi-path connection topologies are affected by the received blockage information and/or the received QoS notification and initializes a count, c, to the number of affected topologies (step 1604). More specifically, the master topology function 114 has previously determined topologies for one or more multi-path connection. Thus, the master topology function 114 may be performing the update procedure for one or more topologies. Further, the link for which the master topology function 114 has received information about an actual or predicted blockage or received a QoS change notification may be part of one or more topologies. If there is more than one topology affected, the master topology function 114 ranks the affected topologies based on application-level QoS impact to provide a ranked list of topologies (step 1606).

Starting at the first topology in the ranked list, the master topology function 114 checks whether any other UE 112 in the same topology is also affected (step 1608). In other words, the master topology function 114 determines whether it has received actual or predicted blockage information and/or a QoS notification for another UE(s) 112 in the same topology. Optionally, step 1608 may include the master topology function 114 waiting a predefined or configured amount of time (i.e., a guard time Tguard) to check: (1) whether the other UE(s) 112 sends a QoS change notification and/or (2) whether this change is temporary.

The master topology function 114 then determines whether the topology can be updated to compensate for the actual or predicted blockage and/or the received QoS notification (step 1610). This check includes, in this example, a checking if the topology can be updated by activating a reserved, or inactive, link(s) in the topology and/or by updating the topology to use only non-affected UEs 112 (e.g., by using non-affected active links in the topology). If so (step 1610, YES), the master topology function 114 arrives at, or determines, the updated topology for the multi-path connection (step 1612). The updated topology may be such that one or more of the inactive links in the previous topology (i.e., the topology prior to the update) are activated and/or one or more active links in the previous topology are modified (e.g., deactivated, e.g., due to actual or predicted blockage or QoS change notification). The determining of the updated topology may include re-calculation of the QoS impact based on the historical statistics received from the slave topology functions 116 of the UEs 112 in the updated topology.

The master topology function 114 sends the updated topology to the slave topology functions 116 of the UEs 112 in the topology or at least those UEs 112 in the topology that are affected by the update (step 1614). In other words, the master topology function 114 configures the UEs 112 involved in the topology or affected by the update to operate to provide the multi-path connection in accordance with the updated topology. The master topology function 112 also updates the remote TX node (e.g., source wireless node such as, e.g., the base station) about the updated topology, if needed (step 1616).

The master topology function 112 may also indicate to the associate application if a change in QoS is to be expected (step 1618). The master topology function 114 may also indicate any needed resource adjustments to the RRM unit(s) in the RAN node 110 (step 1620).

The master topology function 114 decreases the count, c, (step 1622) and checks whether c=0 (step 1624). If not, the master topology function 114 selects the next topology in the ranked list (step 1626), and the process returns to step 1608 and is repeated for the next topology.

Returning to step 1610, if the topology cannot be updated to compensate for the actual or predicted blockage or QoS change notification (e.g., if there are no reserved, or inactive, links in the topology) (step 1610, NO), the master topology function 114 retains the existing topology for the multi-path connection (step 1626). This may include re-calculating the QoS impact based on historical statistics received from the slave topology functions 116 of the UEs 112 in the topology. The master topology function 114 may notify the slave functions 116 of the UEs 112 in the topology that, although the existing topology is retained, transmissions to and from the UE(s) 112 associated to the degraded link may be stopped and other UEs 112 may stop monitoring for such transmissions (step 1628).

Figure 17:
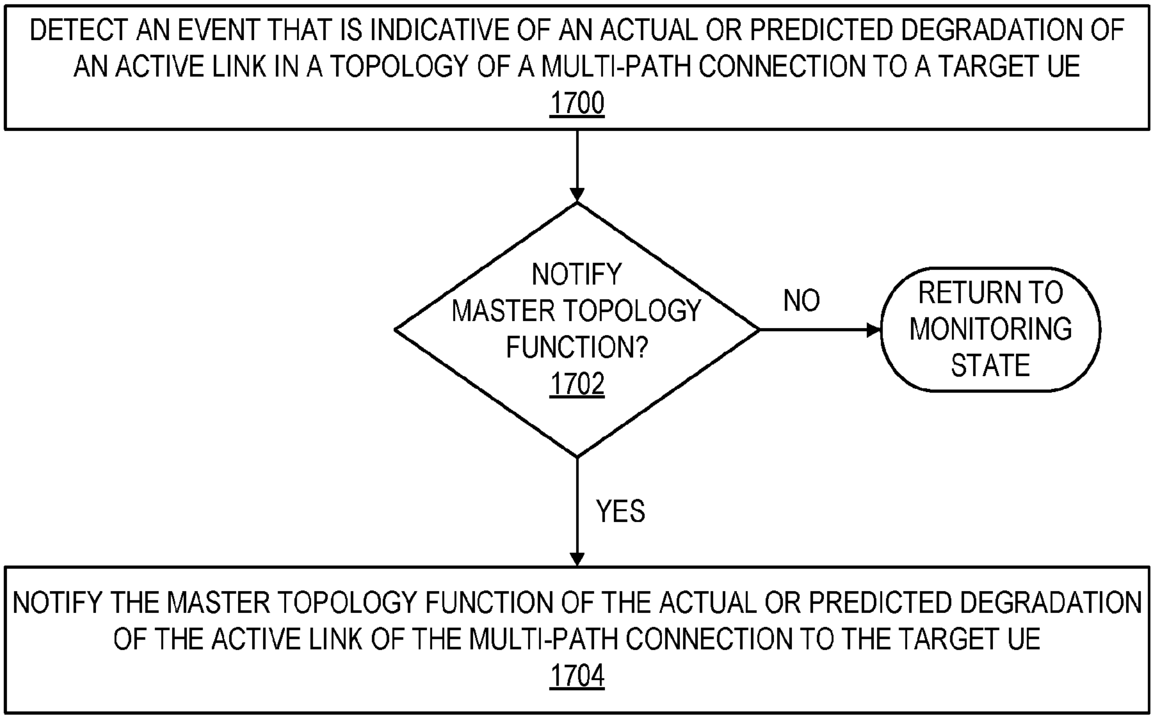
FIG. 17 illustrates the operation of a slave topology function to notify a master topology function of actual or predicted degradations of a link accordance with one embodiment of the present disclosure.

FIG. 17 is a flow chart that illustrates the operation of a slave topology function 116 at a UE 112 in accordance with one embodiment of the present disclosure. As illustrated, the slave topology function 116 detects an event that is indicative of an actual or predicted degradation of an active link in a topology of a multi-path connection to a target UE 112-T (step 1700). The actual or predicted degradation may be an actual or predicted blockage of the D2D link to or from another UE 112 in the topology, where this D2D link is or is part of the active link in the topology of the multi-path connection. The actual or predicted degradation may alternatively be a degradation of an application-level QoS for the application associated to the multi-path connection. The slave topology function 116 determines whether it should notify the master topology function (step 1702). If not, the slave topology function 116 returns to the monitoring state to monitor for additional events. If the slave topology function 116 determines that the master topology function 114 should be notified, the slave topology function 116 transmits, to the master topology function 114, a notification of the actual or predicted degradation of the active link in the topology of the multi-path connection to the target UE 112-T (step 1704). This notification may be a notification of an actual or predicted blockage of the respective UE link or a notification of a change (e.g., degradation) of the QoS for the associated application.

Figure 18A:
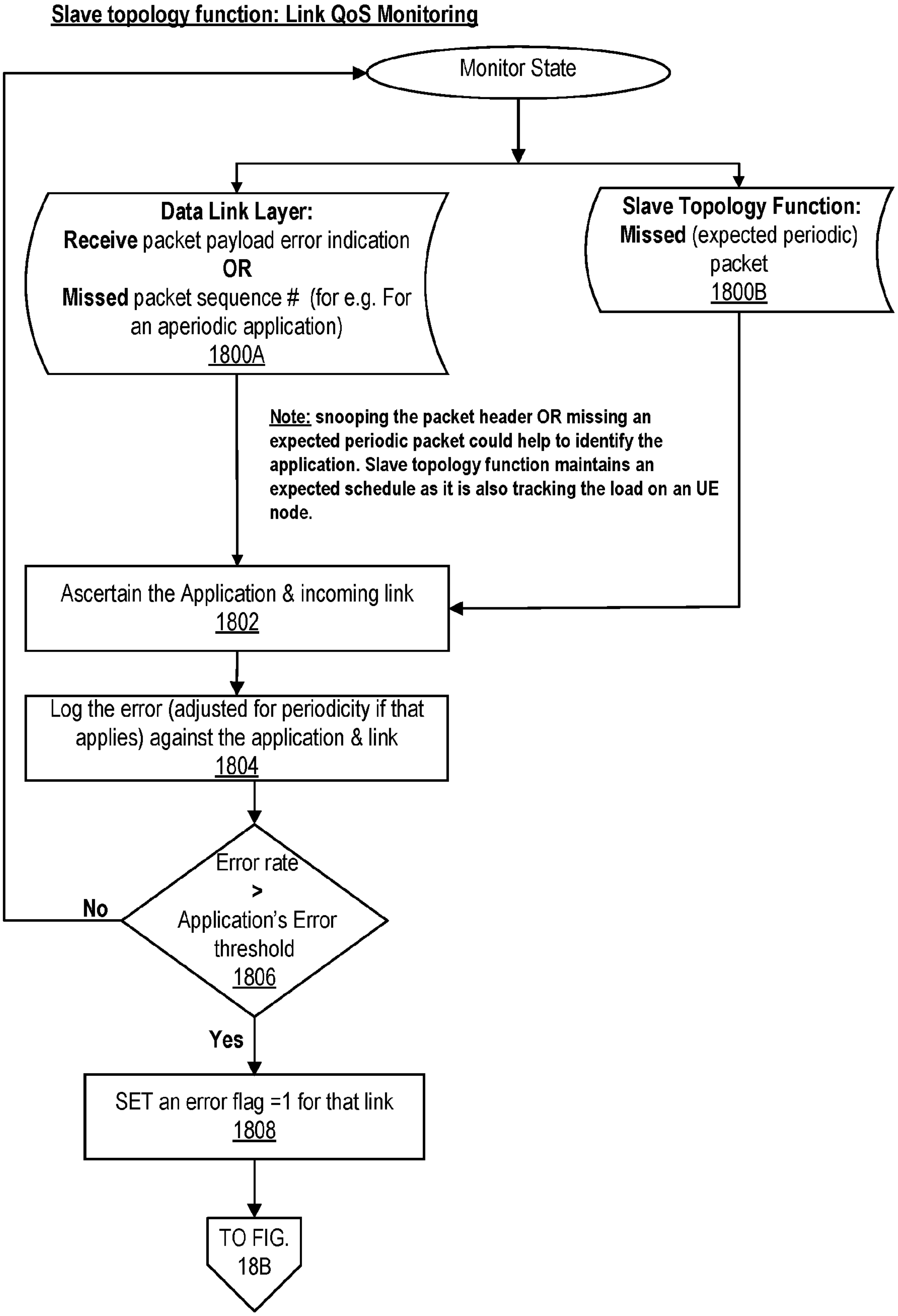
FIGS. 18A and 18B illustrate the operation of a slave topology function to report Quality of Service (QoS) notifications to a master topology function accordance with one embodiment of the present disclosure.
Figure 18B:
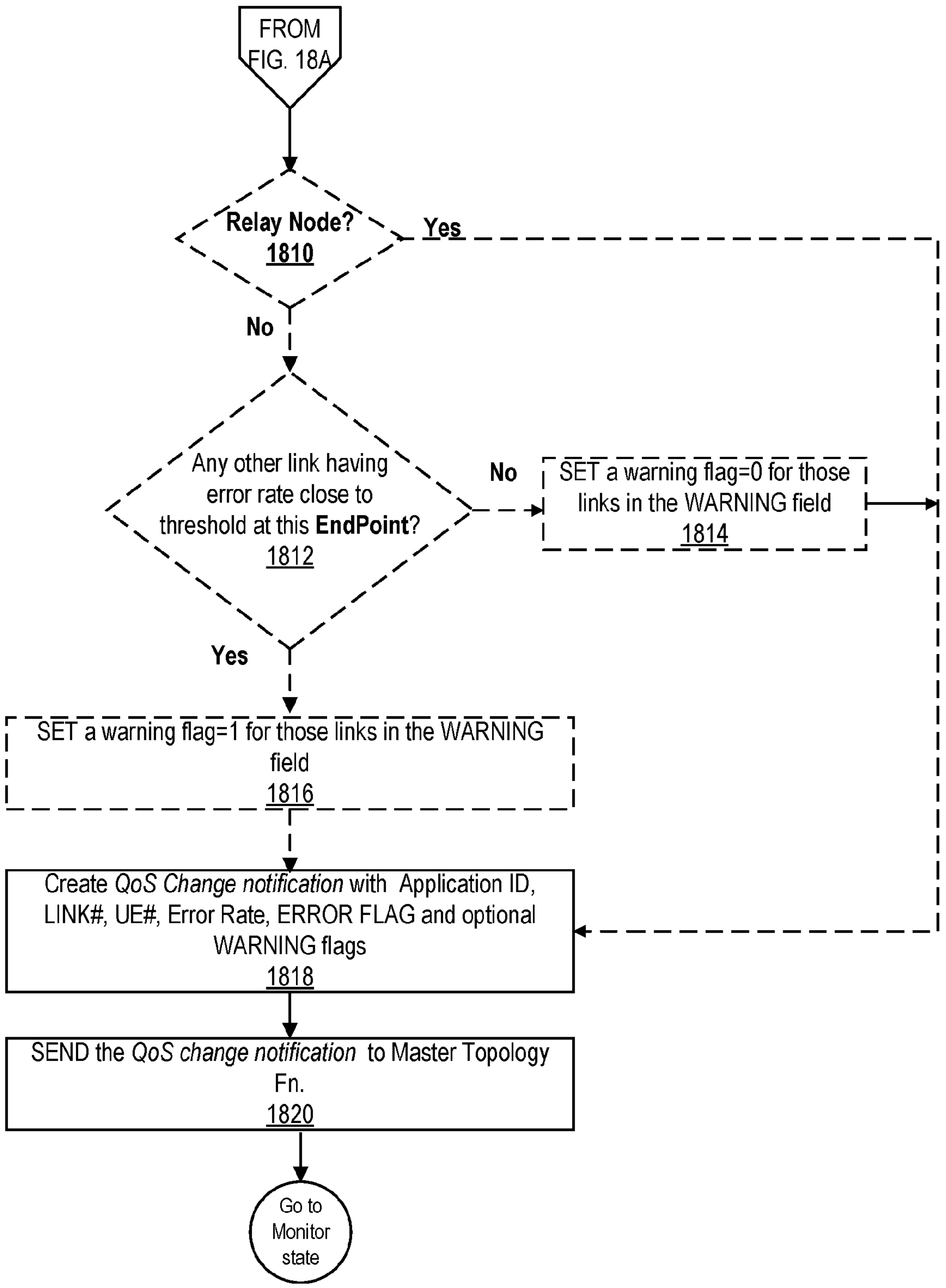

FIGS. 18A and 18B show a flow chart that illustrates the operation of the slave topology function 116 of a UE 112 in accordance with another embodiment of the present disclosure. Optional steps are represented by dashed boxes. As illustrated, the slave topology function 116 is operating in a "monitor state". While the monitor state, the slave topology function 116 receives, at a data link layer, a packet payload error indication or misses, at the data link layer, a package sequence number (step 1800A). In addition or alternatively, the slave topology function 116 misses an expected periodic packet (step 1800B). The slave topology function 116 determines the application and incoming UE link for which the event detected in step 1800A and/or step 1800B occurred (step 1802) and logs an error for the detected event (step 1804). The slave topology function 112 determines whether an error rate for the UE link or application is greater than a predefined or configured threshold for the application (step 1806). If not, the slave topology function 116 returns to the monitor state.

If the error rate is greater than the threshold, the slave topology function 116 sets an error flag (e.g., sets the error flag=1) for the UE link (step 1808). The slave topology function 116 may also determine whether the UE 112 is a relay UE 112-R or the target UE 112-T (step 1810). If the UE 112 is a relay UE 112-R, the process proceeds to step 1818, which is described below. If the UE 112 is the target UE 112-T, the slave topology function 116 determines whether any other UE link used for the topology of the multi-path connection has an error rate that is close to (e.g., within a predefined or configured range of) the error rate threshold for the application at this endpoint (i.e., at the target UE 112-T) (step 152). Note that the error rates for the UE links at the target UE can also be viewed as error rates for the respective active links of the topology of the multi-path connection to the target UE 112-T. If no other UE link has an error rate close to the threshold, the slave topology function 116 sets a warning flag to a value that indicates "no warning" (e.g., warning flag=0) (step 1814) and the process then proceeds to step 1818. However, if at least one other UE link has an error rate that is close to the threshold (step 1812, YES), the slave topology function 116 sets the warning flag to a value that indicates "warning" (e.g., warning flag=1) (step 1816).

At this point, whether proceeding from step 1808, 1810, 1814, or 1816, the slave topology function 116 creates a QoS change notification that includes an application identity (ID) of the associated application, a link number that indicates the UE link (i.e., the D2D link within an active link for which the QoS change notification is being created), and the error flag (step 1818). The QoS change notification may also include the error flag and/or the warning flag. The slave topology function 116 transmits the QoS change notification to the master topology function (step 1820). The slave topology function 116 then returns to the monitor state.

Note that procedure performed by the slave topology function 116 in FIGS. 18A and 18B operates in conjunction with the procedure performed by the master topology function 114 in FIGS. 16A, 16B, and 16C.

Now, the discussion turns to some possible enhancements to QoS monitoring both at a single UE 112 and in the last mile system. In regard to enhancements at a single UE 112, the slave topology function 116 can continuously monitor multiple incoming links for multiple applications. The monitored data can be tagged with time, data parameters (e.g., size, periodicity, arrival link), UE mobility, UE radio reception quality, to create a data base of local view of the operating environment. On-node Machine Learning (ML) techniques such as TinyML may be applied to gain insights and transmit information about such insights to an optimization entity that is located locally or remotely.

In regard to multi-node link QoS monitoring enhancements, in one embodiment, the master topology function 114 collects the monitored data from the slave topology functions 116 of multiple UEs 112 and use this data to analyze and optimize the operating environment of the last mile. ML techniques may use such data and co-relation of position of UE, movement areas, velocity along with timestamps that are based on a synchronized time on all nodes.

Figure 19:
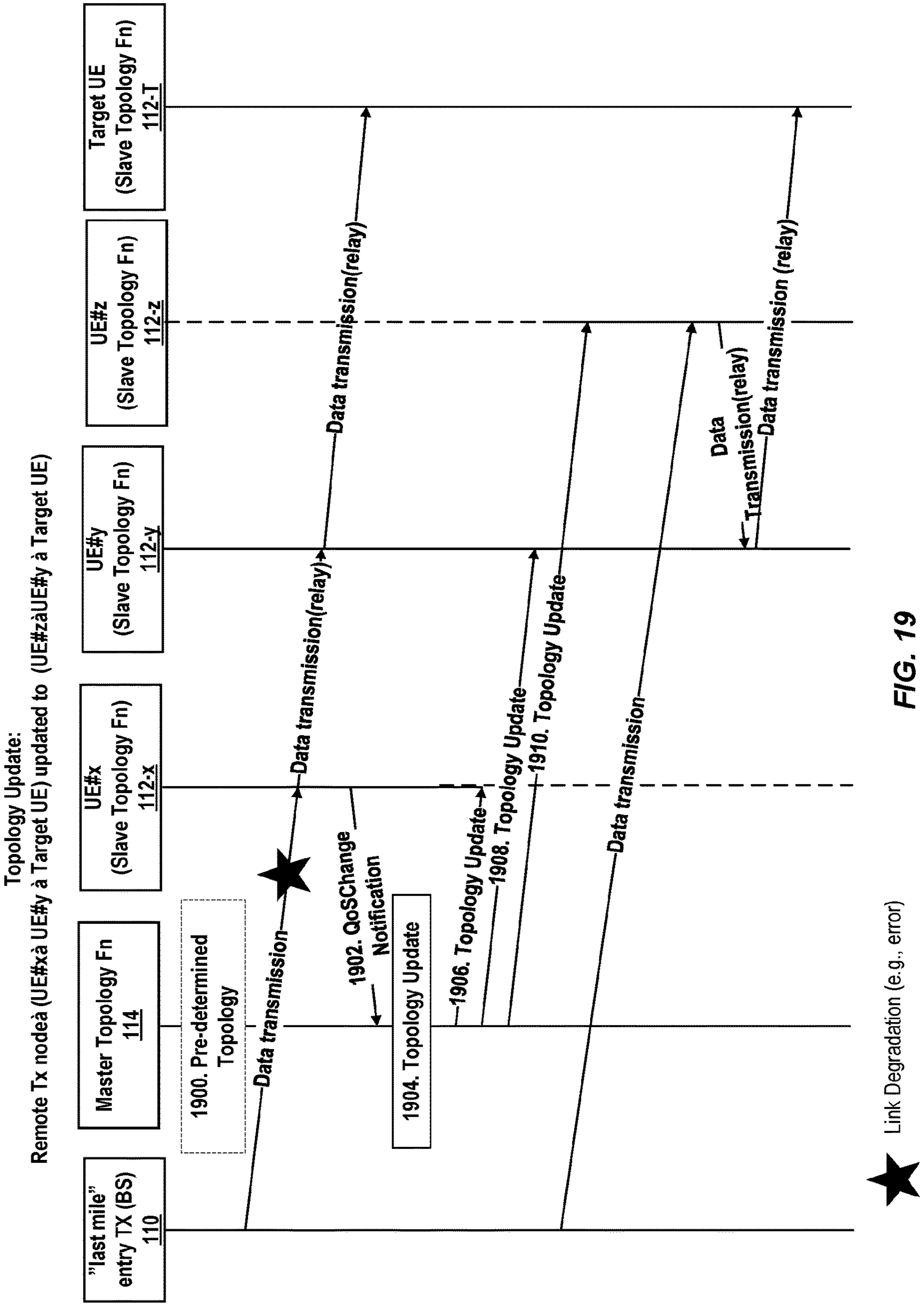
FIG. 19 illustrate one example of a signaling procedure used for dynamic update of a topology of a multi-path connection in accordance with an embodiment of the present disclosure.

FIG. 19 illustrates one example signaling procedure for dynamic update of a topology of a multi-path connection to a target UE 112-T. As illustrated, the master topology function 114 has pre-determined a topology for the multi-path connection from, in this example, a base station 110 to the target UE 112-T (step 1900). In this example, the topology includes the following active link BS 110→UE 112-*x*→UE 112-*y*→target UE 112-T, and the following inactive link BS 110→UE 112-*z*→UE 112-*y*→target UE 112-T.

In this example, the UE 112-*x* detects a UE link degradation (e.g., an error such as that indicated when the UE 112-*x* receives a package payload error indication or misses a packet sequence number, or misses an expected periodic packet), determines that a QoS change notification should be sent to the master topology function 114 (e.g., due to the error rate on the UE link exceeds a threshold), and creates and transmits a QoS change notification to the master topology function 114 (step 1902). The master topology function 114 updates the topology for the multi-path connection responsive to the QoS change notification, as described above (step 1904). In this example, the topology is updated by activating the inactive links in the path (BS 110→UE 112-*z*→UE 112-*y*→target UE 112-T) and optionally deactivating the active links in the path (BS 110→UE 112-*x*→UE 112-*y*→target UE 112-T) that are no longer needed (e.g., the link from UE 112-*y* to target UE 112-T will remain active). Note that the (updated) topology may include one or more additional active links (e.g., an active link which is a direct link from the base station 110 to the target UE 112-T) that are not shown in FIG. 19. The master topology function 114 configures the UEs 112-*x*, 112-*y*, and 112-*z* in accordance with the updated topology (steps 1906, 1908, and 1910). Thereafter, the previously inactive link is now active such that, each, for this new active link a data transmission from the base station 110 to the target UE 112-T traverses this new active link as shown.

Note that in FIG. 19, data coming over cloud is distributed in the last mile by a base station 110. Hence, the base station 110 is referred to as a last mile entry node. If the data is originating within the last mile, then the data may be distributed by a UE that is originating the data (i.e., a source UE 112-S) or in some cases it may be a cluster head UE.

Figure 20:
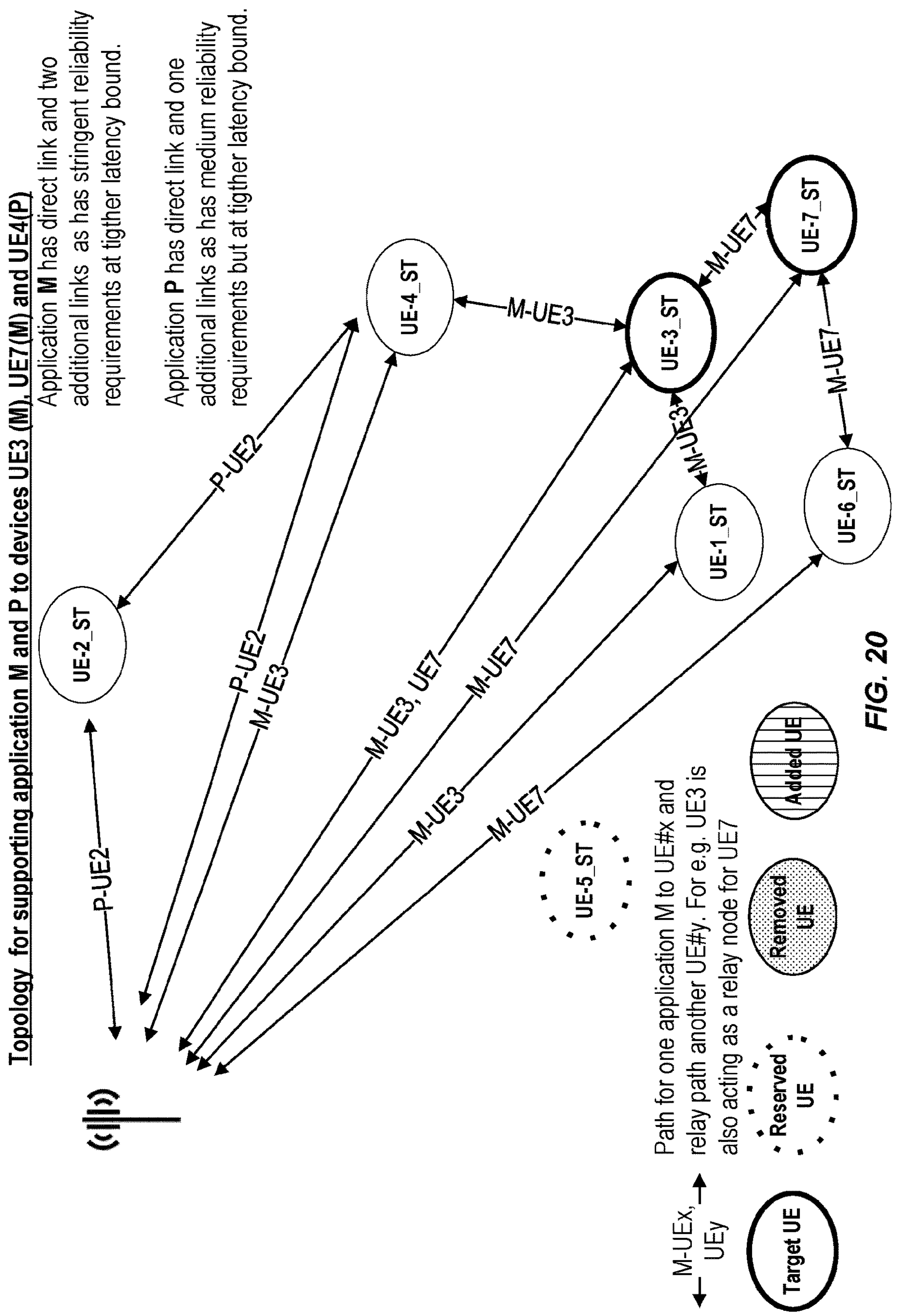
FIGS. 20 and 21 illustrate one example of a dynamic update of a topology of a multi-path connection in accordance with an embodiment of the present disclosure.
Figure 21:
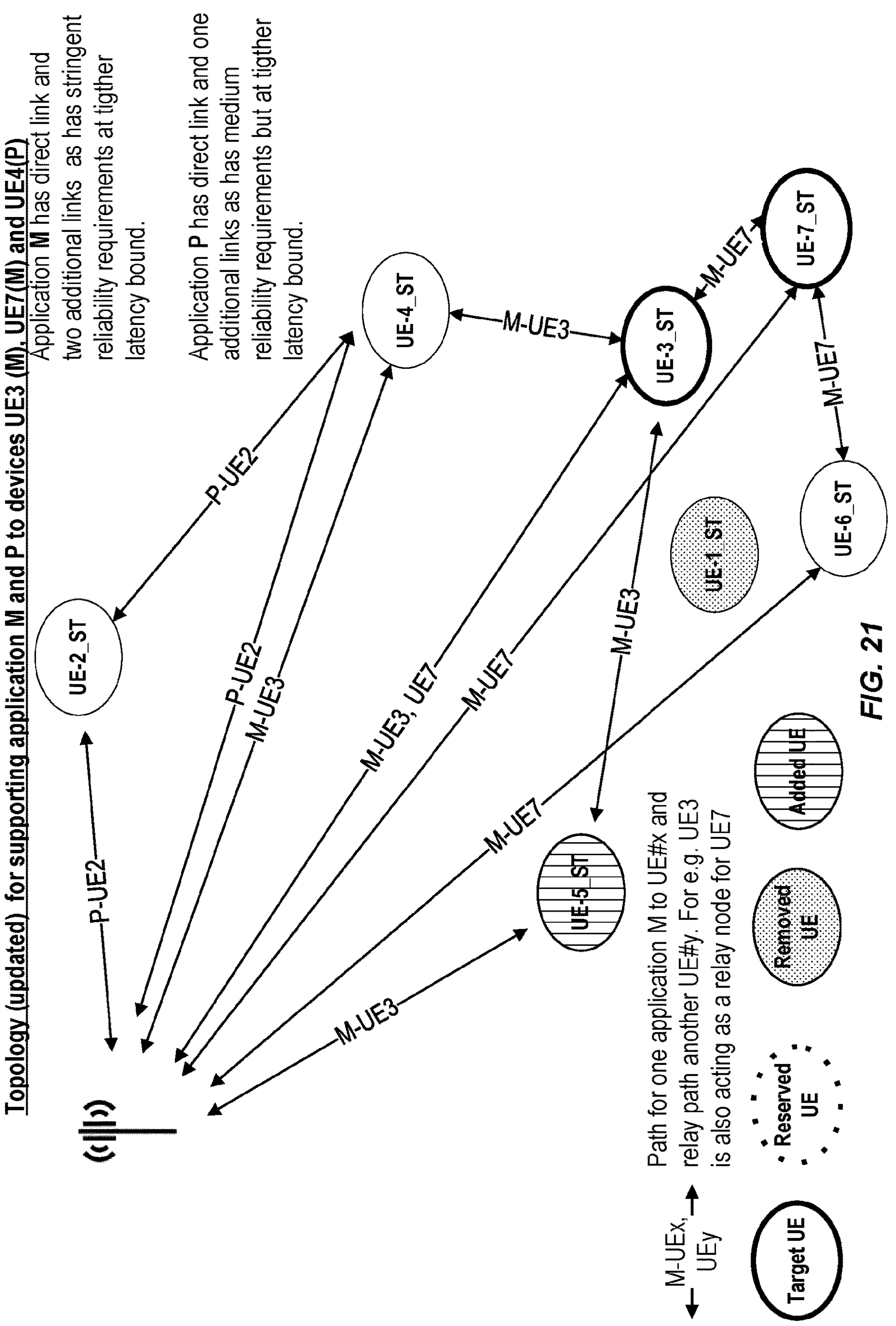

FIGS. 20 and 21 illustrate an example of a dynamic topology update within a system. In this example, an application M is running on two target UEs and an application P is running on one target UE. The other UEs function as nodes in the topologies to enable multi-path connections from the source node, which in this example is a base station, and the respective target UEs. In FIG. 20, UE-5 is a reserved UE, i.e., a UE associated to a reserved, or inactive, link in the topology for the multi-path connection to target UE-3 for application M. FIG. 20 shows before the dynamic update, and FIG. 21 shows after the dynamic update.

In the illustrated example, it is assumed that UE-1 has an issue and cannot be a node in the topology for the multi-path connection to UE-3 for application M. Therefore, the topology for the multi-path connection to target UE-3 for application M is updated by activating the inactive link through UE-3 for the topology of the multi-path connection to the target UE-3 for application M and deactivating the previously active link through UE-1. This updating is brought about by signaling such as that shown in FIG. 19.

Note that the topologies for supporting the same application on other target UEs are not updated as UE-1 was not influencing the other topologies.

Some of the possible embodiments that are not described earlier are as follows:

- In one embodiment, the master topology function 114 could reside on a remote cloud or reside on a Mobile Edge Computing (MEC) node.
- In one embodiment, the master topology function could be copied onto a cluster head UE when a group of UEs are moving out to a non-coverage area and one or more UEs are elected as cluster head.
  - Note that a cluster head UE is a UE that co-ordinates and controls a group of UEs.
  - A new cluster head UE can be selected and the master topology function 114 copies to the new cluster head UE can be done based on predicted or known coverage regions.
  - Note that if there is more than one master topology function 114 due to such an embodiment, master topology functions 114 may share UE related information to assist one another.
- In one embodiment of the dynamic update procedure described herein, the dynamic update includes activating a reserved, or inactive, link, which was previously identified for the topology. This gives a quick update possibility. In addition, alternative embodiments are possible such as:
  - An embodiment in which the master topology function 114 re-runs the procedure for determining the topology, at least partially. In this case, the existing active and possibly inactive links for which no degradation or change has been detected may be retained in the topology and the master topology function 114 checks for additional links needed to ensure the desired application-level requirements for the application. This should ensure traffic continuity but cost additional latency.

Figure 22:
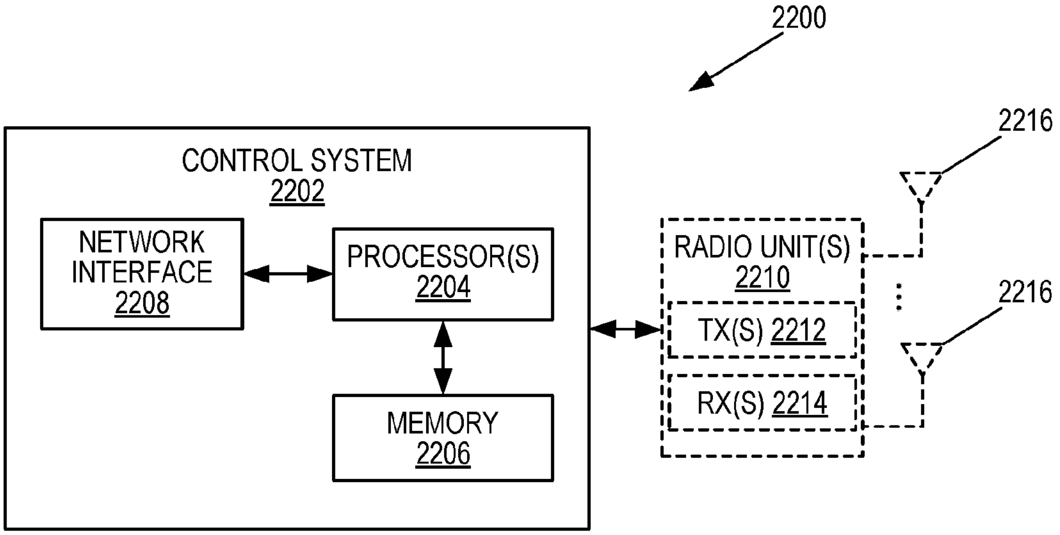
FIGS. 22 through 24 are schematic block diagrams of example embodiments of a network node.

FIG. 22 is a schematic block diagram of a network node 2200 according to some embodiments of the present disclosure. Optional features are represented by dashed boxes. The network node 2200 may be, for example, the RAN node 110 or a network node on which the master topology function 114 is implemented. As illustrated, the network node 2200 includes a control system 2202 that includes one or more processors 2204 (e.g., Central Processing Units (CPUs), Application Specific Integrated Circuits (ASICs), Field Programmable Gate Arrays (FPGAs), and/or the like), memory 2206, and a network interface 2208. The one or more processors 2204 are also referred to herein as processing circuitry. In addition, if the network node 2200 is a RAN node, the network node 2200 may also include one or more radio units 2210 that each includes one or more transmitters 2212 and one or more receivers 2214 coupled to one or more antennas 2216. The radio units 2210 may be referred to or be part of radio interface circuitry. In some embodiments, the radio unit(s) 2210 is external to the control system 2202 and connected to the control system 2202 via, e.g., a wired connection (e.g., an optical cable). However, in some other embodiments, the radio unit(s) 2210 and potentially the antenna(s) 2216 are integrated together with the control system 2202. The one or more processors 2204 operate to provide one or more functions of the RAN node 2200 as described herein (e.g., one or more functions of the RAN node 110 or one or more functions of the master topology function 114, as described herein). In some embodiments, the function(s) are implemented in software that is stored, e.g., in the memory 2206 and executed by the one or more processors 2204.

Figure 23:
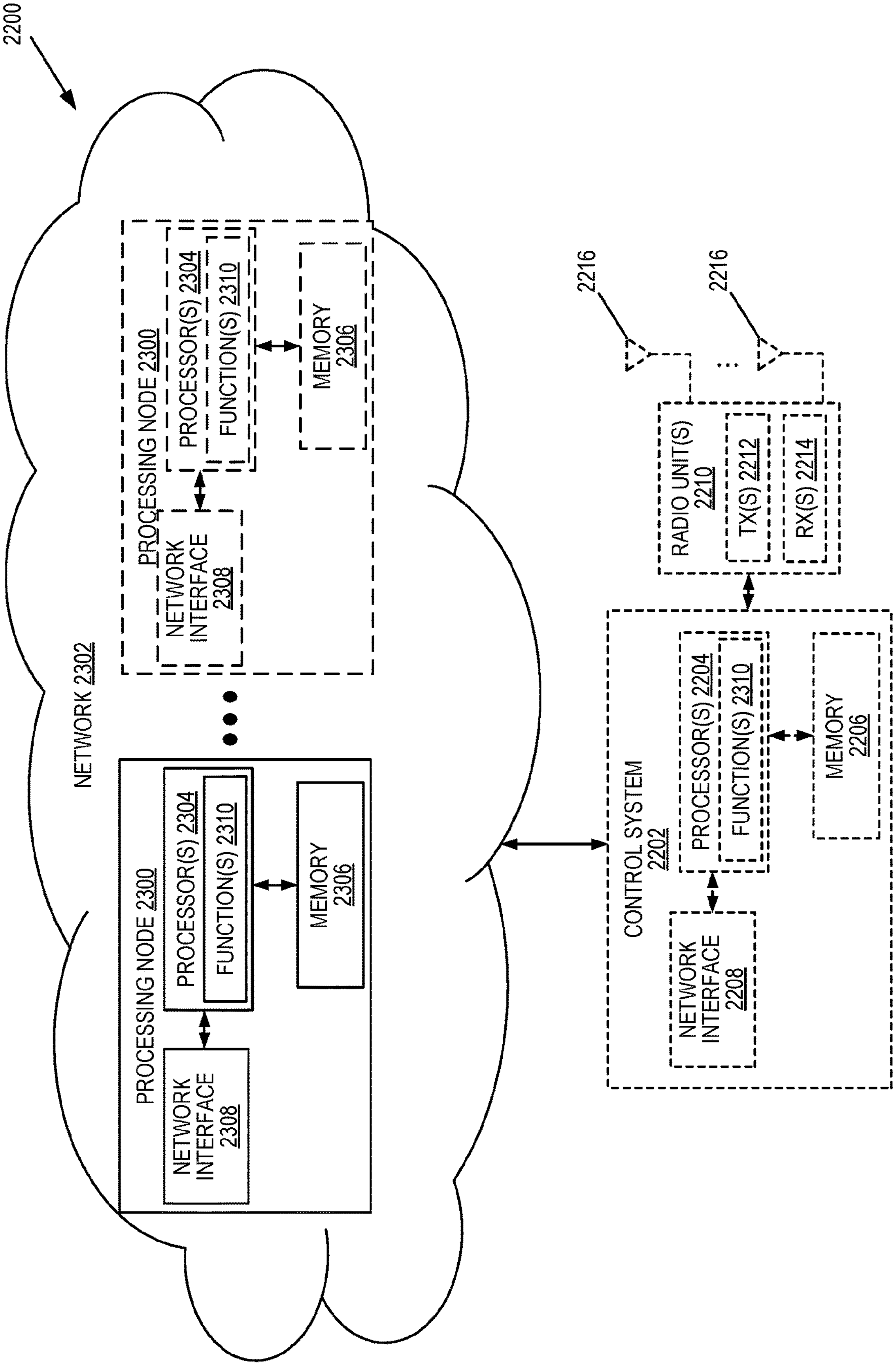

FIG. 23 is a schematic block diagram that illustrates a virtualized embodiment of the network node 2200 according to some embodiments of the present disclosure. Again, optional features are represented by dashed boxes. As used herein, a "virtualized" network node is an implementation of the network node 2200 in which at least a portion of the functionality of the network node 2200 is implemented as a virtual component(s) (e.g., via a virtual machine(s) executing on a physical processing node(s) in a network(s)). As illustrated, the network node 2200 includes one or more processing nodes 2300 coupled to or included as part of a network(s) 2302. Each processing node 2300 includes one or more processors 2304 (e.g., CPUs, ASICs, FPGAS, and/or the like), memory 2306, and a network interface 2308. If the network node 2200 is a RAN node, the network node 2200 may include the control system 2202 and/or the one or more radio units 2210, as described above. If present, the control system 2202 or the radio unit(s) are connected to the processing node(s) 2300 via the network 2302.

In this example, functions 2310 of the network node 2200 described herein (e.g., one or more functions of the RAN node 110 or one or more functions of the master topology function 114, as described herein) are implemented at the one or more processing nodes 2300 or distributed across the one or more processing nodes 2300 and the control system 2202 and/or the radio unit(s) 2210 in any desired manner. In some particular embodiments, some or all of the functions 2310 of the network node 2200 described herein are implemented as virtual components executed by one or more virtual machines implemented in a virtual environment(s) hosted by the processing node(s) 2300.

In some embodiments, a computer program including instructions which, when executed by at least one processor, causes the at least one processor to carry out the functionality of the network node 2200 or a node (e.g., a processing node 2300) implementing one or more of the functions 2310 of the network node 2200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
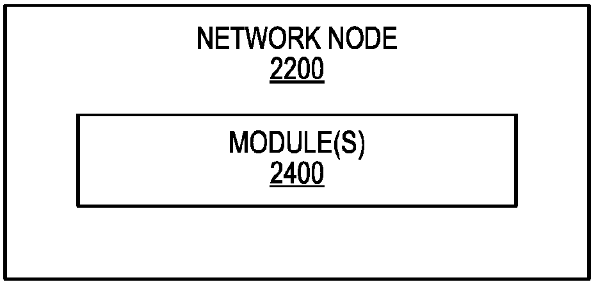

FIG. 24 is a schematic block diagram of the network node 2200 according to some other embodiments of the present disclosure. The network node 2200 includes one or more modules 2400, each of which is implemented in software. The module(s) 2400 provide the functionality of the network node 2200 described herein (e.g., one or more functions of the RAN node 110 as described herein). This discussion is equally applicable to the processing node 2300 of FIG. 23 where the modules 2400 may be implemented at one of the processing nodes 2300 or distributed across multiple processing nodes 2300 and/or distributed across the processing node(s) 2300 and the control system 2202.

Figure 25:
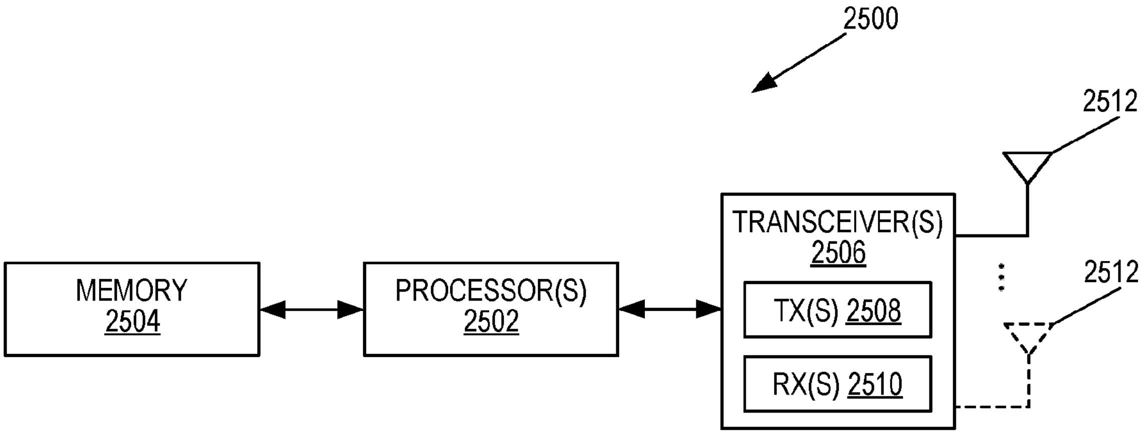
FIGS. 25 and 26 are schematic block diagrams of example embodiments of a UE.

FIG. 25 is a schematic block diagram of a wireless communication device 2500 according to some embodiments of the present disclosure. The wireless communication device 2500 is one example of the UE 112. As illustrated, the wireless communication device 2500 includes one or more processors 2502 (e.g., CPUs, ASICS, FPGAS, and/or the like), memory 2504, and one or more transceivers 2506 each including one or more transmitters 2508 and one or more receivers 2510 coupled to one or more antennas 2512. The transceiver(s) 2506 includes radio-front end circuitry connected to the antenna(s) 2512 that is configured to condition signals communicated between the antenna(s) 2512 and the processor(s) 2502, as will be appreciated by one of ordinary skill in the art. The processors 2502 are also referred to herein as processing circuitry. The transceivers 2506 are also referred to herein as radio circuitry. In some embodiments, the functionality of the wireless communication device 2500 described above (e.g., one or more functions of the UE 112 or the slave topology function 116 implemented at the UE 112 as described herein) may be fully or partially implemented in software that is, e.g., stored in the memory 2504 and executed by the processor(s) 2502. Note that the wireless communication device 2500 may include additional components not illustrated in FIG. 25 such as, e.g., one or more user interface components (e.g., an input/output interface including a display, buttons, a touch screen, a microphone, a speaker(s), and/or the like and/or any other components for allowing input of information into the wireless communication device 2500 and/or allowing output of information from the wireless communication device 2500), a power supply (e.g., a battery and associated power circuitry), etc.

In some embodiments, a computer program including instructions which, when executed by at least one processor, causes the at least one processor to carry out the functionality of the wireless communication device 2500 according to any of the embodiments described herein (e.g., one or more functions of the UE 112 or the slave topology function 116 implemented at the UE 112 as described herein) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 26:
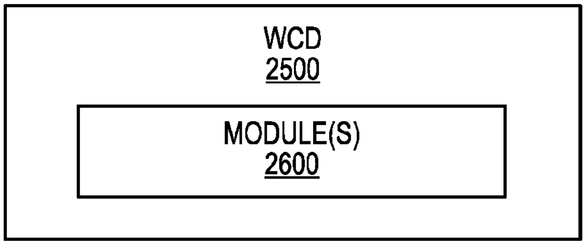

FIG. 26 is a schematic block diagram of the wireless communication device 2500 according to some other embodiments of the present disclosure. The wireless communication device 2500 includes one or more modules 2600, each of which is implemented in software. The module(s) 2600 provide the functionality of the wireless communication device 2500 described herein (e.g., one or more functions of the UE 112 or the slave topology function 116 implemented at the UE 112 as described herein).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by a master topology function to dynamically update a topology for a multi-path connection to a target wireless communication device, the method comprising:
- determining a topology for a multi-path connection to a target wireless communication device such that the topology for the multi-path connection satisfies one or more application-level requirements for a particular application, wherein:
  - the topology comprises two or more active links from a source wireless node to the target wireless communication device and one or more inactive links from the source wireless node to the target wireless communication device; and
  - at least one link from among the two or more active links and the one or more inactive links is a multi-hop link from the source wireless node to the target wireless communication device via one or more additional wireless communication devices that operate as relays;
- configuring, directly or indirectly, the source wireless node, the target wireless communication device, and the one or more additional wireless communication devices in accordance with the determined topology to provide the multi-path connection; and
- dynamically updating the determined topology wherein dynamically updating the determined topology comprises:
  - obtaining information about an actual or predicted degradation of at least one of the two or more active links or about a change in Quality of Service, QoS, required for the particular application using the multi-path channel;
  - waiting a predefined or preconfigured amount of time to determine whether further information about an actual or predicted degradation of at least one of the two or more active links or about a change in the QoS required for the particular application using the multi-path channel is received; and
- after waiting the predefined or preconfigured amount of time, updating the determined topology based on the information about the actual or predicted degradation of at least one of the two or more active links or about the change in QoS of the particular application using the multi-path channel and, if received, the further information.

2. The method of claim 1 wherein dynamically updating the determined topology further comprises activating at least one of the one or more inactive links.

3. The method of claim 2 wherein activating the at least one of the one or more inactive links comprises configuring, directly or indirectly, the source wireless node, the target wireless communication device, and/or the one or more additional wireless communication devices to activate the at least one of the one or more inactive links.

4. The method of claim 2 wherein dynamically updating the determined topology comprises modifying at least one of the one or more active links.

5. The method of claim 4 wherein modifying the at least one of the one or more active links comprises configuring, directly or indirectly, the source wireless node, the target wireless communication device, and/or the one or more additional wireless communication devices to modify the at least one of the one or more active links.

6. The method of claim 4 wherein modifying the at least one of the one or more active links comprises deactivating the at least one of the one or more active links.

7. The method of claim 1 wherein dynamically updating the determined topology further comprises:
- obtaining information about an actual or predicted degradation of at least one of the two or more active links; and
- updating the determined topology based on the information about the actual or predicted degradation of at least one of the two or more active links.

8. The method of claim 7 wherein obtaining the information about the actual or predicted degradation of at least one of the two or more active links comprises receiving a notification of the actual or predicted degradation of at least one of the two or more active links from the source wireless node, the target wireless communication device, or at least one of the one or more additional wireless communication devices.

9. The method of claim 7 wherein obtaining the information about the actual or predicted degradation of at least one of the two or more active links comprises receiving a notification a reduction in capabilities of at least one of the two or more active links from the source wireless node, the target wireless communication device, or at least one of the one or more additional wireless communication devices.

10. The method of claim 1 wherein dynamically updating the determined topology comprises:
- obtaining information about a change in Quality of Service, QoS, of the particular application using the multi-path channel; and
- updating the determined topology based on the information about the change in the QoS of the particular application using the multi-path channel.

11. A network node for implementing a master topology function that dynamically updates a topology for a multi-path connection to a target wireless communication device, the network node comprising processing circuitry configured to cause the network node to:
- determine a topology for a multi-path connection to a target wireless communication device such that the topology for the multi-path connection satisfies one or more application-level requirements for a particular application, wherein:
  - the topology comprises two or more active links from a source wireless node to the target wireless communication device and one or more inactive links from the source wireless node to the target wireless communication device; and
  - at least one link from among the two or more active links and the one or more inactive links is a multi-hop link from the source wireless node to the target wireless communication device via one or more additional wireless communication devices that operate as relays;
- configure, directly or indirectly, the source wireless node, the target wireless communication device, and the one or more additional wireless communication devices in accordance with the determined topology to provide the multi-path connection; and dynamically update the determined topology based on: (a) information about an actual or predicted degradation of at least one of the two or more active links, (b) a change in a Quality of Service, QoS, for the particular application using the multi-path connection, or (c) a change in the one or more application-level requirements for the particular application, wherein the network node is adapted to dynamically update by:

obtaining information about an actual or predicted degradation of at least one of the two or more active links or about a change in Quality of Service, QoS, of the particular application using the multi-path channel;

waiting a predefined or preconfigured amount of time to determine whether further information about an actual or predicted degradation of at least one of the two or more active links or about a change in the QoS of the particular application using the multi-path channel is received; and after waiting the predefined or preconfigured amount of time, updating the determined topology based on the information about the actual or predicted degradation of at least one of the two or more active links or about the change in QoS of the particular application using the multi-path channel and, if received, the further information.

12. The network node of claim 11 wherein, in order to dynamically update the determined topology, the processing circuitry is further configured to cause the network node to activate at least one of the one or more inactive links.

13. The network node of claim 12 wherein, in order to activate the at least one of the one or more inactive links, the processing circuitry is further configured to cause the network node to configure, directly or indirectly, the source wireless node, the target wireless communication device, and/or the one or more additional wireless communication devices to activate the at least one of the one or more inactive links.

14. The network node of claim 12 wherein, in order to dynamically update the determined topology, the processing circuitry is further configured to cause the network node to modify at least one of the one or more active links.

15. The network node of claim 14 wherein, in order to modify the at least one of the one or more active links, the processing circuitry is further configured to cause the network node to configure, directly or indirectly, the source wireless node, the target wireless communication device, and/or the one or more additional wireless communication devices to modify the at least one of the one or more active links.

16. The network node of claim 14 wherein, in order to modify the at least one of the one or more active links, the processing circuitry is further configured to cause the network node to deactivate the at least one of the one or more active links.

17. The network node of claim 11 wherein, in order to dynamically update the determined topology, the processing circuitry is further configured to cause the network node to:

obtain information about an actual or predicted degradation of at least one of the two or more active links; and update the determined topology based on the information about the actual or predicted degradation of at least one of the two or more active links.

18. The network node of claim 17 wherein, in order to obtain the information about the actual or predicted degradation of at least one of the two or more active links, the processing circuitry is further configured to cause the network node to receive a notification of the actual or predicted degradation of at least one of the two or more active links from the source wireless node, the target wireless communication device, or at least one of the one or more additional wireless communication devices.

19. The network node of claim 17 wherein, in order to obtain the information about the actual or predicted degradation of at least one of the two or more active links, the processing circuitry is further configured to cause the network node to receive a notification a reduction in capabilities of at least one of the two or more active links from the source wireless node, the target wireless communication device, or at least one of the one or more additional wireless communication devices.

20. The network node of claim 11 wherein, in order to dynamically update the determined topology, the processing circuitry is further configured to cause the network node to:

obtain information about a change in Quality of Service, QoS, of the particular application using the multi-path channel; and update the determined topology based on the information about the change in the QoS of the particular application using the multi-path channel.

* * * * *